(12) United States Patent
Ayres et al.

(10) Patent No.: US 9,703,260 B2
(45) Date of Patent: Jul. 11, 2017

(54) METHODS AND APPARATUS FOR COHERENT HOLOGRAPHIC DATA CHANNELS

(71) Applicant: Akonia Holographics, LLC, Longmont, CO (US)

(72) Inventors: Mark R. Ayres, Boulder, CO (US); Kenneth E. Anderson, Boulder, CO (US); David C. Pruett, Longmont, CO (US); Will A. Loechel, Longmont, CO (US)

(73) Assignee: Akonia Holographics LLC, Longmont, CO (US)

( * ) Notice: Subject to any disclaimer, the term of this patent is extended or adjusted under 35 U.S.C. 154(b) by 0 days.

(21) Appl. No.: 14/831,291

(22) Filed: Aug. 20, 2015

(65) Prior Publication Data

US 2016/0004221 A1    Jan. 7, 2016

Related U.S. Application Data

(63) Continuation-in-part of application No. 14/484,060, filed on Sep. 11, 2014, now abandoned, and a
(Continued)

(51) Int. Cl.
| | |
|---|---|
| *G03H 1/22* | (2006.01) |
| *G03H 1/26* | (2006.01) |
| *G11B 7/0065* | (2006.01) |
| *G11B 20/10* | (2006.01) |

(52) U.S. Cl.
CPC ......... *G03H 1/2645* (2013.01); *G03H 1/2202* (2013.01); *G03H 1/2286* (2013.01);
(Continued)

(58) Field of Classification Search
CPC .. G03H 1/2645; G03H 1/2286; G03H 1/2249; G03H 1/2202–1/2205;
(Continued)

(56) References Cited

U.S. PATENT DOCUMENTS

| | | | |
|---|---|---|---|
| 5,805,316 A | 9/1998 | Shinoda et al. | |
| 7,623,279 B1 * | 11/2009 | Ayres | G06K 9/745 |
| | | | 359/1 |

(Continued)

FOREIGN PATENT DOCUMENTS

EP    WO2010/136341 A1    12/2010

OTHER PUBLICATIONS

Curtis et al (Holographic Data Storage—From Therory to Practical Systems, John Wiley & Sons, 2010, Section 12.3.2).*

*Primary Examiner* — Stephone B Allen
*Assistant Examiner* — Jyotsna Dabbi

(57) ABSTRACT

Methods and devices for coherent holographic data channel techniques. Coherent techniques for data detection generally include homodyne and heterodyne detection. Techniques for quadrature homodyne detection, resampling quadrature homodyne detection, n-rature homodyne detection, and spatial wavefront demodulation. Coherent detection techniques in turn enable coherent channel modulation techniques such as phase modulation (including binary phase shift keying, or BPSK; phase quadrature holographic multiplexing, or QPSK; and quadrature amplitude modulation, or QAM). Coherent detection may also enable or improve the performance of other channel techniques such as partial response maximum likelihood (PRML), the various classes of extended PRML, and of noise-predictive maximum likelihood (NPML) detection.

25 Claims, 29 Drawing Sheets

Related U.S. Application Data continuation of application No. PCT/US2015/028356, filed on Apr. 29, 2015.

(60) Provisional application No. 61/876,725, filed on Sep. 11, 2013, provisional application No. 61/941,974, filed on Feb. 19, 2014, provisional application No. 61/986,083, filed on Apr. 29, 2014.

(52) U.S. Cl.
CPC ...... *G11B 7/0065* (2013.01); *G11B 20/10268* (2013.01); *G03H 2001/2244* (2013.01); *G03H 2001/2675* (2013.01)

(58) Field of Classification Search
CPC .......... G03H 1/22; G03H 1/26; G03H 1/2289; G03H 2001/2675; G03H 1/2244; G03H 1/2207; G03H 2001/2605–2001/262; G11B 7/0065; G11B 20/10268
USPC ................................................ 359/22, 30–32
See application file for complete search history.

(56) References Cited

U.S. PATENT DOCUMENTS

| | | |
|---|---|---|
| 8,233,205 B2 | 7/2012 | Ayres |
| 2006/0111051 A1* | 5/2006 | Barink ................. G06K 7/0008 455/70 |
| 2012/0026856 A1 | 2/2012 | Shimada et al. |
| 2013/0343171 A1* | 12/2013 | Nakamura ........... G11B 7/0065 369/103 |

* cited by examiner

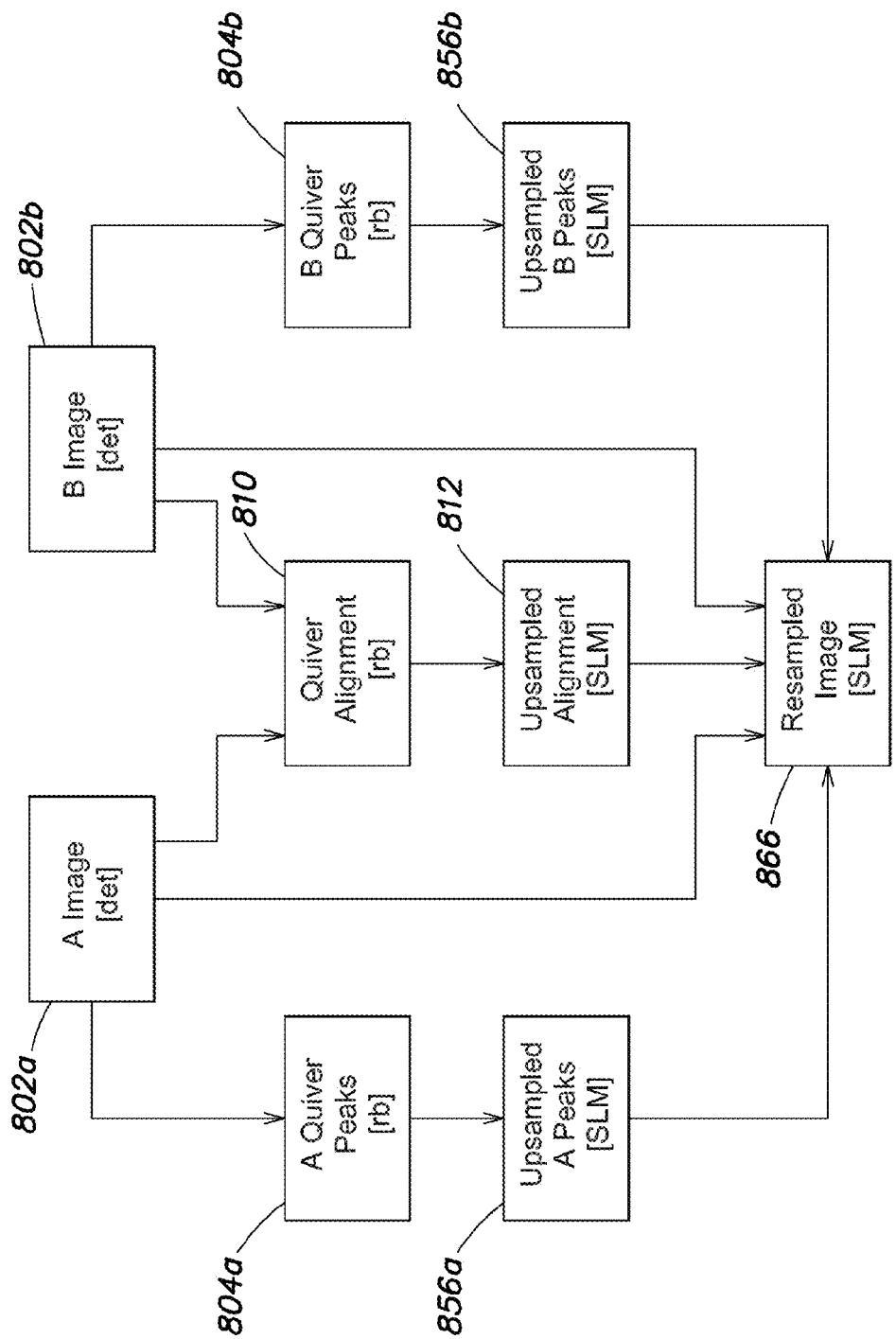

METHODS AND APPARATUS FOR COHERENT HOLOGRAPHIC DATA CHANNELS

CROSS-REFERENCE TO RELATED PATENT APPLICATIONS

This application is a continuation of, and claims priority from, co-pending PCT Application No. PCT/US2015/028356, filed Apr. 29, 2015 and entitled "Methods and Apparatus for Coherent Holographic Data Channels," which claims priority to U.S. Application No. 61/986,083, filed Apr. 29, 2014, and entitled "N-rature Homodyne Detection." The above applications are incorporated herein by reference, in their entireties.

This application is also a continuation-in-part of, and claims priority from, co-pending U.S. application Ser. No. 14/484,060, filed Sep. 11, 2014 and entitled "Methods and Devices for Coherent Optical Data Detection and Coherent Data Channel Modulation," which claims priority from the following U.S. patent applications: U.S. Application No. 61/876,725, filed Sep. 11, 2013 and entitled "Multi-Terabyte Holographic Data Storage Systems; and U.S. Application No. 61/941,974, filed Feb. 19, 2014, and entitled "Reflective Holographic Storage Medium." The above applications are incorporated herein by reference, in their entireties.

BACKGROUND

Holographic Data Storage

Developers of information storage devices continue to seek increased storage capacity. As part of this development, memory systems employing holographic optical techniques, referred to as holographic memory systems, holographic storage systems, and holographic data storage systems, have been suggested as alternatives to conventional memory devices.

Holographic memory systems may read/write data to/from a photosensitive storage medium. When storing data, holographic memory system often record the data by storing a hologram of a 2-dimensional (2D) array, commonly referred to as a "page," where each element of the 2D array represents a single data bit. This type of system is often referred to as a "page-wise" memory system. Holographic memory systems may store the holograms as a pattern of varying refractive index and/or absorption imprinted into the storage medium.

Holographic systems may perform a data write (also referred to as a data record operation, data store operation, or write operation) by combining two coherent light beams, such as laser beams, at a particular location within the storage medium. Specifically, a data-encoded signal beam, also called a data beam, is combined with a reference light beam to create an interference pattern in the photosensitive storage medium. The interference pattern induces material alterations in the storage medium to form a hologram.

Holographically stored data may be retrieved from the holographic memory system by performing a read (or reconstruction) of the stored data. The read operation may be performed by projecting a reconstruction or probe beam into the storage medium at the same angle, wavelength, phase, position, etc., or compensated equivalents thereof, as the reference beam used to record the data. The hologram and the reference beam interact to reconstruct the signal beam.

The reconstructed signal beam (aka a reconstructed data beam) may then be detected by a power-sensitive detector and processed for delivery to an output device. The irradiance impinging on the detector can be written as:

$$I(x,y) = |E_S(x,y) + E_N(x,y)|^2$$

$$I(x,y) = |E_S|^2 + |E_N|^2 + 2|E_S||E_N|\cos\phi_{S-N}$$

where $E_S(x,y)$ and $E_N(x,y)$ are the scalar complex amplitudes of the holographic signal and the coherent optical noise, respectively. The relative phase difference between the two fields, $\phi_{S-N}$, is effectively random, so the cosine factor in the final term swings randomly between +1 and −1. This term, which has the signal multiplied by the noise rather than adding to it, is a limiting noise factor in the practical development of holographic data storage.

Direct detection has several limitations. First, since hologram diffraction efficiency is driven to the lowest possible level in order to maximize the number of pages that may be stored, the read signals may be weak and require long exposure times to detect. Secondly, the laser light used to perform the read-out may be necessarily coherent, thus optical noise sources such as scatter and ISI (intersymbol interference, or pixel-to-pixel crosstalk from blur) may mix coherently with the desired optical signal, reducing signal quality when compared to additive noise of the same power. As such, there may be a need to improve the signal level of the detected hologram and improve the signal to noise ratio (SNR).

Quadrature Homodyne Detection

One way to boost the SNR is to use homodyne detection. In homodyne detection, the reconstructed signal beam interferes with a coherent beam, known as a local oscillator (LO) or LO beam, at the detector to produce an interference pattern that represents a given data page stored in the holographic memory. The detector array produces a signal (e.g., a photocurrent) whose amplitude is proportional to the detected irradiance, which can be written as:

$$I_{homo} = |E_{LO} + E_S + E_N|^2$$

$$I_{homo} = |E_{LO}|^2 + |E_S|^2 + |E_N|^2 + 2|E_{LO}||E_S|\cos\phi_{LO-S} + 2|E_{LO}||E_N|\cos\phi_{LO-N} + 2|E_S||E_N|\cos\phi_{S-N}$$

where $E_{LO}$ is the complex amplitude of the LO. If the amplitude of the LO is much larger than the amplitude of the reconstructed signal beam, then the terms not involving $E_{LO}$ become negligible. This has the effect of amplifying the signal, eliminating nonlinear effects of coherent noise, and allowing the detection of phase as well as amplitude.

To reproduce the data page accurately, however, the LO should be optically phase-locked with the reconstructed data page signal in both time and space such that the LO constructively interferes with each and every data pixel in the hologram simultaneously. However, alignment tolerances, lens aberrations, wavelength and temperature sensitivities, and a host of other minute deviations from perfection may introduce small variations in the flatness of the "phase carrier" wavefront bearing the reconstructed data page. For binary modulation, the "phase carrier" wavefront may be defined as the wavefront of the data page had all pixels been in the 'one' state. Thus, successfully performing page-wide homodyne detection in such a manner may involve expensive, sophisticated adaptive optic elements and control algorithms in order to phase-match the local oscillator to the hologram (or vice versa). As such, performing homodyne detection is generally not practical in commercial holographic data storage systems.

Another approach to increasing the SNR of the reconstructed data page is quadrature homodyne detection as disclosed in U.S. Pat. No. 7,623,279, which is entitled "Method for holographic data retrieval by quadrature homodyne detection" and which has a filing date of Nov. 24, 2009. In quadrature homodyne detection, the reconstructed signal beam interferes with two versions of an imprecise local oscillator to produce a pair of interference patterns, e.g., one after another on the detector array. The two versions of the imprecise local oscillator are in quadrature, i.e., there is a 90-degree phase difference between them. As a result, the low-contrast areas in the interference pattern between the first version of imprecise local oscillator and the reconstructed signal beam appear as high-contrast areas in the interference pattern between the second version of imprecise local oscillator and the reconstructed signal beam. Similarly, the high-contrast areas in the interference pattern between the first version of imprecise local oscillator and the reconstructed signal beam appear as low-contrast areas in the interference pattern between the second version of imprecise local oscillator and the reconstructed signal beam. Combining the two interference patterns yields a completely high-contrast interference pattern that encodes all of the information in the reconstructed data page.

SUMMARY

The inventors have recognized that, despite its advantages over direct detection and conventional homodyne detection, quadrature homodyne detection has several disadvantages as well. In particular, quadrature homodyne detection yields an additive common intensity noise term that can reduce the signal-to-noise ratio (SNR) of the detected images. The inventors have also recognized that this common intensity noise term can be reduced, suppressed, or even completely eliminated by using a technique called "n-rature homodyne detection."

In one example of n-rature homodyne detection, a coherent light source, such as a laser, generates a beam of coherent light that is split into a probe beam and a local oscillator beam with a beam splitter. The probe beam illuminates at least one hologram in the holographic storage medium so as to generate at least one reconstructed signal beam, which represents at least some of the information stored in the holographic storage medium. The reconstructed signal beam interferes with the local oscillator beam to produce a plurality of spatial interference patterns, each of which is imaged by at least one detector to form a respective image in a plurality of images. (For example, the spatial interference patterns can be detected in series with a single detector or in parallel with multiple detectors, depending on whether there is a single reconstructed signal beam/local oscillator beam pair or multiple pairs.)

The resulting plurality of spatial interference patterns comprises (i) a first spatial interference pattern generated by interference of the reconstructed signal beam with the local oscillator beam at a first phase difference between the at least one reconstructed signal beam and the at least one local oscillator beam and (ii) a second spatial interference pattern generated by interference of the reconstructed signal beam with the local oscillator beam at a second phase difference between the reconstructed signal beam and the local oscillator beam. The first and second phase differences can be implemented with one or more phase retarders in the path of the reconstructed signal beam and/or the path of the local oscillator beam. The first and second phase differences are selected so as to substantially cancel common intensity noise in a representation of the information in the hologram. This representation can be generated by a processor coupled to the detector.

In another embodiment, the probe beam illuminates an in-phase hologram and a quadrature hologram in the holographic storage medium so as to generate at least one reconstructed signal beam that represents both the in-phase hologram and the quadrature hologram. The reconstructed signal beam interferes with at least one local oscillator beam to produce at least three spatial interference patterns, each of which is detected by a detector. A processor coupled to the detector forms a first representation and a second representation based on the at least three spatial interference patterns. The first representation and the second representation are analogous to $\tilde{I}_A$ and $\tilde{I}_B$, respectively, described below in a Combining N-Rature Homodyne Detected Images section. The first and second representations can be referred to collectively as a quadrature image pair.

In yet another embodiment, the probe beam illuminates the holographic storage medium with at least one probe beam so as to generate at least one reconstructed signal beam that represents at least some information stored in the holographic storage medium. The reconstructed signal beam interferes with at least one local oscillator beam to produce a first interference pattern, which a detector senses as described above and below. For m=2 . . . n, where n is an integer greater than 2, a phase retarder increments (or decrements) a phase difference between the local oscillator beam and the reconstructed signal beam by about $2\pi/n$ modulo $2\pi$. For each phase difference, the reconstructed signal beam interferes with the local oscillator beam so as to produce an mth interference pattern. The detector senses each of these interference patterns.

In still another embodiment, the probe beam illuminates the holographic storage medium with at least one probe beam so as to generate at least one reconstructed signal beam that represents at least some information stored in the holographic storage medium. A detector senses a plurality of spatial interference patterns resulting from interference of the reconstructed signal beam with at least one local oscillator beam. A processor coupled to the detector demodulates a spatial wavefront modulation representing a misalignment of the local oscillator beam's wavefront with respect to the reconstructed signal beam's wavefront from at least one of these spatial interference patterns. The processor also generates a representation of the information retrieved from the hologram based on the spatial interference patterns.

In a further embodiment, the probe beam illuminating the holographic storage medium with at least one probe beam so as to generate at least one reconstructed signal beam that represents at least some information stored in the holographic storage medium. A detector senses a plurality of spatial interference patterns resulting from interference of the reconstructed signal beam with at least one local oscillator beam. A processor operably coupled to the detector generates a representation of the information stored in the hologram based on the spatial interference patterns. The processor also removes non-signal terms from the representation based on the image of the at least one local oscillator.

In still a further embodiment, the probe beam illuminates the holographic storage medium with at least one probe beam so as to generate at least one reconstructed signal beam that represents at least some information stored in the holographic storage medium. A detector acquires at least one image of interference between the reconstructed signal beam and a local oscillator beam. A processor coupled to the detector compares a first portion of the image to a reserved block in the hologram. The processor upsamples the resulting comparison to a spatial resolution of the information stored in the hologram so as to generate an upsampled comparison. And the processor resamples the image at the spatial resolution of the information stored in the hologram based on the upsampled comparison.

In still another embodiment, the probe beam illuminates the holographic storage medium with at least one probe beam so as to generate at least one reconstructed signal beam that represents at least some information stored in the holographic storage medium. A detector acquires at least one image of interference between the reconstructed signal beam and a local oscillator beam. A processor coupled to the detector generates a representation of the information stored in the hologram based on the image, estimates misfocus in the representation, and compensates the misfocus in the representation.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8B is a flow diagram that illustrates a second process for resampling coherently detected images.

DETAILED DESCRIPTION

Figure 1A:
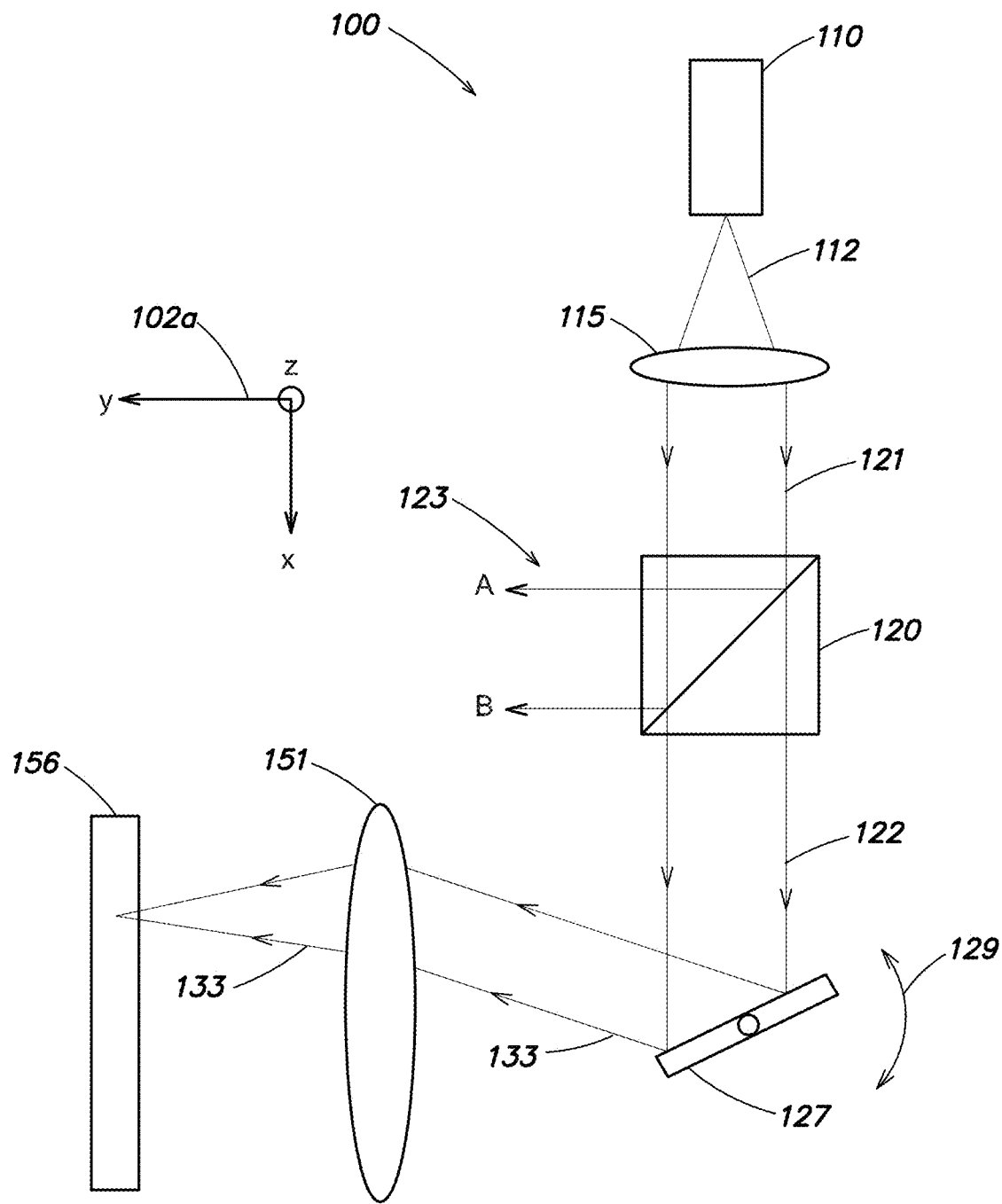
FIGS. 1A-1C illustrate a monocular system for holographic data storage using coherent channel modulation (e.g., phase-multiplexed holography) and/or n-rature homodyne detection.

A holographic storage medium can record holograms that encode variations in the phase and/or amplitude of the field of an incident optical signal beam. For instance, a holographic storage medium can record information encoded on an optical carrier using phase shift keying (PSK) as a hologram. It can also record information encoded on an optical carrier using both phase and amplitude modulation, e.g., using quadrature amplitude modulation (QAM). Recording information encoded partially or completely in the phase of the signal beam (e.g., using PSK, QAM, etc.) is referred to herein as "coherent channel modulation." And multiplexing holograms in the holographic storage medium by utilizing both dimensions of the complex phase plane (e.g., as in QPSK and QAM) is referred to herein as "phase-multiplexed holography."

Combining coherent channel modulation and/or phase multiplexing with other holographic multiplexing techniques, including angle multiplexing, spatial multiplexing, and/or polytopic multiplexing, offers several advantages over other approaches to holographic data storage. First, phase multiplexing increases the storage density of the holographic storage medium. Second, PSK modulation may reduce or eliminate the DC component in the reconstructed signal beam. Third, PSK may also reduce or eliminate cross-talk caused by gratings formed between pixels in the holographic recording medium (aka intra-signal modulation).

To take full advantage of coherent channel modulation and/or phase multiplexing, the recorded holograms are typically read using a coherent channel technique, such as homodyne detection. Conventional homodyne detection requires a local oscillator that is locked, to within a fraction of an optical wavelength, in temporal and spatial phase to the reconstructed signal beam. Unfortunately, achieving this degree of phase stability can be impractical under normal operating conditions. Quadrature homodyne detection does not require precise spatial phase locking, but is subject to additive common intensity noise as explained above and below.

Fortunately, n-rature homodyne detection operates with relatively imprecise spatial phase locking and suppresses or eliminates the common intensity noise that affects quadrature homodyne detection. In n-rature homodyne detection, a local oscillator interferes with the reconstructed signal beam to produce the first of n>2 interference patterns, each of which is sensed by a detector. The modulo $2\pi$ phase difference between the local oscillator and the reconstructed signal beam is changed by $2\pi/n$, then the detector senses the second interference pattern, and so on until all n images have been detected. The detected images can be combined, e.g., into in-phase and quadrature images representing in-phase and quadrature holograms, then processed to remove undesired spatial wavefront modulation caused by misalignment of the components in the holographic storage system, aberrations, etc. The data stored in the holograms can be retrieved from the demodulated images.

Compared to direct detection, coherent detection offers a higher SNR, higher sensitivity, and/or lower bit-error rate (BER) at a given optical power level. Moreover, the gain can be adjusted by varying the amplitude of the local oscillator. And unlike direct detection, it can be used to retrieve phase-modulated data as well as amplitude-modulated data.

Coherent Channel Modulation for Holographic Data Storage

Figure 1B:
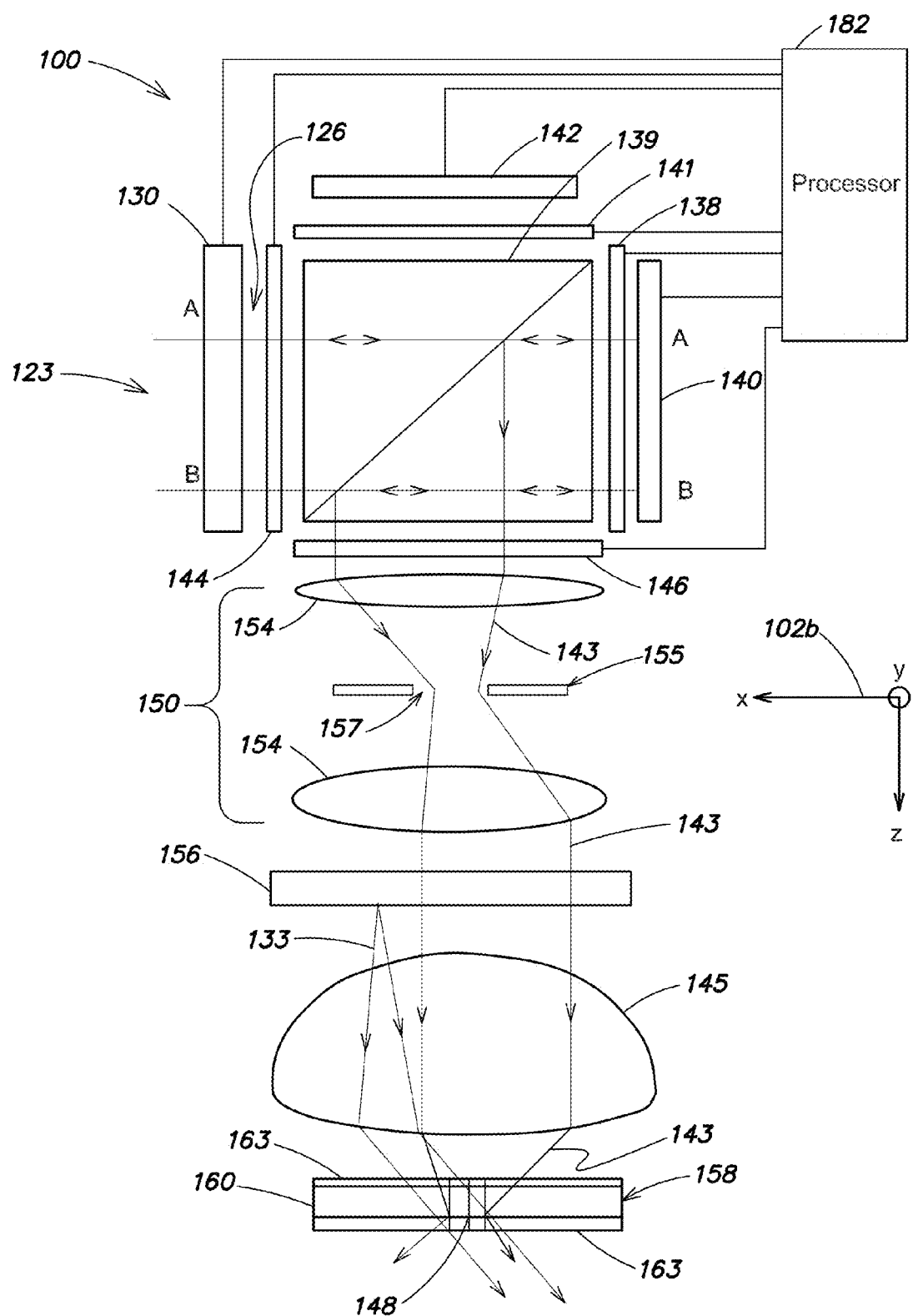
Figure 1C:
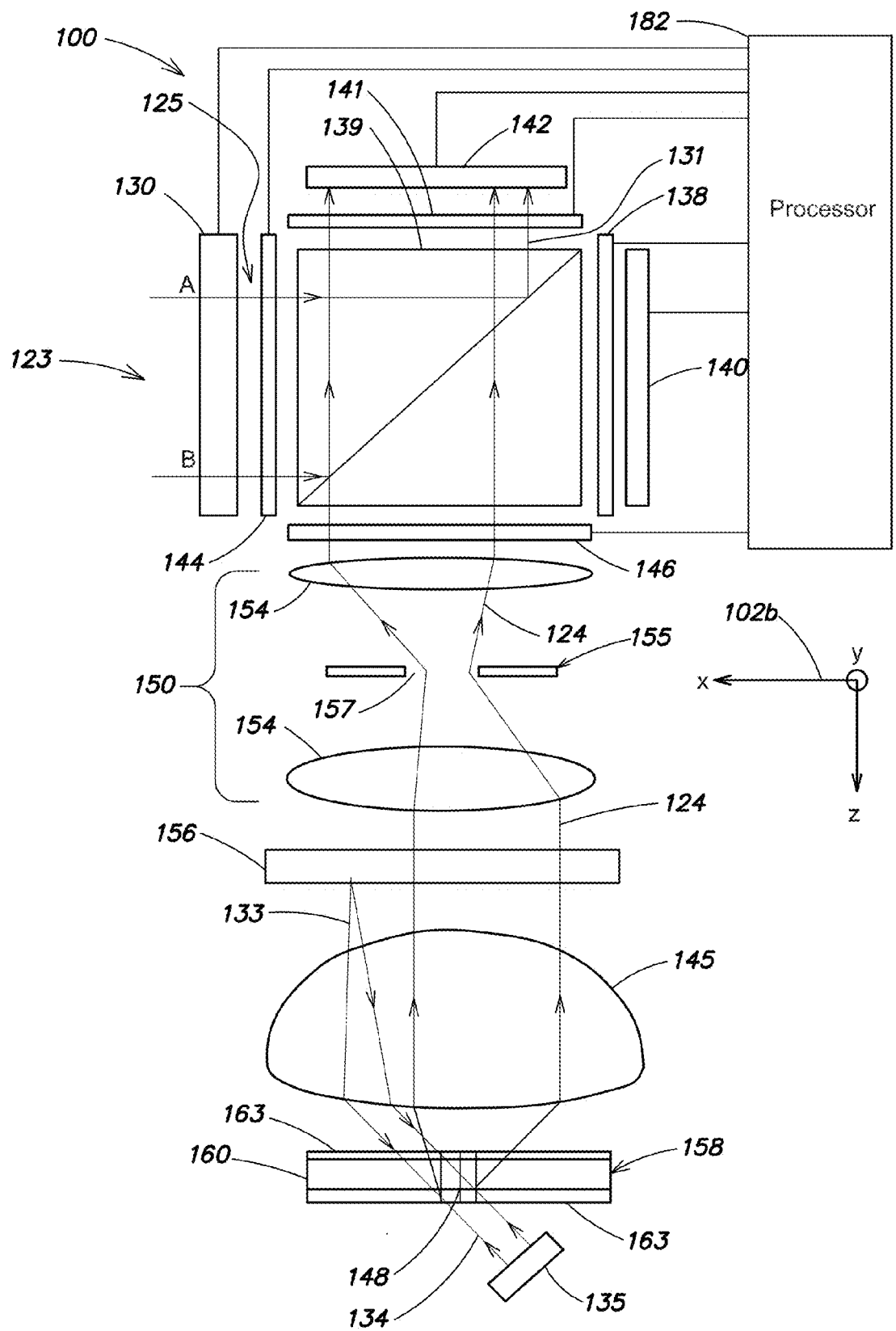

FIGS. 1A-1C illustrate a holographic data storage system 100 configured to perform coherent channel modulation for holographic data storage and/or n-rature homodyne detection for reading holographically stored data. This holographic system 100 includes a monocular architecture, wherein a signal beam 143 and reference beam 133 share a common objective lens 145. The monocular architecture is described in detail in U.S. Pat. No. 7,742,209, entitled "Monocular Holographic Data Storage System Architecture." Some other embodiments of holographic systems adapted to perform methods of optical data recording, detection, and channel modulation, do not include monocular architecture. The holographic system 100 is adapted to perform angle multiplexing or polytopic multiplexing, separately or in combination. Polytopic multiplexing is familiar to persons skilled in the art, and is described in detail in U.S. Pat. No. 7,092,133, entitled "Polytopic Multiplex Holography." This embodiment can also perform dynamic aperture holography, which is described in detail in U.S. Patent Application Publication No. 2015/0062675 entitled "Dynamic Aperture Holography."

As shown in FIG. 1A, the system 100 comprises light source 110 configured to produce light beam 112, which passes through collimating lens 115 to produce a collimated light beam 121. The light source 110 may be, e.g., an external cavity, single-mode, tunable diode laser having an output greater than 40 mW. Wavelength tuning is accomplished using a transmissive grating in an external cavity configuration, resulting in a tuning range of 402-408 nm. Mode stability is accomplished using a closed loop locking algorithm that utilizes current and wavelength tuning to give a minimum contrast ratio of 0.75 (0-1 scale) of fringes viewed in a shearing interferometer. The laser light source 110 is engineered and calibrated to hold the following specifications over a temperature range from 15° C. to 35° C.: available output power is greater than 40 mW over the tuning range of 402-408 nm; absolute wavelength accuracy is ±150 pm P-P; beam size=1.7 mm±0.1 mm; aspect ratio=1±0.1; beam pointing stability is less than 1 arcmin, <25 arcsec nominal; beam centering drift is less than 50 µm; wavefront of the laser output is less than 0.050 RMS over a 1.5 mm diameter; collimation is ±0.015 waves (Zernike Focus) over a 1.5 mm diameter. Some embodiments comprise other light sources, including but not limited to gas lasers, dye lasers, diode lasers without external cavities, and non-laser light sources.

The system 100 further includes a beam splitter 120 that splits the collimated light beam 121 into a nascent reference/probe beam 122 and a nascent signal/local oscillator beam 123. The nascent signal/local oscillator beam 123 is so-named because it can, depending on configuration of the system 100, be used to generate either a nascent signal beam 126 for recording a hologram, or a local oscillator 125 for (n-rature) homodyne detection. The nascent reference/probe beam 122 is so-named because it can, depending on configuration of the system 100, be used to generate a reference beam 133 for recording a hologram or a probe beam 134 for generating a reconstructed signal beam 124.

In operation, the nascent reference/probe beam 122 propagates to beam directing device 127, whereupon it is directed as a reference beam 133 through reference beam converging lens 151. The beam directing device 127 typically, but not necessarily, comprises a mirror galvanometer configured to rotate through a defined range, the rotation being depicted by rotation arrow 129. The beam directing device 127 is thus adapted to direct the reference beam 133 through the reference beam converging lens 151 at various angles.

The reference beam 133 is focused onto a reflecting beveled edge of a knife-edge mirror 156 by the reference beam converging lens 151, whereupon the knife-edge mirror 156 reflects the reference beam 133 and thereby directs the beam 133 through the objective lens 145 and into the recording medium 158. When the holographic system 100 resides in read mode (illustrated in FIG. 1C), conjugating mirror 135 is oriented to reflect reference beam 133 back through the hologram 148 to generate a reconstructed signal beam 124. Conversely, in record mode (illustrated in FIG. 1B), conjugating mirror 135 is rotated out of the beam path in order to avoid reflecting probe beam 134 back through the hologram 148. Accordingly, the conjugating mirror 135 and probe beam 134 are illustrated in FIG. 1C (read mode) but not in FIG. 1B (record mode). (Alternatively, the system 100 may use a stationary conjugator with a lens, aspheric mirror, and a shutter instead of a conjugating mirror that rotates into and out of the beam path.) Record mode is sometimes referred to as write mode.

FIGS. 1B and 1C show the objective lens 145 and recording medium 158. Where it propagates from the objective lens 145 into the recording medium 158, the reference beam 133 is a plane wave reference beam. The knife-edge mirror 156 comprises an aluminum bar that is 500 µm thick (along the y axis in FIGS. 1A-1C) and 10 mm tall (along the z axis). The reflecting beveled edge is highly polished in order to reflect the reference beam 133, which is typically incident upon the reflecting beveled edge at 45.0 degrees. Accordingly, the reflecting beveled edge redirects the reference beam 133 by 90.0 degrees, from along the y axis to along the z axis. Persons skilled in the art will recognize that axes x and y reside in the plane of the page in FIG. 1A, as shown by first coordinate legend 102a, whereas axes x and z reside in the plane of the page in FIGS. 1B and 1C, as shown by second coordinate legend 102b. The reference beam 133 therefore projects onto the knife-edge mirror 156 from out front of the plane of the page in FIGS. 1B and 1C, and is thus not shown in FIGS. 1B and 1C prior to reflecting off the knife-edge mirror 156.

As illustrated in FIGS. 1B and 1C, nascent signal/local oscillator beam 123 is directed through variable phase retarder 130. The variable phase retarder 130 receives the nascent signal beam 123, which is typically, but not necessarily, p-polarized, and directs the nascent signal/local oscillator beam 123 through a first switchable half wave plate ($1^{st}$ SHWP) 144. Record mode and read mode configurations for the holographic system 100 are described below with the nascent signal/local oscillator beam 123 being p-polarized; the $1^{st}$ SHWP 144 is configured to transmit p-polarized light toward the polarizing beam splitter (PBS) 139 in record mode and configured to transmit s-polarized light toward the PBS 139 in read mode; and a $2^{nd}$ SHWP 146 is configured to transmit s-polarized light in record mode and p-polarized light in read mode. However, persons skilled in the art recognize that the configurations illustrated in figures and accompanying text are merely exemplary, and other configurations within the knowledge of persons skilled in the art can embody methods and devices for optical data recording, detection, and channel modulation as disclosed herein.

Monocular Holographic Data Storage—Record Mode

FIG. 1B illustrates the monocular holographic system 100 in record mode, wherein the system 100 is configured to record a hologram in recording medium 158. So configured, the $1^{st}$ SHWP 144 is configured to transmit p-polarized light and the nascent signal/local oscillator beam 123 thus emerges p-polarized, whereupon it can be referred to as a nascent signal beam 126 because it is destined to become a signal beam 143, not a local oscillator 125. If the nascent signal/local oscillator beam 123 is destined to become the signal beam 143 and is phase adjusted by the variable phase retarder 130, it is expedient to state that the signal beam 143 has its phase adjusted by the variable phase retarder 130.

The polarizing beam splitter (PBS) 139 is configured to allow the p-polarized nascent signal beam 126 to pass through to a data encoding element 140. The data encoding element, or spatial light modulator (SLM) 140, is illuminated by the nascent signal beam 126, into which a data page is embedded to generate a signal beam 143. The SLM 140 can be implemented as a Mohave model reflective, ferroelectric liquid crystal based SLM comprising 1216×1216 pixels operating in binary mode. The pixel pitch is 10.7 µm×10.7 µm and the pixels occupy an area of 13.0 mm×13.0 mm. (The Mohave SLM was formerly manufactured by Displaytech.) Other embodiments comprise various SLMs including, but not limited to, transmissive SLMs, other reflective SLMs, and gray-scale phase SLMs. In some embodiments, a data encoding element comprises other means for encoding data in a signal beam, the other means including, but not limited to, a data mask.

In binary amplitude shift keying (BASK) mode, the SLM pixels typically operate by maintaining or changing polarization of reflected light in response to voltage applied to the pixels, in order to create light and dark pixels. Typically, an SLM pixel in a dark state receives p-polarized light of the nascent signal beam 126 and reflects p-polarized light, which passes back through the PBS 139 along the same transit path (but in the opposite direction) as the incoming nascent signal beam 126. Thus light from the dark state pixels is directed away from the recording medium 258, and the dark state pixels are "dark" to the medium 158. Conversely, an SLM pixel in a light state typically rotates polarization of incoming p-polarized light to reflect s-polarized light that is subsequently reflected by the PBS 139 on a path to the recording medium 158. Thus light state pixels are "light" to the medium 158. Half wave plate 138 may be removed for operating the holography system 100 in ASK mode.

For recording in PSK mode, half wave plate 138 typically resides between the SLM 140 and the PBS 139. Accordingly, the SLM 140, which in the absence of half wave plate 138 is configured for binary intensity modulation, is adapted to binary phase modulation. In order to effect phase modulation, the half wave plate 138 is installed in front of the SLM 140 as illustrated, oriented at 12.25°. Accordingly, the incoming nascent signal beam 126, arriving from the PBS with a polarization of 0°, is rotated to either +45° or −45° depending on whether an SLM pixel's optic axis is 0° or 45°, and both polarization states are transmitted by the PBS with equal intensity. Where the SLM pixel optic axis is at 0°, the signal beam 143 has a phase difference of 180° compared to where the SLM pixel optic axis is at 45°, and the SLM pixels are thus phase modulated.

The holographic memory system 100 may also record data by modulating the phase and the amplitude of the incoming nascent signal beam 126 with the SLM 140. In 16-quadrature amplitude modulation (QAM) mode, for example, each SLM pixel may impart a respective portion of the incoming nascent signal beam 126 with one of four amplitude states and one of four phase states distributed across the I-Q plane. This yields a signal beam 143 that encodes the data page as 4-bit symbols, which can be recorded and read from the holographic storage medium 158. Other suitable phase and amplitude modulation techniques include partial response maximum likelihood signaling, which is explained in greater detail below.

After being modulated by data encoding element 140 to contain a pixel image, the signal beam of the system 100 is typically directed by the PBS 139 through a second switchable half wave plate ($2^{nd}$ SHWP) 146, which is configured to transmit s-polarized light when the holographic system 100 is in record mode. Accordingly, the signal beam 143 emerges from the $2^{nd}$ SHWP s-polarized. The signal beam 143 subsequently propagates through a 4F imaging assembly 150 comprising converging lenses 154. An optical filter, shown in FIGS. 1B and 1C as an aperture plate 155, is disposed at a Fourier plane, with the signal beam 143 passing through an aperture 157 of the plate 155. In other embodiments, the optical filter can be an angle filter, including but not limited to, a multi-layer dielectric coating. The signal beam 143 emerges from the first 4F imaging assembly 150 and subsequently propagates past the knife-edge mirror 156, through objective lens 145.

Because the knife-edge mirror 156 resides in a path of signal beam 143, the mirror 156 obscures some of the signal beam 143. Accordingly, the knife-edge mirror 156 causes some occlusion of the signal beam 143 as the beam 143 propagates past the mirror 156. However, because the knife-edge mirror 156 is typically only 500 μm thick (along the y axis), it typically occludes only 16 rows of pixels in the signal beam 143, and signal beam degradation is thus relatively minor. In the system 100, 16 to 32 rows of pixels are rendered inactive in order to ensure that pixels occluded by the knife-edge mirror contain no data. In addition, the occluded pixels can be omitted from the SLM data format so the occluded pixels contain no data. Omission of the pixels results in relatively small loss of data recording capacity.

After passing the knife-edge mirror 156, the signal beam 143 passes through the objective lens 145, which directs the signal beam 143 into recording medium 158. The recording medium typically comprises a photosensitive recording layer 160 sandwiched between two substrate structures 163. An interference pattern is created where the signal beam 143 and the reference beam 133 interfere with each other. Where the interference pattern resides within the photosensitive recording layer 160 of the recording medium 158, a hologram 148 is recorded. The substrate structures 163 typically comprise Zeonor® polyolefin thermoplastic, and the photosensitive recording layer typically includes photosensitive monomers in a polymeric matrix. Variations comprise substrates including, but not limited to sapphire, polycarbonate, other polymers, or glass. Suitable recording mediums are well known to persons of ordinary skill in the art, and embodiments of recording mediums are disclosed in U.S. Pat. Nos. 8,133,639 and 8,323,854. Variations of recording medium include, but are not limited to, photorefractive crystals and film containing dispersed silver halide particles. As used in this specification and appended claims, a recording medium is sometimes referred to as a photosensitive recording medium, a photosensitive storage medium, a storage medium, a photopolymer medium, or a medium.

Monocular Holographic Data Storage—Read Mode

FIG. 1C illustrates the holographic system 100 in read mode, wherein the system 100 is configured to retrieve data by generating a reconstructed signal beam 124 from hologram 148. With the holographic system 100 so configured, the $1^{st}$ SHWP 144 is configured to transmit s-polarized light and local oscillator 125 therefore emerges from the $1^{st}$ SWHP with the local oscillator 125 polarization rotated 90° compared to the nascent signal/local oscillator beam 123. Accordingly, the local oscillator is s-polarized and the PBS 139 is configured to reflect the s-polarized local oscillator 125 toward analyzer 141 and detector 142.

For purposes of the holographic system 100, where the nascent signal/local oscillator beam 123 emerges s-polarized from the $1^{st}$ SHWP, and is thus oriented to be reflected by the PBS 139 toward the detector 142, the s-polarized beam that emerges from the $1^{st}$ SHWP is considered the local oscillator 125. If the nascent signal/local oscillator beam 123 is destined to become the local oscillator 125 and is phase adjusted by the variable phase retarder 130, it is expedient to state that the local oscillator 125 has its phase adjusted by the variable phase retarder 130.

When performing n-rature homodyne detection, the variable phase retarder 130 retards the phase of the local oscillator 125 with respect to the phase of the reconstructed signal beam 124 by an amount equal to about 2πm/n, where n>2 is the total number of images being acquired of a particular hologram and m is the index of the current image being detected. For n=4, for example, the system 100 collects four images at relative phase differences of π/2, π, 3π/2, and 2π. These phase differences may be determined and selected by a processor (not shown) operably coupled to the variable phase retarder 130 and/or to the detector 142.

The variable phase retarder 130 can be implemented as one or more components in a transmissive geometry, as shown in FIGS. 1B and 1C; as one or more components in a reflective geometry; or as a suitable combination of reflective and transmissive components. These components can be arranged in the path of the local oscillator, as shown in FIGS. 1B and 1C; in the path of the probe beam; in the path of the reconstructed signal beam; or in any combination of these paths. For instance, the transmissive variable phase retarder 130 shown in FIGS. 1B and 1C may be implemented as a liquid crystal phase modulator (e.g., a nematic liquid crystal device), two or more cascaded binary phase retarders, or a bulk electro-optic modulator whose refractive index is varied with a voltage applied across an electro-optic crystal. And a reflective variable phase retarder 130 can be implemented as a mirror mounted on a piezo-electric element that moves the mirrors (and accordingly increases or decreases the optical path length) in response to an applied voltage. This voltage may be selected to provide the desired phase difference between the local oscillator 125 and the reconstructed signal beam 124.

The reconstructed signal beam 124 is created by illuminating hologram 148 with probe beam 134. The reconstructed signal beam 124 propagates part way through the holographic system 100 in a direction opposite that of the signal beam 143. The $2^{nd}$ SHWP 146 is configured to transmit p-polarized light when the holographic system 100 is in read mode. Accordingly, the s-polarized reconstructed signal beam has its polarization rotated 90° by the $2^{nd}$ SHWP 146 to emerge p-polarized. The p-polarized reconstructed signal beam 124 is thus oriented to pass through the PBS 139 and combine with the local oscillator 125 to form a combined beam 131. Combined beam 131 thus includes the p-polarized reconstructed signal beam and the s-polarized local oscillator 125. Analyzer 141 acts on the combined beam 131 to modulate relative strengths of the reconstructed signal beam 124 and the local oscillator 125 that make up the combined beam 131. The analyzer 141 can be a polarizer that can be oriented to pass more or less light depending on polarization of the light.

Typically, but not necessarily, the intensity of the local oscillator 125 is about 100 times intensity of the reconstructed signal beam 124, and the analyzer 141 is oriented to transmit about 16.7% of the local oscillator (s-polarized) portion of the combined beam 131 and about 83.3% of the reconstructed signal beam (p-polarized) portion of the combined beam 131. Accordingly, intensity of the local oscillator portion of the combined beam is about 20 times the intensity of the reconstructed signal beam portion, upon detection of the combined beam 131 by the detector 142. Detection of the combined beam 131 by the detector typically includes detecting an interference pattern created by interference of the local oscillator portion of the combined beam with the reconstructed signal beam portion of the combined beam.

In some embodiments, the analyzer 141 transmits different proportions of the local oscillator and reconstructed signal beam portions of the combined beam 131. For example, in a variation, the analyzer is oriented to transmit 45% to 98% of the reconstructed signal beam portion and 55% to 2% of the local oscillator portion of the combined beam. In another variation, the analyzer is oriented to transmit 60% to 93% of the reconstructed signal beam portion and 40% to 7% of the local oscillator portion of the combined beam. In yet another variation, the analyzer is oriented to transmit 75% to 90% of the reconstructed signal beam portion and 25% to 10% of the local oscillator portion of the combined beam. In some embodiments, the analyzer can be omitted; for example, if a non-polarizing beam splitter is used instead of a polarizing beam splitter and the local oscillator and reconstructed signal beam are in the same polarization state so that they can interfere with each other.

The holographic system 100 enables practice of both phase quadrature multiplexing and homodyne detection, by virtue of configurations allowing the phase retarder to adjust the phase of both signal beams and local oscillator beams. The system 100 is further adapted to recording in both ASK and PSK modes, by using the same SLM 140 either with or without half wave plate 138, respectively. In ASK mode, for example, the half wave plate 138 can be rotated so as not to transform the incident beam's polarization state.

However, the holographic system 100 is but one exemplary embodiment of components adapted to optical data recording, detection, and data channel modulation according to the present invention. Persons skilled in the art will recognize that other arrangements of light sources, data encoding elements, detectors, half wave plates, polarizing beam splitters and other system components can be devised that enable optical data recording, detection, and channel modulation, including recording and retrieval of holograms using ASK, PSK, phase quadrature multiplexing, and homodyne detection techniques described herein.

FIGS. 1B and 1C also show that the system 100 includes a controller or processor 182 that is operably coupled to the variable phase retarder 130; the SLM 140; and the SHWPs 144, and 146. The HWP 138 and analyzer 141 are typically, but not necessarily, passive optical elements placed in rotational mounts adapted to manual rotation. The processor 182 receives and can process data from the detector 142 according to the techniques disclosed herein. The processor 182 may also control the orientations of the SHWPs 144 and 146, e.g., to switch between record and read modes. And the processor 182 may control the phase modulation imparted on the local oscillator beam 125 via the variable phase retarder 130 so as to achieve the desired phase difference(s) between the local oscillator beam 125 and the reconstructed signal beam 124. In some embodiments, the processor 182 can also control the orientation of the analyzer 141 so as to vary the ratio of power in the local oscillator beam 125 to the power in the reconstructed signal beam 124.

Read-Only Holographic Data Storage System

Figure 2:
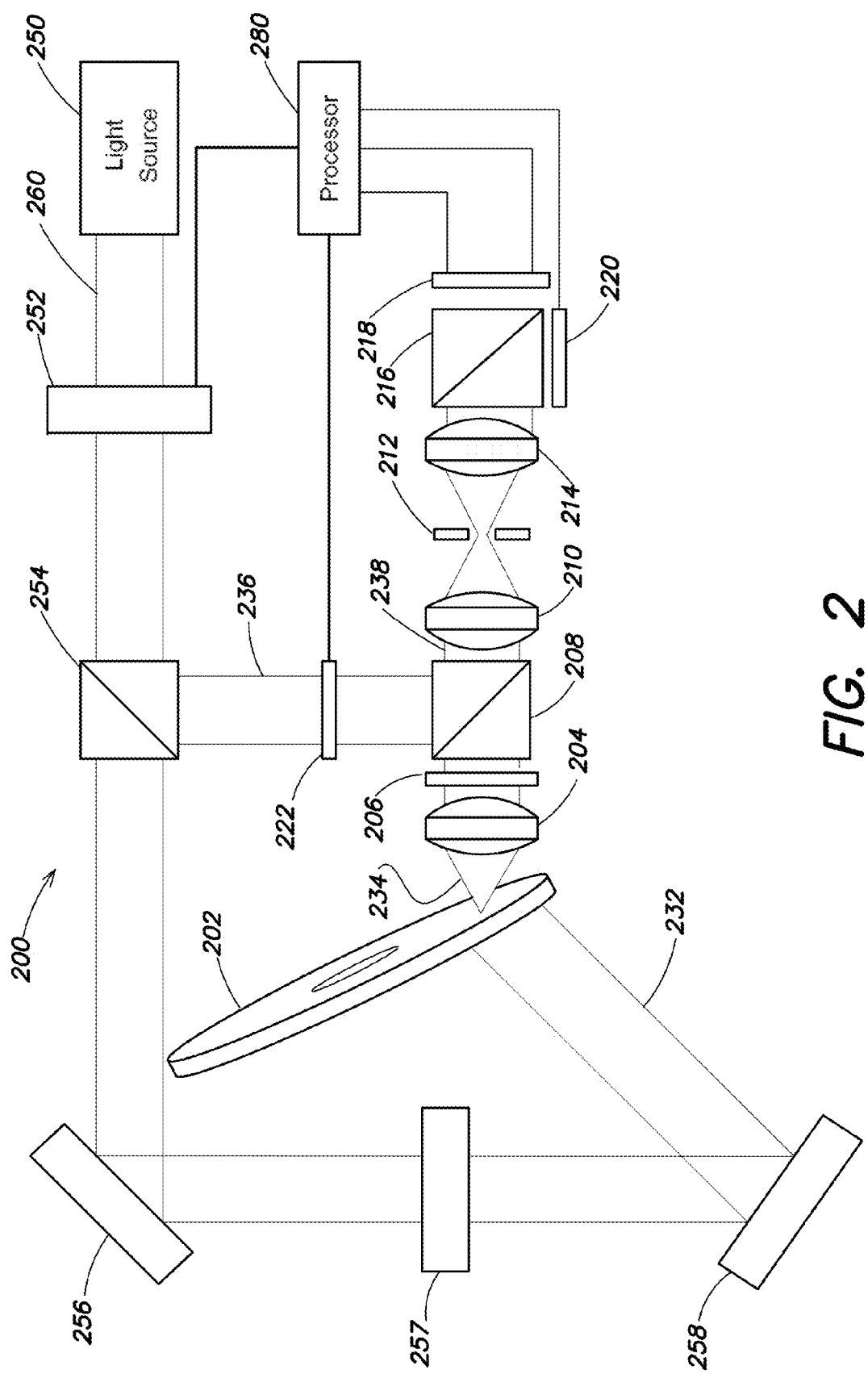
FIG. 2 illustrates a system for reading data from holographic data storage medium using n-rature homodyne detection.

FIG. 2 illustrates a read-only holographic memory system 200 that performs n-rature homodyne detection during reading operations. For purposes of simplification, only the components of the holographic memory system 200 in the light path between the storage medium 202 and the detector 220 are illustrated. In actual implementation, the holographic memory system 200 may include numerous other components, such as, for example, additional light sources, mirrors, additional beam splitters, etc. For example, the holographic memory system 200 may be employed in a holographic memory system such as disclosed in U.S. Patent Application Publication No. 2006/0281021 A1, entitled "Illuminative Treatment of Holographic Media" filed May 25, 2006, which is hereby incorporated by reference in its entirety.

As illustrated in FIG. 2, holographic memory system 200 may include a holographic storage medium 202, an objective lens 204, a half-wave plate (HWP) 206, a non-polarizing beam splitter (NPBS) 208, another lens 210, a polytopic aperture 212 or other optical filter, another lens 214, a polarizing beam splitter (PBS) 216, a spatial light modulator (SLM) 218, a detector 220, and a variable phase retarder 222. Additionally, holographic memory system 200 of FIG. 2 may further include a light source 250, an adjustable HWP 252, a second PBS 254, a mirror 256, a HWP 257, a galvo mirror 258, and a processor 280. The processor 280 may be a processor, such as, for example a commercially available microprocessor, and the variable phase retarder 222 may be device capable of phase shifting a light beam, such as, for example, a spatial light modulator (SLM), electro-optic modulator, or piezo-mounted mirror. Additionally, the combination of lens 210, polytopic aperture 212, and lens 214 may be referred to as a "4F relay."

In the embodiment shown in FIG. 2, holographic memory system 200 may store information encoded in the holographic storage medium 202 using a coherent channel modulation technique, such as phase shift keying (PSK), which involves storing digital data as either +1 bits and −1 bits. For instance, a +1 bit may be represented by a particular pixel of SLM 218 modulating the signal beam used in recording the hologram so that the signal beam at that particular pixel location has a particular phase (e.g., 0 degrees). Similarly, a −1 bit may be represented by a pixel of SLM 218 modulating the recording signal beam so that the signal beam is 180 degrees out of phase with the +1 pixels. In other words, there is a 180 degree phase difference between the +1 and −1 pixels. While this technique is exemplified as using only two phases (referred to as Binary PSK (BPSK)), in other embodiments, other PSK techniques may be used, such as, for example, quadrature PSK (QPSK), which involves using four phases. The holographic memory system 200 can also use amplitude shift keying (ASK), which involves modulating the amplitude of the SLM pixels; quadrature amplitude modulation (QAM), which involves modulating the amplitude and the phase of each SLM pixel to form multi-bit symbols; and partial response maximum likelihood (PRML), which involves recording the image of the SLM at an optical resolution insufficient to resolve individual SLM pixels, so that the reconstructed pixel images are overlapped in space (i.e., blurred together) in a controlled manner.

FIG. 2 also illustrates how to retrieve holographically stored data from the holographic storage medium 202 by performing a read (or reconstruction) of the stored data using n-rature homodyne detection. The read operation may be performed by projecting a probe beam 232 onto or into the storage medium 202 at an angle, wavelength, phase, position, etc., or compensated equivalents thereof based on the angle, wavelength, phase, position, etc., or compensated equivalents thereof of the reference beam used to record the data. The hologram and the reference beam interact to reconstruct the signal beam or a phase conjugate of the signal beam, depending on the interaction geometry. As is known to those of skill in the art, the reconstructed signal beam 234 may comprise the reconstructed data on a phase carrier. The reconstructed signal beam 234 may then pass through lens 204 and switchable HWP 206, which transforms the polarization state of the reconstructed signal beam 234 to control the path of the reconstructed signal beam 234 through the PBS 216. In the implementation shown in FIG. 2, the switchable HWP 206 is not necessary for read mode because the probe beam 232, reconstructed signal beam 234, and local oscillator 236 are s-polarized, which is the polarization state that propagates through the PBS 216 to the detector 220. The switchable HWP 206 changes the polarization state of light from the SLM 218 from p polarization to s polarization for recording, and could just as easily be placed elsewhere in the optical path.

Objective lens 204 may be, for example, any type of lens, such as those commercially available, or a custom lens, e.g., as disclosed in U.S. Pat. No. 7,532,374, which is incorporated herein by reference in its entirety. Exemplary lenses include, for example, high numerical aperture (NA) aspheric storage lenses. Lens 204 may also be located one focal length (i.e., the focal length of lens 204) from holographic storage medium 202 so that the storage medium is located at a Fourier plane of SLM 218. These lenses and their locations are exemplary and in other embodiments, including the monocular system shown in FIGS. 1A-1C, the arrangement of lenses and other optical components may be different. For example, one or more of the lenses may be positioned or selected such that the storage medium 202 is located at an image plane of SLM 218, or at an intermediate location that is neither a Fourier plane nor an image plane.

The reconstructed signal beam 234 may then be combined with a local oscillator (LO) beam 236 by NPBS 208. Local oscillator beam 236 may be, for example, a plane wave. Further, local oscillator beam 236 may be generated from a portion of the probe beam 232, so that local oscillator beam 236 is temporally coherent with the reconstructed signal beam 234. The local oscillator beam 236 is injected or introduced into the reconstructed object path so that it is collinear with and has the same polarization state as the reconstructed signal beam 234, although the local oscillator beam 236 need not have any special phase relationship to reconstructed signal beam 234. The power of the reflected local oscillator beam 236 may be set to some power level to effect or cause the desired amount of optical gain and dynamic signal range (e.g., 100 times the nominal power of the reconstructed signal beam). This may be accomplished by splitting off a portion of the main laser beam used for generating the probe beam 232 using a fixed or variable beamsplitter as readily understood in the art.

FIG. 2 includes a simplified illustration of a technique for generating local oscillator beam 236 and probe beam 232 using a light source 250, an adjustable HWP 252, a PBS 254, mirror 256, and a galvonometer mirror 258. Light source 250, which may be a laser such as is commonly used in holographic memory systems, generates a main laser beam 260 that propagates through HWP 252. The angle of the birefringent axes of HWP 252 may be adjusted, possibly in response to commands from processor 280, to modify the polarization of main laser beam 260 such that PBS 254 splits off a portion of main beam 256 for local oscillator beam 236. Setting the angle of the birefringent axes of HWP 252 controls the power level of local oscillator beam 236 relative to the power level of probe beam 232. The remaining portion of main laser beam 260 passes through PBS 254 and may be directed by mirror 256 and galvo mirror 258 to form reference beam 234.

Local oscillator beam 236 may pass through variable phase retarder 222 prior to being injected or introduced into the signal path where local oscillator beam 236 may be combined with reconstructed signal beam 234. Variable phase retarder 222 may be any type of device capable of changing the phase of local oscillator beam 236, such as, for example, a Nematic Liquid Crystal (NLC) variable phase retarder 222. For example, variable phase retarder 222 may be configured to switch between three or more states in which the active axis of the NLC material is electrically modulated to impart the desired phase differences (e.g., 0°-120°-240°; 0°-90°-180°-270°; and so on) between local oscillator beam 236 and reconstructed signal beam 234. Variable phase retarder 222 may switch between these states in response to signals from processor 280.

NPBS 208 combines the local oscillator beam 236 and reconstructed signal beam 234 to produce combined beam 238. NPBS 208 may include a partially reflective coating that allows 95% of light to pass through the NPBS 208 and 5% of light to be reflected. In such an example, 95% of reconstructed signal beam 234 will pass through NPBS 208 and 5% will be reflected away. Similarly, 95% of local oscillator beam 236 will pass through NPBS 208 while 5% of local oscillator beam 236 is reflected and combined with reconstructed signal beam 234. Thus, in this example, combined beam 238 comprises 95% of the reconstructed signal beam 234 and 5% of the local oscillator beam 236. Further, in this example, the portions of the local oscillator beam 236 (i.e., the portion passing through NPBS 208) and reconstructed signal beam 234 (i.e., the portion reflected by NPBS 208) not used for generating combined beam 238 may be passed to a device, such as, for example, a beam block for absorbing these unused portions of beams 234 and 236.

The combined beam 238 may then pass through lens 210 which focuses the combined beam 238. Lens 210 may be located, for example, so that its front focal plane is the back focal plane of lens 204. The focused combined beam 238 may then pass through polytopic aperture 212 which may be located, for example, 1 focal length from lens 210. Polytopic aperture 212 may be used to filter noise from combined beam 238. Combined beam 238 may then pass through lens 214, which may be located, for example, one focal length from polytopic aperture 214. Lens 214 may expand combined beam 238 so that beam 238 has a fixed diameter. Combined beam 238 may then enter PBS 216 which, because of the polarization of combined beam 238, directs combined beam 238 towards detector 220, which detects the received image. Detector 220 may be any device capable of detecting combined beam 238, such as, for example, a complementary metal-oxide-semiconductor (CMOS) detector array or charged coupled device (CCD). Although in the embodiment, FIG. 2 shows use of NPBS 208 for combining local oscillator beam 236 with reconstructed signal beam 234, in other embodiments, other devices may be used, such as, for example, a pellicle beam splitter or a plate beam splitter.

Where the local oscillator beam 236 and the reconstructed signal beam 234 have substantially the same phase they will interfere constructively to produce a representation of the reconstructed data page at the detector 220. Where the local oscillator beam 236 and the reconstructed signal beam 234 have substantially opposite phases, then they may interfere destructively to produce an inverted representation of the reconstructed data page at the detector 220. Where the local oscillator beam 236 and the reconstructed signal beam have substantially orthogonal phases (i.e., difference near±90°), then they may produce a washed-out (low contrast) representation of the reconstructed data page at the detector.

This simplified diagram of the holographic memory system 200 of FIG. 2 is for illustrative purposes only, and the holographic memory system 200 may include numerous other components, such as additional lenses, mirrors, etc. It should also be noted that FIG. 2 illustrates one example for generating probe beam 232 and local oscillator beam 236, and that other implementations may be used, such as, for example, using two separate phase-locked lasers. In short, the geometry and components of holographic memory system 200 may be different without departing from the disclosed technology.

Coherent Channel Modulation for Data Recording

As explained above with respect to FIGS. 1A-1C and 2, homodyne detection makes it possible to detect reconstructions of phase-modulated data pages. This in turn enables holographic data storage of information encoded using coherent channel modulation techniques, including phase-multiplexing techniques such as, but not limited to, phase quadrature holographic multiplexing (PQHM), QAM, and single-sideband holographic recording. Homodyne detection also enhances the performance of partial response maximum likelihood (PRML) and noise-predictive maximum likelihood (NPML). Coherent channel modulation techniques offer a number of advantages over amplitude-only modulation, including but not limited to: higher storage density; higher SNR/sensitivity at a given power level using coherent detection; and lower bit-error rate (BER) for a given power level. In addition, PSK modulation may reduce or eliminate the DC component in the signal beam, and may also reduce or eliminate cross-talk caused by gratings formed between pixels in the holographic recording medium (aka intra-signal modulation). Data recorded using these techniques can be reconstructed using conventional homodyne detection, quadrature homodyne detection, and the n-rature homodyne detection disclosed in greater detail above and below.

Phase Quadrature Holographic Multiplexing

Phase quadrature holographic multiplexing (PQHM) can be considered analogous to quadrature phase shift keying (QPSK) in traditional communications theory. The ability to detect the phase of a hologram presents an opportunity to increase storage density. A second hologram can be recorded with each reference beam (e.g., two holograms at each reference beam angle for angle multiplexing), with little to no cross talk between the holograms provided they have a 90° difference in phase. We refer to this as method as PQHM. More generally, we refer to methods of recording holograms in both orthogonal phase dimensions as phase-multiplexing. Phase-multiplexing therefore includes, but is not limited to, holograms recorded using PQHM (i.e. QPSK), higher-order PSK, and QAM holographic recording methods. Conversely, BPSK is not considered a phase-multiplexing method.

PQHM can provide a doubling of storage density, and opens the door to other advanced channel techniques. Furthermore, PQHM can be used to increase both recording and recovery speeds.

In general, holographic recording is performed by illuminating a photosensitive medium with an interference pattern formed by two mutually coherent beams of light. In one embodiment, the light induces a refractive index change that is linearly proportional to the local intensity of the light, i.e., $$\Delta n(\vec{r}) = StI(\vec{r}) \quad (1)$$

$$= St\left(|E_R(\vec{r})|^2 + |E_S(\vec{r})|^2 + E_R^*(\vec{r})E_S(\vec{r}) + E_R(\vec{r})E_S^*(\vec{r})\right)$$

where $\Delta n(\vec{r})$ is the induced refractive index change, S is the sensitivity of the recording medium, t is the exposure time, and $\vec{r}=\{x, y, z\}$ is the spatial coordinate vector. $I(\vec{r})$ is the spatially-varying intensity pattern, which is in turn decomposed into a coherent summation of two underlying optical fields, $E_R(\vec{r})$ and $E_S(\vec{r})$, representing the complex amplitudes of the reference beam and the signal beam, respectively. The unary * operator represents complex conjugation.

In this case, both the reference beam and the signal beams corresponding to an individual stored bit are plane waves (or substantially resemble plane waves), though other page-oriented recording techniques are also suitable for PQHM recording. Generally, the reference and signal beams may be written as $\exp(j\phi_R)E_R(\vec{r})$ and $\exp(j\phi_S)E_S(\vec{r})$ respectively, where phases $\phi_R$ and $\phi_S$ have been explicitly factored out. Then, $$\Delta n(\vec{r}) = St[|E_R(\vec{r})|^2 + |E_S(\vec{r})|^2 + Re\{\exp(j\Delta\phi)(E_R^*(\vec{r})E_S(\vec{r}) + E_R(\vec{r})E_S^*(\vec{r}))\}] \quad (2)$$

where $\Delta\phi = \phi_S - \phi_R$ is the difference between the phases of the two recording beams.

Eq. (2) shows that the phase of the interference term may be controlled by controlling the phase difference of the recording beams. If two holograms are recorded sequentially using the same reference and signal beams $E_R(\vec{r})$ and $E_S(\vec{r})$ while changing $\Delta\phi$ by 90°, then the holograms will have a quadrature relationship to each other. Each planar grating component in the Fourier decompositions of the interference terms of the two holograms will be identical to the corresponding component of the other hologram, excepting for a 90° phase difference. This reflects the 90° phase shift between the grating fringes of each component of the second hologram with respect to the grating fringes of each component of the first hologram; thus, the recorded gratings are substantially spatially orthogonal to each other. Similarly, the two holograms will be reconstructed in quadrature when the medium is illuminated by an appropriate probe beam. Because their gratings are orthogonal, the two holograms actually occupy different degrees of freedom within the address space of the recording medium, even though they use the same bands of angular spectrum.

The quadrature-multiplexed holograms can be denoted as the in-phase (I) hologram and the quadrature (Q) hologram (or the I quadrature and the Q quadrature of the same hologram). If the signal beams of two sequentially recorded holograms are not identical, but are instead modulated with two different data patterns, then the quadrature relationship can still be maintained so long as the modulation scheme does not produce substantial out-of-quadrature gratings within each individual hologram. For example, binary amplitude shift keying (ASK) works for this purpose because 'ones' are represented by gratings in the 0° phase in the I hologram and by gratings in the 90° phase in the Q hologram (with 'zeros' being represented by the absence of a grating in both holograms). Similarly, for binary PSK modulation (phase shift keying, in one embodiment), 'ones' and 'zeros' are respectively represented by 0° and 180° gratings in the I hologram, and by 90° and 270° gratings in the Q hologram. Thus, an orthogonal ±90° relationship is maintained between the I and Q holograms of each Fourier component.

Phase-quadrature recording may be physically effected by changing the optical path length of one (or possibly both) of the recording beams to produce a net phase difference of $\Delta\phi = 90°$ (or ±90° plus some whole number of waves). For instance, the optical path length can be increased or decreased by moving one or more mirrors in the beam path(s) using a piezo, galvonometer, or micro-electro-mechanical system (MEMS). One or both of the beams may also be phase-modulated with a suitable SLM, such as a switchable liquid crystal SLM.

The I and Q holograms can be modulated and recorded over a sequence of exposures with a binary SLM or in parallel during a single exposure with a gray-scale SLM with at least four modulation levels. When using QPSK modulation, for example, the gray-scale SLM modulates each pixel into one of the four quadrature phase states of 0°, 90°, 180°, and 270°. In this case, the binary state of each pixel in the I and Q images together may be encoded into a single state of the gray-scale phase SLM in a manner that produces quadrature-multiplexed gratings indistinguishable from those produced by sequential writing. The single exposure for parallel quadrature recording requires only $1/\sqrt{2}$ times the optical energy used to record two sequential exposures, so medium consumption (M/# usage) is reduced by a factor of 0.707. Recording rates may be increased by up to the same factor.

If desired, a gray-scale SLM can be implemented by cascading two or more binary SLMs in series, or by cascading non-binary SLMs in series to produce the four or more phase/amplitude states. In embodiments employing modulation schemes different from binary PSK, the four states might not correspond to the four quadratic states of 0°, 90°, 180°, and 270°. For example, parallel phase-quadrature recording of two binary ASK-modulated holograms might be accomplished with an SLM (or cascaded series of SLMs) that produces two bright states at phase 0° and 90° with $1\sqrt{2}$ amplitude, a bright state at phase 45° with unity amplitude, and a dark state.

Recording Phase Quadrature Holographic Multiplexed (PQHM) Data Pages

Figure 3:
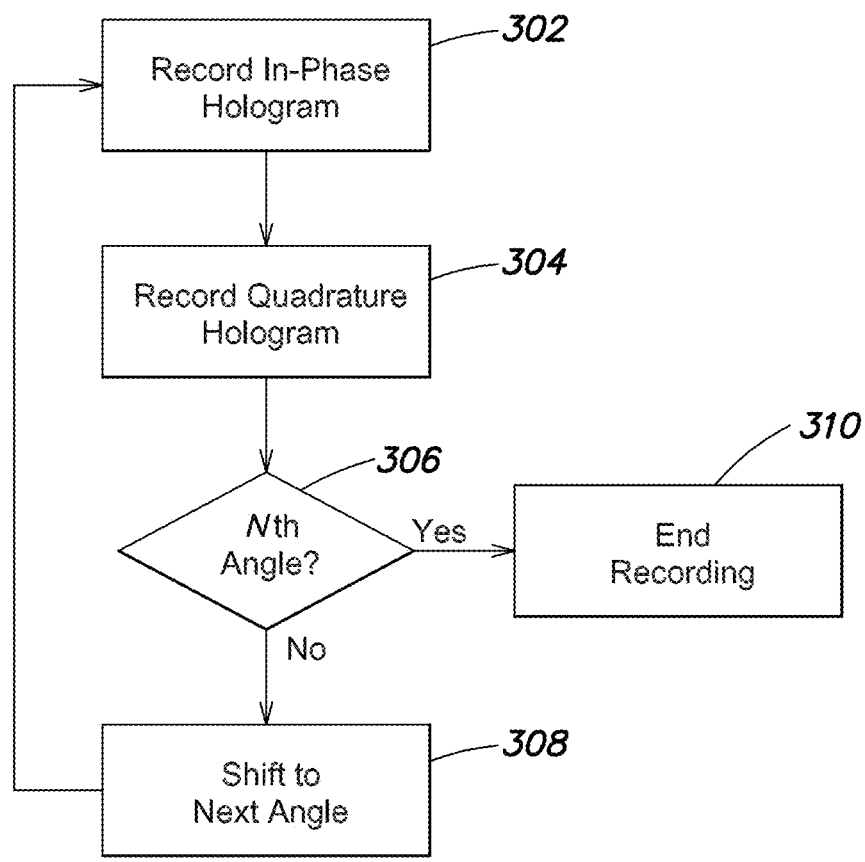
FIG. 3 is a flow chart that illustrates a process for recording data in a holographic data storage using phase quadrature holographic multiplexing (PQHM).

FIG. 3 illustrates a process for recording PQHM data pages with the system 100 shown in FIGS. 1A-1C. As shown in FIG. 3, this process can be combined with other compatible multiplexing techniques, including angle multiplexing, polytopic multiplexing, dynamic aperture multiplexing, and spatial multiplexing, to increase the areal storage density of holographic storage medium 158. It can also be implemented using holographic data storage systems using other architectures. And the basic technique for modulating the phase difference between a reference beam and a signal beam can be applied to other coherent channel modulation techniques, including but not limited to quadrature amplitude modulation (QAM).

As shown in FIG. 3, the first operation 302 in PQHM recording process includes recording a first interference pattern as a first hologram in a holographic recording medium 158. When performed with the system 100 configured as shown in FIG. 1B, the $1^{st}$ SHWP 144 is configured to transmit p-polarized light and the $2^{nd}$ SHWP 146 is configured to transmit s-polarized light. The first interference pattern is created by interference of a first signal beam with a first reference beam.

Data is encoded in the first signal beam in the form of a first data page. The first data page typically includes pixels of varied intensity created using a data encoding element 140 illustrated in FIG. 1B (ASK mode). The data encoding element 140, which in this case is a reflective SLM, encodes the first data page in the first signal beam. In some embodiments, the pixels of varied intensity have one or the other of two intensity states, the two intensity states typically being referred to as light and dark (binary ASK mode). In some embodiments, the first data page includes pixels that have varied phase states (PSK mode). In some embodiments, the varied phase states are limited to one or the other of two phase states that have a phase difference from each other of 180° (binary PSK mode). The reflective SLM 140 can be used for ASK mode, and in combination with a half wave plate 138 for PSK mode, as described above. Some embodiments embed data in signal beams by use of other data encoding elements, including but not limited to transmissive SLMs, gray-scale SLMs, gray-scale phase SLMs, and data masks.

The first reference beam is a plane wave reference beam, and the recording medium 158 typically, but not necessarily, comprises a combination of photoactive polymerizable material and a support matrix, with the combination typically residing on a substrate or sandwiched between two substrates. Other storage media familiar to persons skilled in the art can also be used, including but not limited to $LiNbO_3$ crystals and film containing dispersed silver halide particles. Other methods of optical data recording can use reference beams other than plane wave reference beams, including but not limited to spherical beams and in-plane cylindrical waves.

During the first operation 302, the variable phase retarder 130 in FIG. 1B is set at a first phase position, and the first hologram is recorded with the first signal beam being in a first phase state relative to the first reference beam. Recording the first hologram is typically performed by opening and closing a shutter (not shown). The first hologram can be referred to as an in-phase (I) hologram.

In the second operation 304, the recording medium 158 records a second interference pattern, called a quadrature (Q) hologram, created by interference of a second reference beam with a second signal beam. The variable retarder 130 is set at a second phase position for the second operation 304, and the second hologram is recorded in the recording medium with the second signal beam being in a second phase state. The second phase state differs from the first phase state by 90°. In other words, the first signal beam has a phase difference of 90° from the second signal beam. Recording the second hologram is typically performed by opening and closing the shutter (not shown).

The second operation 304 is typically performed with the system 100 configured as shown in FIG. 1B, wherein the $1^{st}$ SHWP 144 is configured to transmit p-polarized light and the $2^{nd}$ SHWP 146 is configured to transmit s-polarized light. The second reference beam is typically substantially identical to the first reference beam. The second signal beam includes a second data page encoded therein by use of the SLM. The second data page typically, but not necessarily, differs from the first data page.

However, both the first and second data pages include reserved blocks comprising known pixel patterns. As used herein, the term "reserved block" refers to a region of known pixel pattern(s) that is encoded in a page stored in the holographic storage medium. A reserved block residing at a specific location in the first data page is typically matched by a complementary reserved block residing at an identical specific location in the second data page, wherein the reserved blocks have complementary pixel patterns. The reserved blocks and processing using the reserved blocks are discussed in greater detail below.

In the second operation 304, the second hologram is recorded in a substantially identical location in the photosensitive recording medium 158 as the first hologram, such that the first and second holograms overlap completely to share a common space. However, because the first signal beam and the second signal beam have a phase difference from each other of 90°, the first and second holograms have a phase difference from each other of 90°. In other words, refractive index gratings of each and every Fourier component of the first and second holograms have a phase difference from each other of ±90°. The first and second holograms are thus said to be phase quadrature multiplexed, and form a phase quadrature hologram pair, sometimes referred to as a phase quadrature pair or a PQHM pair. Each hologram of a phase quadrature hologram pair is a species of phase-multiplexed hologram.

In other embodiments, first and second holograms are recorded using first and second signal beams that do not have a phase difference, which is to say the first and second signal beams have a phase difference from each other of 0°. In such case, a phase difference between the first and second holograms of a phase quadrature pair can be achieved using first and second reference beams that have a phase difference from each other of 90°. Persons skilled in the art will recognize that a phase difference between two reference beams can be achieved by placing a phase retarder in a path of the first and second reference beams. The phase difference can also be manipulated by adjusting the phases of both the signal beams and the reference beams so as to have a relative phase difference that switches between 0° and 90°.

Upon completion of the second operation 304 in the PQHM recording process, a processor or other suitable component in or operably coupled to the holographic data storage system 100 determines whether or there are any more data pages to be recorded in operation 306. If so, then the holographic data storage system 100 shifts to a new angle, position, dynamic aperture setting, and/or other multiplexing setting in operation 308, then repeats operations 302, 304, and 306 to record the desired number of multiplexed data pages. Once the multiplexed data pages have been recorded, recording ends in operation 310.

Higher-Order Phase Shift Keying (PSK)

In another embodiment, the holographic memory systems disclosed herein may be used to record and recover data modulated with higher-order PSK constellations. PSK encoding may be extended generally to incorporate any number of phase states—for example, 8-PSK. In one embodiment, 8-PSK recording is performed by recording a data page composed using a gray-scale phase SLM with each pixel taking one of eight phase states, e.g., 0°, 45°, 90°, 135°, 180°, 225°, 270°, or 315°. Higher-order PSK holograms may be detected using a modified quadrature homodyne detection or n-rature homodyne detection algorithm. Any number and distribution of phase states may be thus accommodated.

Higher-order PSK holograms can also be recorded sequentially using a binary phase SLM (0° and 180°), and a separate phase retarder in a manner analogous to the sequential PQHM recording method disclosed immediately above. Note, however, that for PSK orders higher than four, the sequentially-recorded images may not constitute independent binary data pages. 8-PSK, for example, involves the sequential exposure of four SLM images but may yield only three bits per pixel of data (not four) since the number of data bits may be equal to the log base 2 of the number of phase states.

Quadrature Amplitude Modulation (QAM)

The holographic memory systems disclosed herein may also be used to record and recover data modulated in both amplitude and phase. 16-QAM, for example, is a well-known method for encoding 4 bits per symbol using a constellation of typically 4×4 states distributed uniformly in the I-Q plane. Generally, any digital QAM constellation may be recorded holographically using a phase and amplitude-modulating SLM capable of providing an appropriate number of phase and amplitude states, or with a sequence of exposures of varying amplitude and phase using a binary phase SLM. Any number and distribution of states may be thus accommodated.

Partial Response Maximum Likelihood (PRML) Signaling

Partial response maximum likelihood (PRML) signaling can also be used to increase the density with which phase- and amplitude-modulated data is stored in a holographic medium. PRML signaling is used in communications and magnetic storage applications where, for instance, the bits on a data track are packed so closely that four or six individual magnetic flux reversal response pulses may overlap each other. This allows the channel to operate at four or six times the data density it would achieve if the pulses were completely separated. The cost for this improved performance is increased complexity in the form of a decoder that can recover the original data from the convolved signal. Typically, a Viterbi or Bahl, Cocke, Jelinek, and Raviv (BCJR) decoder is used to select the optimal data pattern consistent with the observed signal. In the case of Viterbi decoding, the detector is optimal in the maximum likelihood sense, hence the term partial response, maximum likelihood.

In PRML signaling, a partial response resampling filter creates an output which resembles the convolution of the binary data pattern with some specific channel impulse response, h. For holographic data storage, this resampling filter can be employed in two spatial dimensions rather than in one temporal dimension for time-varying images. In particular, the optical response of neighboring SLM pixel images overlap with each other (blur) when the spatial resolution grows coarser. The superposition of overlapping pixel fields resembles a linear convolution that is amenable to PRML processing. Because homodyne detection permits the detection of optical amplitude, it enables PRML signaling by linearizing the channel response. Put differently, PRML signaling for holographic data storage can be implemented by detecting the optical amplitudes of the overlapping pixel fields using a homodyne detection technique (e.g., n-rature homodyne detection), then applying PRML processing techniques on the detected optical amplitudes.

Implementing partial response signaling for holographic data storage may reduce the signaling bandwidth, increase the signaling capacity for a given bandwidth, or both. Partial response signaling may also allow the designer to select a target channel response that is closer to the native, physical response of the channel, thus reducing noise amplification due to aggressive equalization.

Figure 4A:
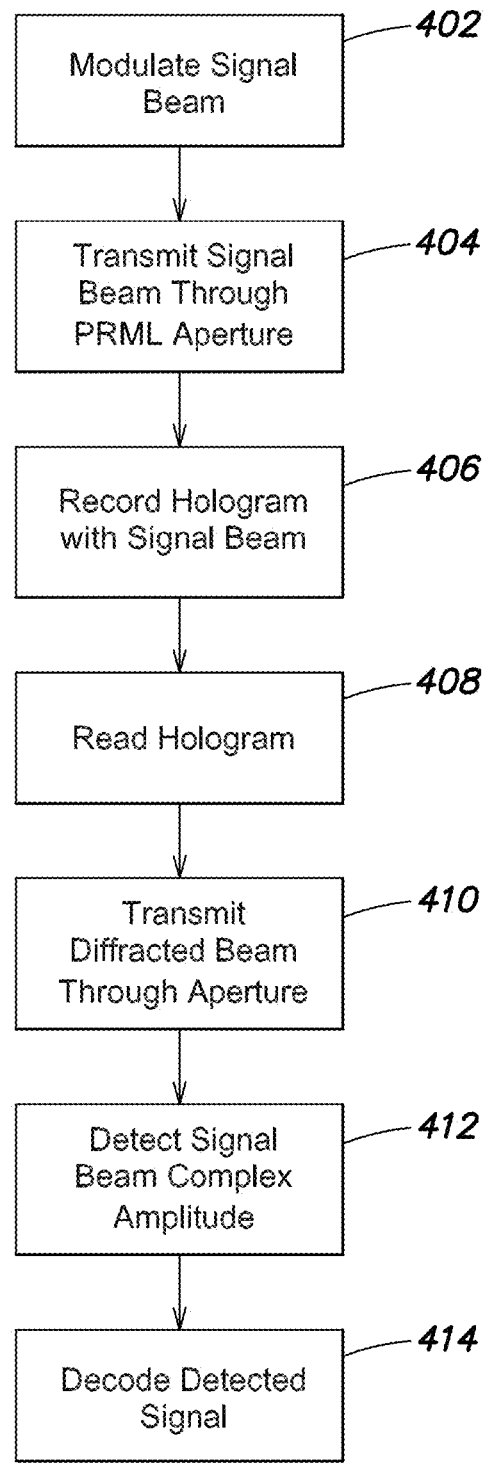
FIG. 4A is a flow chart that illustrates a process for recording and retrieving holographic stored data using partial response maximum likelihood (PRML).

FIG. 4A illustrates a process for recording and retrieving data holographically using PRML signaling. In operation 402, an SLM (e.g., SLM 140 in FIGS. 1B and 1C) spatially modulates the phase, amplitude, or both the phase and amplitude of the signal using a suitable modulation technique (e.g., PSK, ASK, QAM, etc.). Next, in operation 404, the spatially modulated signal beam propagates through an optical filter (e.g., an appropriately apodized aperture) in the Fourier plane of the SLM (e.g., in the position of the polytopic aperture 155 shown in FIGS. 1B and 1C). The shape and size of the aperture is chosen such that it does not resolve individual pixels in the signal beam; that is, propagation of the signal beam through the aperture blurs the image shown on the SLM. The blurring can be in one or two spatial dimensions (e.g., x, y, or x and y) and be implemented, e.g., using a static aperture, a shutter, a grayscale SLM, etc. In some cases, the transmission function of the aperture may produce the shape of a double-sinc response as described below with respect to FIG. 4E. The blurred signal beam interferes with a reference beam in the holographic storage medium to produce a hologram representing the blurred SLM image in operation 406.

Once the hologram has been recorded successfully, it can be read out using n-rature homodyne detection, quadrature homodyne detection, or any other technique that yields the complex amplitude of the reconstructed signal beam. First, the signal beam is reconstructed in operation 408 by illuminating the hologram with a probe beam, e.g., as described with respect to FIGS. 1C and 2. The reconstructed signal beam propagates through an aperture, typically of the same shape and size as the aperture used to blur the original signal beam in operation 410 (e.g., a 2D cosine-rect aperture, disposed at the position of polytopic aperture 155 in FIG. 1C, that gives a double-sinc point spread function). The reconstructed signal beam interferes with a local oscillator on a detector, which senses the resulting interference pattern in operation 412. And in operation 414, the detected interference pattern is decoded, e.g., as explained with respect to FIG. 4C, to yield a PRML estimate of the information stored in the hologram. For instance, the interference pattern may be deconvolved using the channel impulse response, h, and an appropriate deconvolution technique, such as the iterative multistrip algorithm.

Figure 4B:
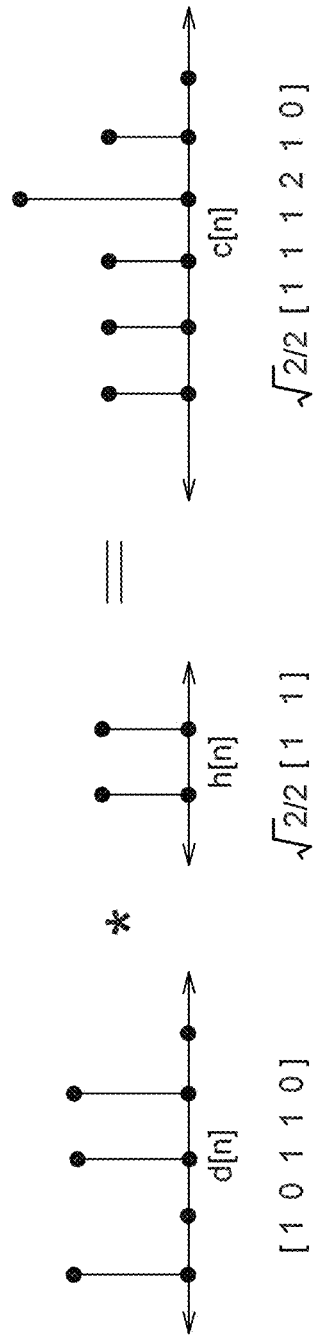
FIG. 4B illustrates PRML data modulation—here, partial response class 1 (PR1) signaling—as a discrete convolution by a response kernel.

One form of partial response suitable for use in the process of FIG. 4A is variously called partial response class 1 (PR1), or duobinary modulation. The discrete channel response may be represented by polynomial multiplication of the data sequence by 1+D, where D is the sample delay operator. Alternatively, the operation may be viewed as a discrete convolution by the channel impulse response kernel $h=\sqrt{2}/2[1\ 1]$, as illustrated in FIG. 4B. The response to an ASK binary input, $d[n] \in \{0, 1\}$, thus comprises a ternary signal taking the values $c[n] \in \sqrt{2}/2\{0, 1, 2\}$.

Normally, the discrete response sequence of FIG. 4B would arise as the result of sampling an underlying continuous waveform. Equalizing and sampling this waveform yields a sampled output that conforms closely to the target response. The factor of $\sqrt{2}/2$ in the kernel normalizes the total energy per symbol to one when the signal units are amplitudes.

Figure 4C:
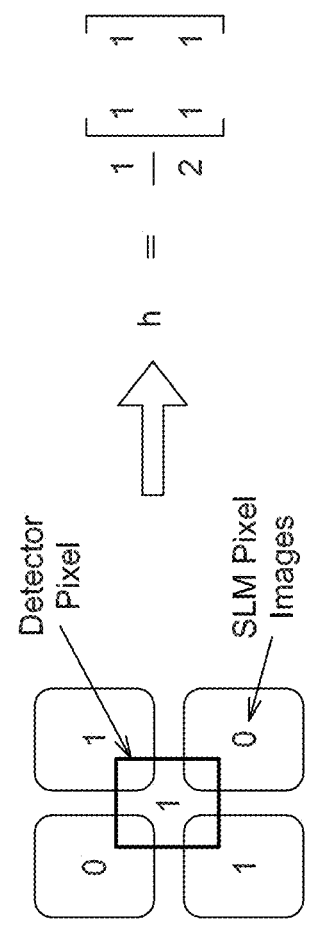
FIG. 4C illustrates a two-dimensional generalization of PR1 signaling suitable for coherent channel modulation of holographically stored data.

For the page-oriented channel of holographic data storage, a two-dimensional response may be used. FIG. 4C illustrates an embodiment of a 2D target response, dubbed PR1-2D. It is simply the two dimensional generalization of the PR1 response illustrated in FIG. 4B. A pixel-matched system implementing this response can be implemented by aligning the detector pixels to the corners of SLM pixels, where the four fields overlap, rather than their centers (shown in FIG. 4C).

However, a pixel-matched holographic data storage system may not be practical for all uses. In order to implement the system with an oversampled detector, corner alignment can be performed in postprocessing using a modified version of the resampling method disclosed below. The full response oversampling process disclosed below uses the 4×4 detector pixel window closest to each SLM pixel image and applies coefficients optimized (selected) to determine the state of that SLM pixel alone; conversely, the partial response resampling method selects the 4×4 detector pixel window closest to the corner of four SLM pixel images and applies coefficients optimized (selected) to determine the sum of the four SLM pixel responses. Coefficients can be determined by simulation using a modified version of the computer code used to derive the full response resampling coefficients as described below with respect to FIGS. 6A-6D.

Optical Equalization for PRML

Figure 4D:
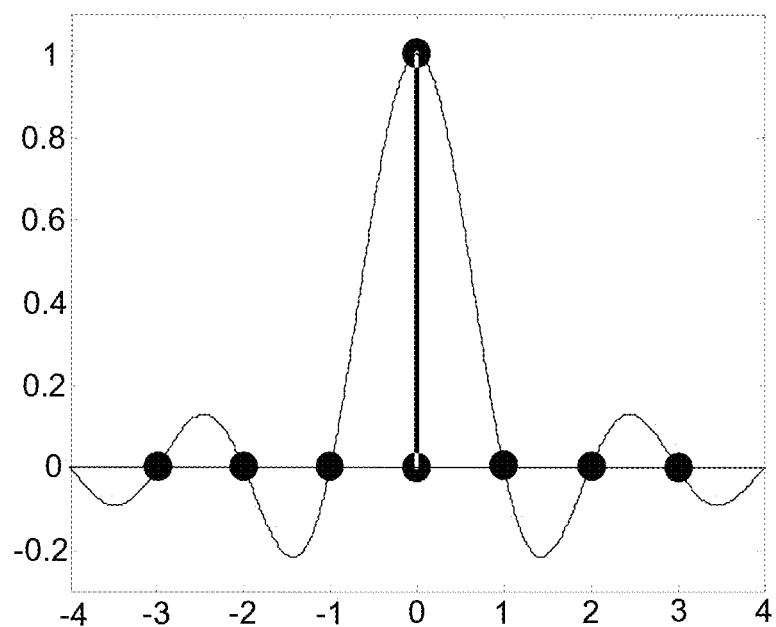
FIGS. 4D and 4E show a single sinc response function and a double sinc response of equalized optical filter, respectively, for a use in optical equalization in PRML data modulation.

Imaging through a square polytopic aperture in the Fourier plane produces a sinc-shaped point spread function (impulse response) in the image plane. Without being bound by any particular theory, a sinc function may be considered to be the lowest-bandwidth response that leads to an isolated non-zero value at the sampling point x=0, but zero at all other integer sampling points, as shown in FIG. 4D. That is, a sinc function naturally conforms to the desired discrete response h=[1] for a full response channel, rather than a partial response channel.

Figure 4E:
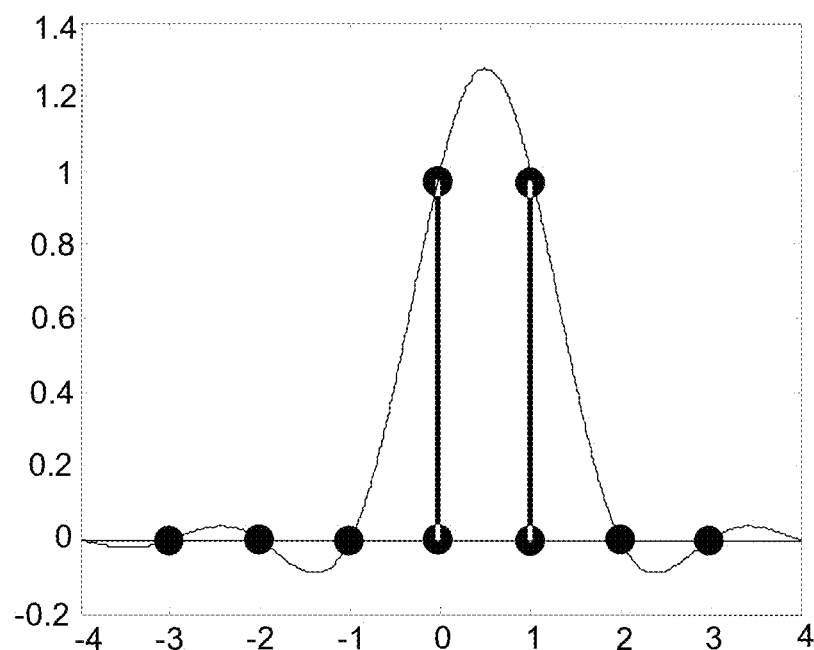

In order to effect the desired discrete partial response shape of h=[1 1] (considering only one spatial dimension for simplicity), a reduced (minimal) bandwidth channel comprising two displaced sinc functions as shown in FIG. 4E can be used. This PR1-2D point-spread function may be physically realized in a holographic data storage system by apodizing the transmittance function of the polytopic aperture. The optical field transmittance function, t(x), across the aperture (as opposed to the intensity transmittance function) should resemble the Fourier transform of the desired point spread function h(x). For an aperture operating exactly at the spatial Nyquist frequency required to resolve the modulated data pattern, the expression for the desired point spread function is:

$$h(x) = \text{sinc}\left(\frac{x-1/2}{\Delta_{pix}}\right) + \text{sinc}\left(\frac{x+1/2}{\Delta_{pix}}\right) \quad (3)$$
$$= \text{sinc}\left(\frac{x}{\Delta_{pix}}\right) * \left[\delta\left(x+\frac{\Delta_{pix}}{2}\right) + \delta\left(x-\frac{\Delta_{pix}}{2}\right)\right]$$
$$\stackrel{\mathcal{F}}{\longleftrightarrow} t(x) = \text{rect}\left(\frac{\Delta_{pix} x}{\lambda f}\right) \cos\left(2\pi \frac{\Delta_{pix} x}{\lambda f}\right),$$

where $\Delta_{pix}$ is the SLM pixel spacing, $\lambda$ is the wavelength of the light, and $f$ is the Fourier transform lens focal length. (Again, only one dimension is considered for simplicity.) This is to say that the square aperture should be apodized with a single null-to-null cosine half-cycle in amplitude transmittance, which corresponds to $\cos^2$ in intensity transmittance. For a phase conjugate polytopic architecture employing a double pass through the polytopic aperture (once upon recording, and then again upon read-out), the expression for the intensity transmittance, T(x), of the aperture is:

$$T(x) = \text{rect}\left(\frac{\Delta_{pix} x}{\lambda f}\right) \cos\left(2\pi \frac{\Delta_{pix} x}{\lambda f}\right). \quad (4)$$

Having produced an optical response resembling the desired PR1-2D target, the data may be decoded using a two-dimensional version of the Viterbi algorithm, the BCJR algorithm, the Iterative Multi-Strip algorithm, or any other suitable algorithm.

In other embodiments, one skilled in the art will readily recognize how to modify the foregoing analysis to implement other partial response classes, e.g., PR2 (response $(1+D)^2$), or EPR2 (response $(1+D)^3$). For a PR2 partial response, the discrete partial response shape is h=[1 2 1]; for an EPR2 partial response, the discrete partial response shape is h=[1 2 2 1]. Similarly, one skilled in the art will readily see how to implement noise-predictive maximum-likelihood detection (NPML).

Single Sideband Holographic Recording

Single sideband holographic recording involves removing redundant spectral components of the holographic signal in order to increase storage density. In a holographic data storage system that employs polytopic multiplexing, for example, the redundant spectral components can be removed by occluding half of the polytopic aperture. Since the polytopic aperture is placed in a Fourier plane of the signal beam, the complex amplitude distribution in the plane is conjugate-symmetric about the origin, so long as the signal beam is real-valued (as it is typically for binary modulation schemes, such as PSK and ASK). In real-world cases where the signal is not purely real-valued but is instead modulated onto a phase carrier that varies slowly across the image field (i.e., the signal is conjugate-symmetric about the phase carrier, rather than about 0° phase), single sideband holographic recording can be implemented with a phase carrier that is resolved by coherent detection (e.g., n-rature homodyne detection). In n-rature homodyne detection, the resolution depends on the reserved block spacing (discussed below).

In the systems shown in FIGS. 1A-1C and 2, up to half of the Fourier plane may be blocked without removing signaling information, so long as at least one sideband of each frequency component is passed. For example, the half of the Fourier plane corresponding to negative frequencies in x or y (e.g., the bottom or left half of the polytopic aperture) can be blocked using a knife edge or other suitable spatial filter. For a page-based holographic data storage system, the size of the polytopic aperture determines the size of the holograms, so halving the aperture area doubles the recording density.

Single-sideband multiplexing introduces an imaginary component in the detected signal that is normally not present due to cancellation of the imaginary parts in the conjugate sidebands of a double-sideband recording. To restore the original signal, the imaginary part of the signal (as expressed in the recorded phase basis) is discarded or suppressed, e.g., by recovering only the real part of the signal. For example, the real part of the signal can be retrieved without the imaginary part by reading a single-sideband hologram using n-rature homodyne detection, quadrature homodyne detection, or any other suitable digital or optical reconstruction technique.

n-Rature Homodyne Detection

As introduced above, n-rature homodyne detection is a coherent channel detection process for reconstructing holographically stored data, including data encoded using the coherent channel modulation techniques disclosed herein. In n-rature homodyne detection, one or more detectors sense n images (e.g., $I_A$, $I_B$, $I_C$, etc.) of a particular data page. Each of these images is produced by sensing the interference pattern between a local oscillator beam and a reconstructed signal beam diffracted by the holographic storage medium. For the mth image $I_m$, the phase difference between the local oscillator beam and the reconstructed signal beam is $2\pi m/n$, where $n \geq 3$ is the total number of images. This can be accomplished, for instance, by incrementing or decrementing the modulo $2\pi$ phase difference between the local oscillator and the reconstructed signal beam by $2\pi/n$ for subsequent images. This phase difference can be implemented using a liquid crystal-based phase modulator, an electro-optic phase modulator, a movable mirror, or any other suitable phase modulator in the path of the local oscillator beam, the probe beam, or the reconstructed data (signal) beam. The phase differences of successive images do not have to be arranged in any particular sequence or order; rather, the phase difference can be varied as desired such that the resulting n images can be ordered in phase difference increments or decrements of $2\pi/n$.

Common Intensity Noise Suppression by N-Rature Homodyne Detection

Though n-rature homodyne detection involves more holographic exposures than conventional homodyne detection or quadrature homodyne detection, it enjoys other benefits, including the rejection of common intensity noise. Eliminating common intensity noise using n-rature homodyne detection increases the SNR of the detected signal. To see why, consider n-rature homodyne detection versus quadrature homodyne detection. In quadrature homodyne detection, the detector acquires two images, $I_A$ and $I_B$, of the interference between the reconstructed signal beam and the local oscillator beam. The phase difference between the reconstructed signal beam and the local oscillator beam is shifted by 90° for one of the images. As a result, the irradiance of the detected images can be expressed as:

$$I_A = I_{LO} + I_S + 2|E_{LO}||E_S|\cos(\Delta\phi)$$

$$I_B = I_{LO} + I_S + 2|E_{LO}||E_S|\cos(\Delta\phi + 90°) \quad (5)$$

where $I_S$ is the signal (reconstructed data) beam irradiance, $I_{LO}$ is the local oscillator irradiance, and $\Delta\phi$ is the phase difference between the signal beam and the local oscillator. $|E_S|$ and $|E_{LO}|$ are the magnitudes of the optical fields, i.e., $|E_S|=\sqrt{I_S}$, $|E_{LO}|=\sqrt{I_{LO}}$. The signal magnitude $|E_S|$ may be estimated by:

$$\begin{aligned}|\hat{E}_S| &= \frac{1}{2|E_{LO}|}[I_A\cos(\Delta\phi) + I_B\cos(\Delta\phi + 90°)] \\ &= \frac{1}{2|E_{LO}|}\left\{\begin{array}{l}[I_{LO} + I_S + 2|E_{LO}||E_S|\cos(\Delta\phi)]\cos(\Delta\phi) + \\ [I_{LO} + I_S + 2|E_{LO}||E_S|\cos(\Delta\phi + 90°)]\cos(\Delta\phi + 90°)\end{array}\right\} \\ &\approx |E_S|(\cos^2(\Delta\phi) + \cos^2(\Delta\phi + 90°)) + \\ &\quad \frac{1}{2|E_{LO}|}(I_{LO} + I_S)(\cos(\Delta\phi) + \cos(\Delta\phi + 90°)) \\ &\approx |E_S| + \frac{1}{2|E_{LO}|}(I_{LO} + I_S)(\cos(\Delta\phi) + \cos(\Delta\phi + 90°))\end{aligned} \quad (6)$$

The final term in Eq. (6) represents common intensity noise and is an additive noise source in the estimate of $|E_S|$. Common intensity noise is so denoted because it includes components of the detected images proportional to the direct intensity terms, $I_{LO}$ and $I_S$, in addition to the desired interference term. Although increasing the local oscillator intensity may increase the SNR of the detected signal, it will not necessarily eliminate the common intensity noise in quadrature homodyne detection.

Conversely, using n-rature homodyne detection suppresses or eliminates common intensity noise and can increase the SNR of the detected signal. To see how, consider the case of n-rature homodyne detection where n=3. The detector images may be written as:

$$I_A = I_{LO} + I_S + 2|E_{LO}||E_S|\cos(\Delta\phi)$$

$$I_B = I_{LO} + I_S + 2|E_{LO}||E_S|\cos(\Delta\phi + 120°)$$

$$I_C = I_{LO} + I_S + 2|E_{LO}||E_S|\cos(\Delta\phi + 240°) \quad (7)$$

Then $|E_S|$ may be estimated by $$\begin{aligned}|\hat{E}_S| &= \frac{1}{3\sqrt{I_{LO}}}[I_A\cos(\Delta\phi_A) + I_B\cos(\Delta\phi_B) + I_C\cos(\Delta\phi_C)] \\ &= \frac{1}{3|E_{LO}|}\left\{\begin{array}{l}[I_{LO} + I_S + 2|E_{LO}||E_S|\cos(\Delta\phi)]\cos(\Delta\phi_A) + \\ [I_{LO} + I_S + 2|E_{LO}||E_S|\cos(\Delta\phi + 120°)]\cos(\Delta\phi_B) + \\ [I_{LO} + I_S + 2|E_{LO}||E_S|\cos(\Delta\phi + 240°)]\cos(\Delta\phi_C)\end{array}\right\}\end{aligned} \quad (8)$$

where $\Delta\phi_A$, $\Delta\phi_B$, and $\Delta\phi_C$ represent the respective phase differences between the three pairs of local oscillator and signal beams. Typically, these phase differences are shifted with respect to each other by 120°, so $|E_S|$ may be estimated by:

$$|\hat{E}_S| \approx |E_S| \frac{2}{3}(\cos^2(\Delta\phi) + \cos^2(\Delta\phi + 120°) + \cos^2(\Delta\phi + 240°)) + \quad (9)$$

$$\frac{1}{2|E_{LO}|}(I_{LO} + I_S)(\cos(\Delta\phi) + \cos(\Delta\phi + 120°) + \cos(\Delta\phi + 240°))$$

$$|\hat{E}_S| \approx |E_S|$$

Eq. (9) shows that the common intensity noise term has cancelled. This approach may be generalized for any $n \geq 3$ since $$\sum_{k=0}^{n-1} \cos^2\left(\phi + 2\pi \frac{k}{n}\right) = \frac{n}{2} \quad (10)$$

is a constant factor applied to the signal term and $$\sum_{k=0}^{n-1} \cos\left(\phi + 2\pi \frac{k}{n}\right) = 0 \quad (11)$$

is the factor applied to the term including the common intensity noise. In the ideal case, this factor sums exactly to zero, reflecting a perfect cancellation of common intensity noise. In a real implementation where the actual phase differences might deviate slightly from $$\frac{2\pi}{n},$$

this factor tends towards zero, thus substantially cancelling common intensity noise. However, because the factor typically does not sum exactly to zero in real implementation, substantial cancellation of common intensity noise typically allows a small amount of common intensity noise to remain.

In a refinement to the n-rature algorithm above, cancellation forcing may be employed. In practice, the coefficients for combining the images in Eq. (8), cos ($\phi_A$), cos ($\phi_B$), and cos ($\phi_C$), can be determined by correlation operations on the detected images. Perfect common intensity noise cancellation occurs when these coefficients sum to zero, but this may not be the case in practice due to measurement noise or phase errors in the constituent images. In such a case, cancellation forcing may be practiced by adjusting the coefficients to sum to zero, for example by subtracting 1/n of the mean from each coefficient.

Reading Holographically Stored Data Using N-Rature Homodyne Detection

Figure 5A:
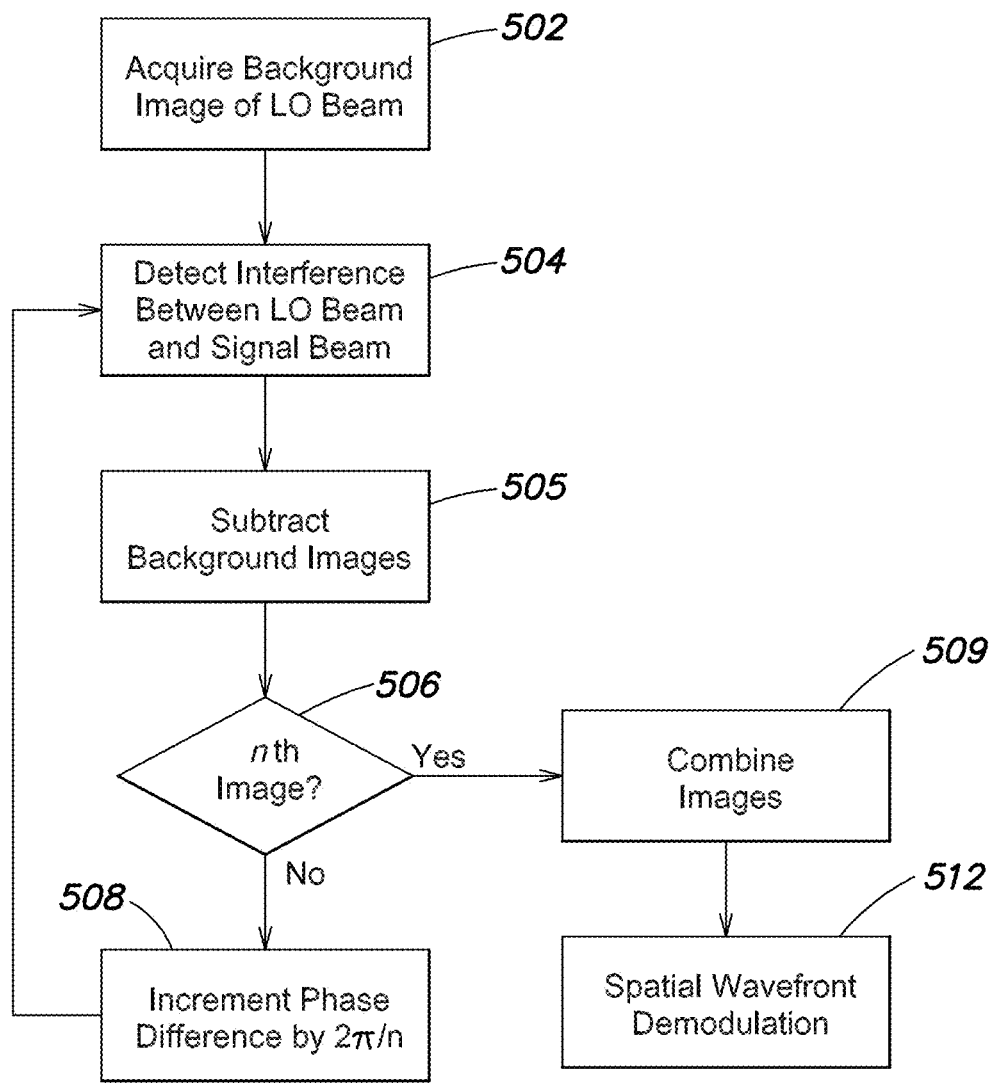
FIG. 5A is a flow diagram illustrating a process for n-rature homodyne detection, including spatial wavefront demodulation.

FIG. 5A illustrates a process for reading holographically stored data using n-rature homodyne detection. Although this process is described with respect to the holographic data storage system 100 shown in FIGS. 1A-1C, it can be performed with any suitable holographic data storage system, including the system 200 shown in FIG. 2. The operations shown in FIG. 5A are based with respect to retrieving data from an in-phase (I) hologram and a quadrature (Q) hologram recorded using a PQHM process, e.g., as shown in FIG. 3. The I hologram can be retrieved with the 1$^{st}$ SHWP 144 configured to transmit s-polarized light and the 2$^{nd}$ SHWP 146 configured to transmit p-polarized light as shown in FIG. 1C. The quadrature (Q) hologram of the PQHM pair is retrieved simultaneously with the in-phase hologram, and the in-phase and quadrature holograms can be distinguished from each other by use of n-rature homodyne detection.

In the embodiment shown in FIG. 5A, n-rature homodyne detection begins with operation 502, which includes acquiring a background image of the local oscillator beam without any reconstructed signal beam. In operation 504, the holographic data storage system 100 generates a probe beam for use in generating reconstructed signal beams from the first and second holograms. The probe beam of operation 504 is a plane wave beam having a substantially identical wavelength to the first and second reference beams. The probe beam is a phase conjugate of the first and second reference beams. Variations include probe beams that are not phase conjugates of their respective reference beams. Other embodiments of methods include probe beams that are not necessarily plane wave beams. For example, variations of probe beams include, but are not limited to, spherical probe beams and in-plane cylindrical waves.

The probe beam diffracts off the in-phase hologram and the quadrature hologram to generate a reconstructed signal beam, which interferes with the local oscillator as discussed above. A detector senses this interference pattern, and a memory stores a representation of the detected interference pattern as one of the n n-rature homodyne images. In optional operation 505, a processor coupled to the memory may subtract the background image acquired in operation 504 from the interference pattern detected in operation 504 in order to remove direct terms (e.g., non-signal components, such as $I_{LO}$ and $I_S$) from the representation of the interference pattern. Examples of operation 505, also called detector image modification, are described in greater detail below.

If there are more images to recover, e.g., as determined by the processor in operation 506, the phase difference between the local oscillator and the reconstructed signal beam is shifted by 360°/n using the variable phase retarder 130 in operation 508. Put differently, the mth local oscillator in the set of n local oscillators has a relative phase of (360°×m)/n. Accordingly, where n=3, each of the three local oscillators is shifted by a phase difference of 120° (360°/3) with respect to the other local oscillators. The system repeats operations 504 and 506 in an iterative fashion at incremented phase differences of 360°/n until all n images have been captured.

The n images undergo postprocessing in operations 509 and 512. In optional operation 509, a processor combines the n images captured by the detector into a pair of images suitable for further processing as explained below. This combination operation 509 can be applied to images reproduced from holograms recorded using ASK, PSK, QAM, and single-sideband recording techniques. The resulting image pair, referred to as a quadrature image pair, undergoes spatial wavefront demodulation in operation 512. (Spatial wavefront modulation is explained in greater detail with respect to FIG. 5B). In practice, operations 509 and 512 can be implemented in a single processing operation by the processor.

The process shown in FIG. 5A can be implemented for any integer n greater than 2. Each of the n reconstructed signal beams may contain portions of a reconstruction of both the in-phase and quadrature signal beams used in the PQHM recording process. Each of the n reconstructed signal beams thus typically contains portions of a reconstruction of both the first and second data pages. The n reconstructed signal beams are generated by projecting the probe beam to the phase quadrature hologram pair (comprising the first hologram and the second hologram) in the recording medium 158, in a manner familiar to person skilled in the art.

The operations shown in FIG. 5A do not necessarily have to occur in the sequence provided here, and indeed the operations may be temporally intermingled to some extent. For example, the background image in operation 502 can be acquired before, after, or between acquisitions of the interference patterns in operations 504 and 506. Similarly, operations 505, 509, and 512 can be performed at least partially during or after operations 504 and 506.

Generating and Detecting Interference Patterns

Figure 6A:
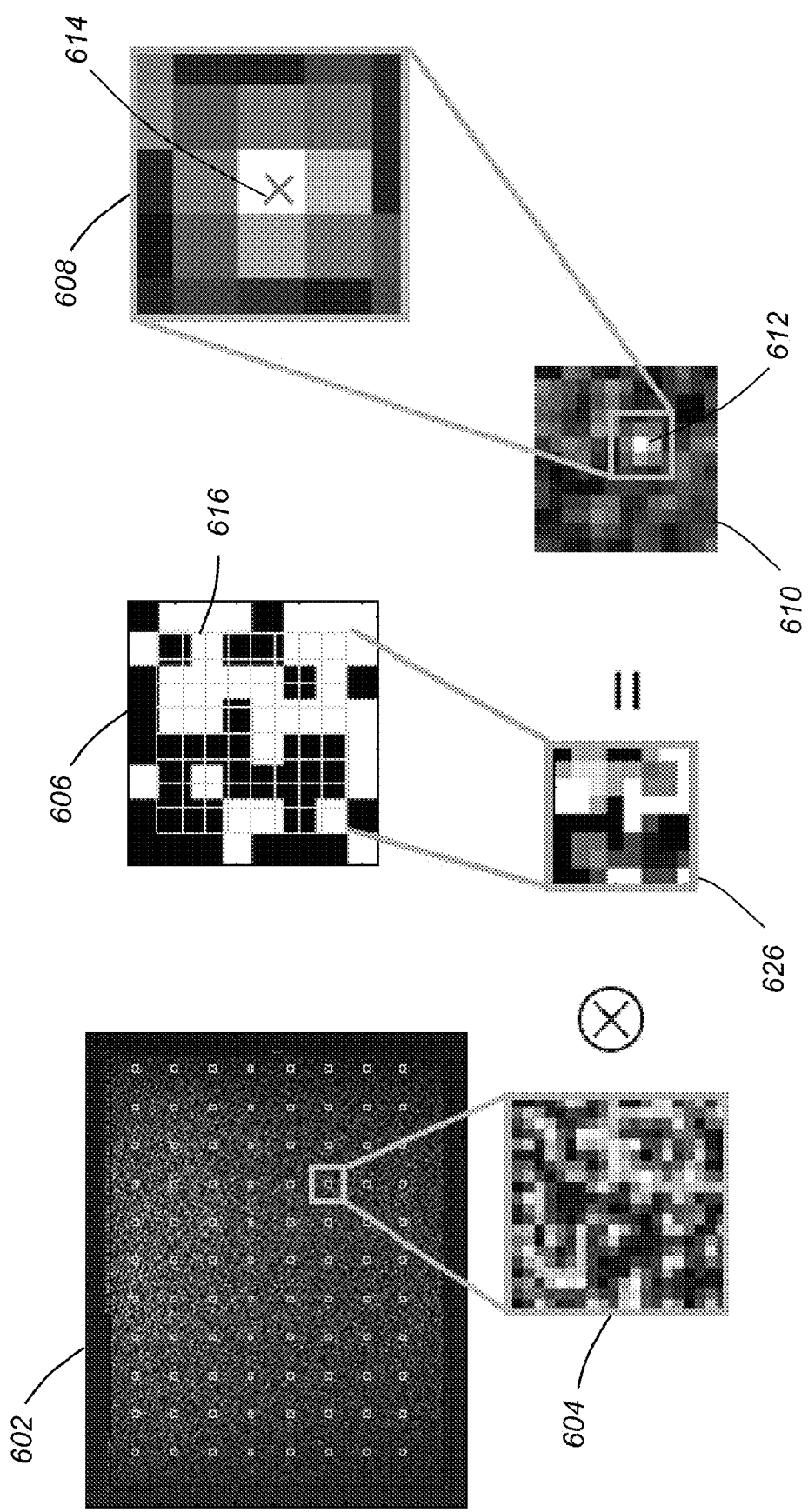
FIG. 6A is a flow diagram illustrating a reserved block cross correlation process for direct detection.

FIG. 1C illustrates how each local oscillator 125 can be combined collinearly with a respective reconstructed signal beam 124 to form a combined beam 131 that produces an interference pattern on the detector 142 in operation 504 of FIG. 6A. As shown in FIG. 1C, the system 100 illuminates the in-phase and quadrature holograms with a probe beam 133 so as to produce a reconstructed signal beam 124. The probe beam 133 is a phase conjugate of the first (in-phase) reference beam and the second (quadrature) reference beam, and each of the n reconstructed signal beams 124 is s-polarized and propagates part way through the holographic system 100 in a direction opposite that of an incident signal beam 143.

The $2^{nd}$ SHWP 146 is configured to transmit p-polarized light when the holographic system 100 is in read mode. Accordingly, each of the n s-polarized reconstructed signal beams has its polarization rotated 90° by the $2^{nd}$ SHWP 146 to emerge p-polarized and thus propagates through the PBS 139 towards the detector 142. The first SWHP 144 is oriented to transmit an s-polarized local oscillator 125, which reflects off PBS 139 towards detector 142 to combine with the corresponding reconstructed signal beam 124. If the local oscillator 125 and the reconstructed signal beam 124 are aligned with each other, they propagate substantially collinearly towards the detector 142, thereby forming combined beam 131.

An analyzer 141 (e.g., a linear polarizer) between the PBS 139 and the detector 142 transmits projections of the s-polarized local oscillator 125 and the p-polarized reconstructed signal beam 124 into a particular polarization state (e.g., a linear diagonal polarization state). Changing the polarization state transmitted by the analyzer (e.g., by rotating the analyzer 141 about the optical axis of the combined beam 131) changes the relative strengths of the reconstructed signal beam portions and local oscillator portions of the n combined beams transmitted to the detector 142. This varies the modulation depth of the detected interference pattern and the gain experienced by the reconstructed signal beam. The detector 142 senses the interference pattern generated by the local oscillator and the reconstructed signal beam and produces an electronic signal (e.g., a current or voltage) whose amplitude is proportional to the detected irradiance.

The local oscillators 125 may be generated at a substantially identical, fixed wavelength, which is substantially identical to the wavelength of probe beam 133. The fixed wavelength should remain constant over time, within the capability of a holographic system 100 to maintain a constant wavelength. Persons skilled in the art recognize that small, unintentional variations in wavelength are typically unavoidable. For example, laser mode hops, current variation, and temperature variation can limit wavelength stability for light beams in any holographic system.

Incrementing the Phase Difference Between the LO and Signal Beam

The phase difference between the local oscillator 125 and the reconstructed signal beam 124 can be incremented in operation 508 with the variable phase retarder 130 shown in FIG. 1C. For example, where n=3, a second local oscillator phase is retarded by 120° compared to a first local oscillator phase, and a third local oscillator phase is retarded by 120° compared to the second local oscillator phase. The phase differences described above are thus achieved, where each of the 3 local oscillators has a phase difference of 120° from both others of the 3 local oscillators.

The phase of the first of the n local oscillators does not have to be adjusted. However, variations include methods where the first local oscillator phase is adjusted. For some methods of coherent optical data detection, local oscillator phases are adjusted using a variable phase retarder. In some variations, local oscillator phases are adjusted by other means, including but not limited to changing a path length of the local oscillator prior to combining the local oscillator with a reconstructed signal beam.

Other exemplary embodiments of methods of optical data recording, detection, and channel modulation include, but are not limited to, embodiments where n=4, n=5, or n=6. For example, in a method of coherent optical data detection where n=4 (thus having 4 reconstructed signal beams, 4 local oscillators, and 4 combined beams), each of the 4 local oscillators has a phase difference of 90° (360°/4) from two of the 4 local oscillators, and each of the 4 local oscillators has a phase difference of at least 90° from the 3 other local oscillators. In another embodiment, where n=5 (thus having 5 reconstructed signal beams, 5 local oscillators, and 5 combined beams), each of the 5 local oscillators has a phase difference of 72° (360°/5) from two of the 5 local oscillators, and each of the 5 local oscillators has a phase difference of at least 72° from the 4 other local oscillators. In still another embodiment, where n=6 (thus having 6 reconstructed signal beams, 6 local oscillators, and 6 combined beams), each of the 6 local oscillators has a phase difference of 60° (360°/6) from two of the 6 local oscillators, and each of the 6 local oscillators has a phase difference of at least 60° from the 5 other local oscillators.

Combining N-Rature Homodyne Detected Images

In operation 509 of the n-rature detection process shown in FIG. 5A, the n images are combined to form a quadrature image pair $\tilde{I}_A$ and $\tilde{I}_B$ for further processing. The process of combining the n images into two also cancels common intensity noise, and spatial wavefront demodulation (described below) may be incorporated into the same operation. The $\tilde{I}_A$ and $\tilde{I}_B$ quadrature image pair represents the entire complex optical field of the reconstructed signal beam, and thus contains all the information necessary to recover the stored data. The quadrature image pair can then be processed according to quadrature homodyne detection techniques. Combining the n images into two images reduces the amount of memory and the computational complexity of subsequent processing, which reduces the processing time and/or relaxes requirements on the processor and memory used to perform the processing.

In quadrature homodyne detection, a quadrature combined image can be produced by combining the detected images:

$$\hat{E}_I(x, y) = \cos[\Delta\phi(x, y)]\tilde{I}_A(x, y) + \sin[\Delta\phi(x, y)]\tilde{I}_B(x, y) \quad (12)$$

-continued $$= \frac{P_A(x, y)}{(P_A^2(x, y) + P_B^2(x, y))^{1/2}} \tilde{I}_A(x, y) +$$

$$\frac{P_B(x, y)}{(P_A^2(x, y) + P_B^2(x, y))^{1/2}} \tilde{I}_B(x, y)$$

where $\hat{E}_I$ is the estimated optical field of the signal at the detector, $\tilde{I}_A$ and $\tilde{I}_B$ constitute a quadrature image pair which may have been produced by combination of n n-rature images as described above, or directly by quadrature homodyne detection. $P_A$ and $P_B$ are upsampled peak strength maps based on reserved block patterns distributed throughout the images (described in greater detail below with respect to FIGS. 6A-6D). Eq. (12) shows that the combination process constitutes a projection of the signal, captured in an arbitrary phase basis, back onto its originally-recorded phase basis. The quadrature component of the signal can thus be found by projecting the signal onto a phase basis orthogonal to the first:

$$\hat{E}_Q(x, y) = -\sin[\Delta\phi(x, y)]\tilde{I}_A(x, y) + \cos[\Delta\phi(x, y)]\tilde{I}_B(x, y) \quad (13)$$

$$= \frac{-P_B(x, y)}{(P_A^2(x, y) + P_B^2(x, y))^{1/2}} \tilde{I}_A(x, y) +$$

$$\frac{P_A(x, y)}{(P_A^2(x, y) + P_B^2(x, y))^{1/2}} \tilde{I}_B(x, y)$$

$\hat{E}_I$ and $\hat{E}_Q$ are traditionally referred to as the in phase and quadrature components of the signal. For the case of PQHM, independent data pages may be written in each component, leading to the doubling of storage density. Furthermore, $\hat{E}_Q$ may be computed from the same quadrature image pair using the same upsampled peak strength maps used for $\hat{E}_I$—it is not necessary even to perform correlation operations for the reserved block patterns in the quadrature (Q) page, which may differ from those in the in-phase (I) page. In this manner, a PQHM system can recover two data pages from two holographic exposures, achieving the same detection rate as direct detection.

In an alternative embodiment, quadrature homodyne recombination can be performed twice independently to recover each of the signals. In this case, the reserved block cross-correlations are performed using the known reserved block patterns of the Q page in addition to those of the I page. Q image recombination is performed using Eq. (12) with the Q reserved block pattern cross-correlation peak strengths. In another alternative embodiment, the cross-correlations for both known reserved block patterns are performed, and the results are combined into a single low-noise estimate of the detected phase basis, which is then used in the recombination of both images.

Similar principles apply to reconstruct PQHM data recovered using n-rature homodyne detection and spatial fringe demodulation, both of which are disclosed above and in greater detail below. The n n-rature images so detected may be combined into a quadrature image pair as above, or they may be used to directly determine $\hat{E}_I$ and $\hat{E}_Q$ estimated optical fields as follows. For n-rature homodyne detection with n=3, the expressions in Eqs. (12) and (13) become:

$$\hat{E}_I = \cos(\Delta\phi)\tilde{I}_A + \cos(\Delta\phi - 120°)\tilde{I}_B + \cos(\Delta\phi - 240°)\tilde{I}_C \quad (14)$$

$$= \frac{P_A}{(P_A^2 + P_B^2 + P_C^2)^{1/2}} \tilde{I}_A +$$

$$\cos\left[\cos^{-1}\left(\frac{P_B}{(P_A^2 + P_B^2 + P_C^2)^{1/2}}\right) - 120°\right]\tilde{I}_B +$$

$$\cos\left[\cos^{-1}\left(\frac{P_C}{(P_A^2 + P_B^2 + P_C^2)^{1/2}}\right) - 240°\right]\tilde{I}_C$$

$$\hat{E}_Q = \cos(\Delta\phi - 90°)\tilde{I}_A + \cos(\Delta\phi - 90° - 120°)\tilde{I}_B + \quad (15)$$

$$\cos(\Delta\phi - 90° - 240°)\tilde{I}_C$$

$$= \cos\left[\cos^{-1}\left(\frac{P_A}{(P_A^2 + P_B^2 + P_C^2)^{1/2}}\right) - 90°\right]\tilde{I}_A +$$

$$\cos\left[\cos^{-1}\left(\frac{P_B}{(P_A^2 + P_B^2 + P_C^2)^{1/2}}\right) - 210°\right]\tilde{I}_B +$$

$$\cos\left[\cos^{-1}\left(\frac{P_C}{(P_A^2 + P_B^2 + P_C^2)^{1/2}}\right) - 330°\right]\tilde{I}_C$$

Higher values of n may be accommodated analogously. Note that in these expressions, $P_A$, $P_B$, . . . correspond to the upsampled reserved block correlations for the I image reserved block patterns. One skilled in the art would also recognize that it is possible to modify the expressions in Eqs. (14) and (15) to instead employ correlations for the Q image reserved block patterns, or to incorporate both.

Detector Image Modification

In operation 510 of the n-rature detection process shown in FIG. 5A, a background image representing the local oscillator alone is optionally subtracted from the detected images. This background subtraction reduces or removes the contribution of non-signal terms (the local oscillator) from the in-phase and quadrature images before subsequent processing, and may improve upon common intensity noise cancellation alone, which also serves to reduce the contribution of the local oscillator. This process of removing the non-signal contributions is called detector image modification. It can be applied to n-rature homodyne detection, quadrature homodyne detection, and other coherent channel detection techniques that involve the detection and subsequent processing of images containing a superposition of a local oscillator with the signal of interest.

By convention, the modified image produced by detector image modification is designated with a tilde to distinguish it from the original detector image, e.g., $I_A \rightarrow \tilde{I}_A$. This modification may be performed in several different ways. Typically, $$I_A = I_{LO} + I_{Sig} + 2|E_{LO}||E_S|\cos(\Delta\phi)$$

$$\tilde{I}_A = 2|E_{LO}||E_S|\cos(\Delta\phi) \quad (16)$$

In one embodiment, $\tilde{I}_A$ is computed from $I_A$ simply by subtracting the mean of $I_A$. Typically, $I_{LO}$ is spatially constant and $I_S$ is comparatively small, so subtracting the mean does a fair job of approximating the third term.

Subtracting the mean can be generalized to performing a filtering operation on $I_A$ to produce $\tilde{I}_A$. For example, a spatial high-pass filter would subtract not only the mean, but other slowly-varying components caused by, say, intensity variations in the local oscillator. This can improve performance compared to simply subtracting the mean.

The device can also subtract a reference image from the raw image(s) to produce the modified image(s). This reference image might be generated analytically or empirically. In an embodiment, the reference image is generated simply by taking a detector image of the local oscillator in the absence of a reconstructed signal beam, such as in operation 502 of the n-rature homodyne detection process shown in FIG. 5A. This local oscillator calibration image might be regenerated at varying intervals. In one instance, a local oscillator calibration image might be factory-configured and never changed throughout the operating life of the drive. In another embodiment, the system may generate a fresh local oscillator calibration image before, during, and/or after every recovery operation, or whenever some specified condition is met. In some cases, the local oscillator calibration image is generated using the same local oscillator beam power and exposure time as used during detection of the n-rature homodyne images. The local oscillator calibration image can also be re-normalized to replicate desired exposure conditions.

These detector image modification embodiments are not mutually exclusive. That is, any combination of mean subtraction, spatial filtering, and reference image subtraction can be applied to the n-rature homodyne images.

Spatial Wavefront Estimation and Demodulation

Homodyne detection, including n-rature homodyne detection, involves estimating the phase difference between the signal phase carrier and the local oscillator, e.g., using reserved blocks distributed across the data page. In some cases, misalignment between the wavefront of the local oscillator and the wavefront of the signal beam introduces an additional, undesired phase difference, or spatial wavefront modulation, that manifests in the detected images as a spatial fringe pattern. The periodicity and orientation of the spatial wavefront modulation may vary due to real-world perturbations, such as vibration, heating, or misalignment of components in the optical path. Generally, these perturbations tend to increase the frequency of the spatial wavefront modulation. If the frequency of the spatial wavefront modulation is too high, the estimate of the phase difference may degrade due to aliasing.

Figure 5B:
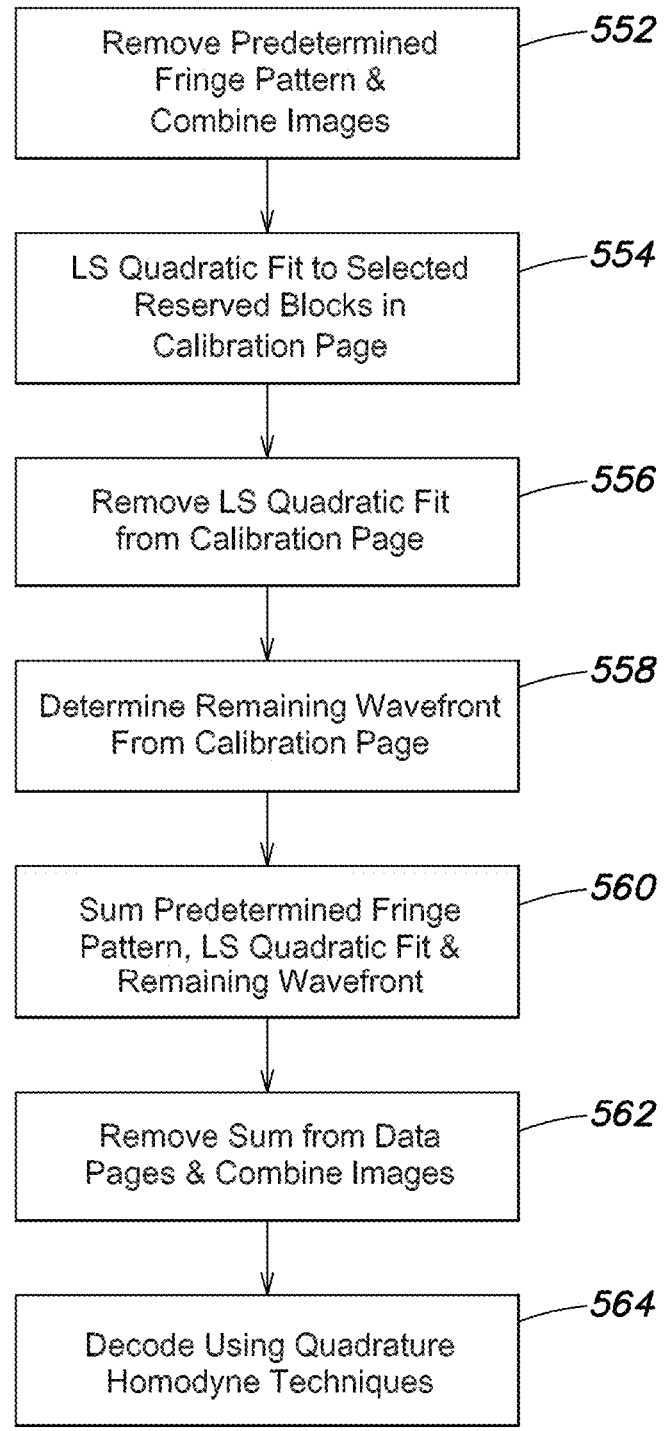
FIG. 5B is a flow diagram illustrating a process for spatial wavefront demodulation.

FIG. 5B illustrates one embodiment of a process—called spatial wavefront demodulation—for removing undesired spatial fringe patterns from the detected images. In optional operation 552, processor removes a predetermined fringe pattern from images of detected calibration pages (described below) stored in the holographic storage medium. This predetermined fringe pattern may be based on a measurement or estimate of static misalignment of optical components in the holographic memory system as explained in greater detail below. The processor also combines the n images of each calibration page into a corresponding quadrature image pair of the calibration page.

In optional operation 554, the processor detects and cross-correlates selected reserved blocks (described below) in each calibration page as described below with respect to FIGS. 6A-6E. It also performs a least-squares two-dimensional quadratic fit to the wavefront represented by the cross-correlations. The processor then removes the least-squares quadratic fit from the corresponding calibration page in operation 556.

In operation 558, the processor detects all or substantially all reserved blocks in each calibration page and uses these reserved blocks to estimate the remaining spatial modulation wavefront affecting the corresponding calibration page. In operation 560, the processor sum the remaining spatial modulation wavefront with the predetermined fringe pattern and the least-squares quadratic fit. It then removes the resulting sum from the images of the data pages retrieved from the holographic storage medium and combines the images of each data page into a corresponding quadrature image pair in operation 562. The processor decodes the demodulated quadrature image pairs to recover the information represented by the data pages in operation 564.

Spatial Wavefront Modulation Due to Medium Positioning Errors

Medium positioning errors during recovery tend to produce a large impact on the spatial wavefront modulation. For instance, consider a holographic recording medium placed at or near a Fourier plane of the SLM. In such a geometry, the optical fields during a recovery operation can be described as a Fresnel approximation using the well-known Fourier optics principle:

$$g(x, y) = h_l \exp\left[j\pi \frac{(x^2 + y^2)(d - f)}{\lambda f^2}\right] F\left(\frac{x}{\lambda f}, \frac{y}{\lambda f}\right) \quad (17)$$

where $g(x,y)$ is the optical field at the detector and $F(v_x, v_y)$ is the Fourier transform of the recorded optical field as if it were emitted entirely from the recorded Fourier plane within the medium. By convention, the notation $$F\left(\frac{x}{\lambda f}, \frac{y}{\lambda f}\right)$$

denotes this Fourier transform scaled by $x=\lambda f v_x$ and $y=\lambda f v_y$. $h_l$ is a scalar factor, $\lambda$ is the recording wavelength, and $f$ is the focal length of the Fourier transform lens (i.e., the recording objective lens). d is the propagation distance from the recorded Fourier plane to the lens, and x and y are the Cartesian coordinates at the detector.

Equation (17) represents the classical Fourier transform property of a lens, but also includes a quadratic phase factor that becomes significant when the recorded Fourier plane is not placed exactly in the lens focal plane, i.e., when $d \neq f$. This condition may represent a height (z axis) error of the position of the recorded hologram with respect to the optical head during recovery. Thus, measurement of the phase difference between the signal beam and the local oscillator and extraction of the quadratic component (for example by projection onto a Zernike or Seidel basis) constitutes a highly accurate estimate of the medium height error. According to one embodiment, this estimate of the medium height error may be used to adjust the relative height of the medium during recovery, e.g., with a servo or other suitable actuator controlled by a processor that estimates the position error(s). According to another embodiment, the estimate of the medium height error may be used to adjust a quadratic phase factor in a local oscillator or reference beam.

Similarly, transverse positioning errors (x and y axes) produce characteristic tilt factors in $\Delta\phi$. According to the shift property of the Fourier transform, $$f(x - x_0) \xrightarrow{\mathcal{J}} \exp(-jk_x x_0) F(k_x),$$

shifting a function $f(x)$ by $x_0$ in the spatial domain introduces a phase factor of $\exp(-jk_x x_0)$ to its Fourier transform $F(k_x)$. Similarly, shifting a function in the y direction by $y_0$ introduces an $\exp(-jk_y y_0)$ factor. Thus, medium position errors in the x and y directions may be measured by extracting the respective tilt components. This may likewise be done with Zernike or Seidel coefficients, or by Fourier transform. According to embodiments of this invention, shift errors may be used to adjust the relative x,y position of recording medium, again using servos or other suitable actuators controlled by a processor that estimates the transverse position error(s).

Predetermined Fringe Demodulation

In operation 552 of the process shown in FIG. 5B, a processor or controller demodulates the images using a predetermined demodulation estimate $\Delta\hat{\phi}$, which may be stored in drive controller memory. Predetermined demodulation estimates, otherwise known as predetermined wavefronts, may be generated by a factory calibration operation, such as by interferometry; by mathematical modeling or simulation; and/or by measurement and/or calibration in the field. Predetermined wavefronts may be used directly for spatial wavefront demodulation as in FIG. 5B and/or with any of the dynamic spatial wavefront demodulation techniques disclosed herein. For instance, a predetermined wavefront may be used as a $\Delta\hat{\phi}$ estimate while demodulating a calibration page, with the resulting empirical $\Delta\hat{\phi}$ estimate being summed with the predetermined wavefront to produce a refined estimate.

In one embodiment, an aberration function corresponding to the design-nominal or as-built performance of the optical system is used as a predetermined wavefront. This approach can enable the use of cheaper or smaller lenses or other optical components. This predetermined wavefront may also be modified according to current conditions to account for changes in environmental conditions (e.g., temperature, vibration), wavelength, etc.

One or more predetermined wavefronts can also be used to remove the known phase aberrations imparted by a phase mask. Phase masks are commonly used to mitigate the effects of the "DC hot spot" and inter-pixel noise in ASK-modulated data. The use of a phase mask along with a predetermined wavefront estimate allows the application of spatial wavefront demodulation to ASK modulation and other modulation schemes that use phase masks.

Reserved Blocks Cross-Correlations for Estimating Spatial Wavefront Modulation

In operations 552, 554, and 556 of the process shown in FIG. 5B, a processor or controller generates an estimate $\Delta\hat{\phi}$ of the spatial modulation $\Delta\phi$ and demodulates the images accordingly using reserved blocks in the data pages. As explained in U.S. Pat. No. 7,848,595, which is incorporated herein by reference in its entirety, each reserved block comprises a predetermined pattern of pixels (e.g., an 8×8 pattern) selected to have desired autocorrelation and cross-correlation properties. The reserved blocks are distributed throughout each data page, e.g., in a predetermined grid pattern. Cross-correlating the reserved blocks detected in an in-phase or quadrature image with the predetermined reserved block patterns yields information suitable for estimating the spatial modulation $\Delta\phi(x,y)$.

The reserved blocks may serve other purposes as well. With oversampled images, for example, the reserved blocks can serve as fiducials for image alignment measurement. Since the reserved block data patterns are known, they may also be used for signal-to-noise ratio (SNR) calculation. In addition, the specific patterns employed for the reserved blocks may also be selected to eliminate or reduce pattern-dependent autocorrelation noise, e.g., by reducing cross correlations between oversampled versions of regions of the reserved block patterns, rather than the original binary versions.

In order to prevent noise from neighboring data pixels from impacting the alignment measurement, cross correlations may be calculated over an upsampled reserved block target pattern corresponding to only an interior region of the reserved block. For example, an 8×8 pixel binary reserved block pattern can be selected such that the cross correlation of the inner 6×6 pixel sub-block with any of the other eight edge-bordering 6×6 pixel sub-blocks is zero. Similarly an interior region corresponding to the inner 6×6 pixel sub-block can be used to derive the target pattern.

FIG. 6A illustrates a process for cross-correlating an upsampled reserved block target pattern. A processor or controller identifies one or more windows of interest 604 in a detected image 602. The shapes, sizes, and locations of the windows of interest 604 may be based on a priori knowledge of the reserved blocks in the data page corresponding to the detected image 602. The processor or controller cross-correlates (designated by the $\hat{x}$ symbol) each window of interest 604 with an upsampled reserved block target pattern 626, derived from binary reserved block pattern 606, shown in FIG. 6A as an 8×8 pixel binary reserved block pattern 606 that includes white pixels representing +1 (or 0°) binary phase values and black pixels representing −1 (or 180°) binary phase values. (Because the detector resolution is usually higher than the SLM resolution, the number of pixels in the detected image is greater than the number of pixels in the data page. To compensate for this difference, the reserved block pattern in the data page is upsampled to the detector resolution before cross-correlation.)

Overlaid on an inner 6×6 pixel sub-block of the binary reserved block pattern 606 is an 8×8 grid 616 showing the locations corresponding to target pattern pixels. Upsampled reserved block target pattern 626 shows the results of upsampling the inner 6×6 pixel sub-block simply by integrating the values of binary reserved block pattern 606 within each of the grid cells of the overlaid 8×8 grid 616. In other embodiments, the process of upsampling may be enhanced to incorporate an optical point spread function (PSF) in a manner that will be readily apparent to one skilled in the art.

The cross-correlation produces cross-correlation matrix 610, wherein sampled peak 612 is identified as the largest value. The location of 612 can be used for image alignment in resampling. A processor or controller may also interpolate the location of correlation peak 612 to interpolated location 614 for sub-pixel resolution (e.g., by using a centroid operation). An array of cross correlation peak location information and/or interpolated cross correlation peak location information constitutes a quiver alignment array.

Figure 6B:
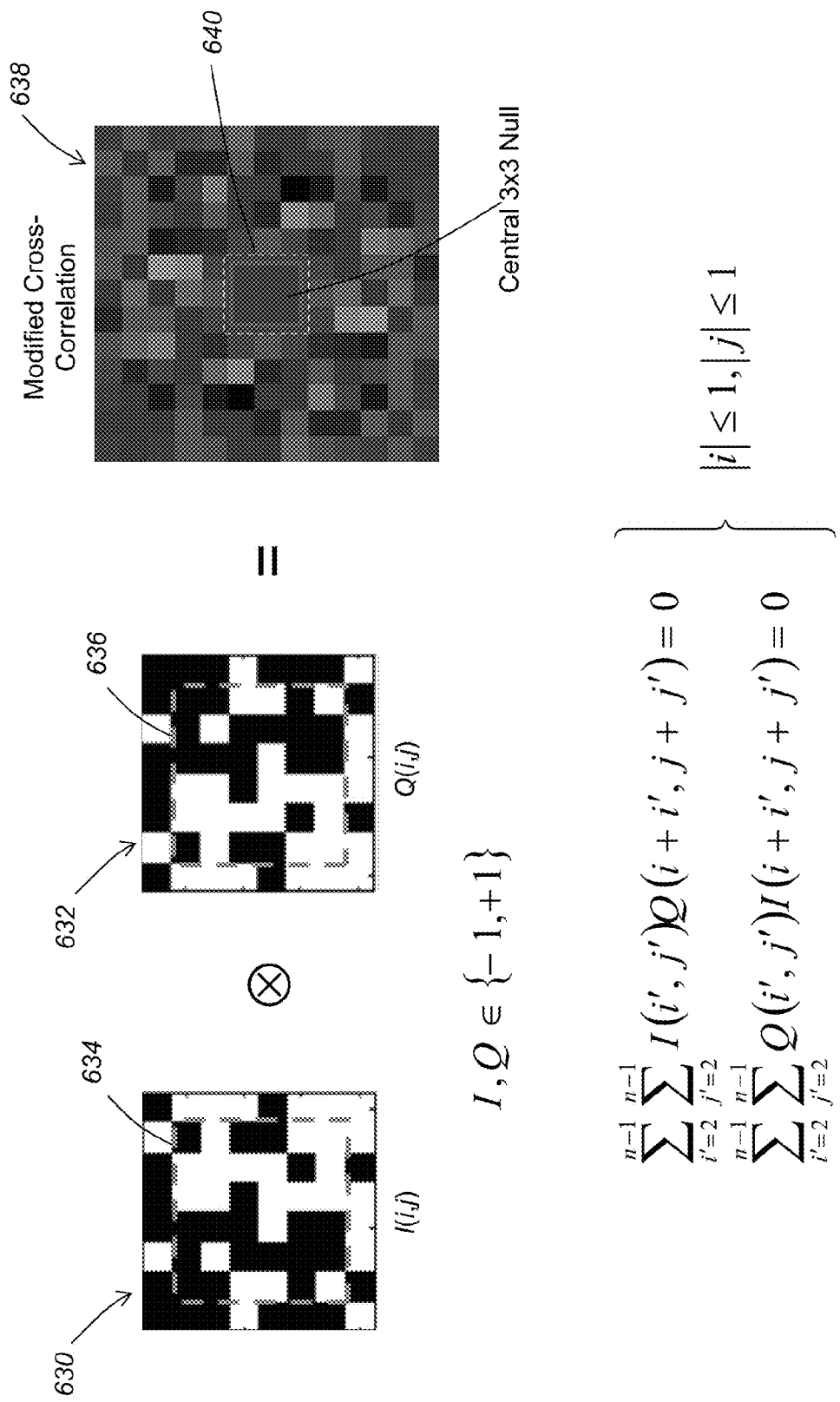
FIG. 6B is a flow diagram illustrating a reserved block equalization.

FIG. 6B illustrates how the specific patterns for the reserved blocks may also be selected based on the technique use to record the holograms. For instance, the reserved blocks can be used to reduce the quadrature cross talk noise between the reserved blocks of the in-phase hologram and the corresponding reserved blocks of the quadrature hologram recorded in quadrature multiplexing. In FIG. 6B, quadrature cross talk noise is eliminated or reduced by selecting binary 8×8 I reserved block pattern 630 such that: (1) the matrix 638 generated by the cross correlation between binary 8×8 I reserved block pattern 630 and inner 6×6 sub-block 636 of binary Q reserved block pattern 632 has a value of zero in the central 3×3 locations 640; and conversely (2) the matrix generated by the cross correlation between binary 8×8 Q reserved block pattern 632 and inner 6×6 sub-block 634 of binary I reserved block pattern 630 also has a value of zero in the central 3×3 locations. These additional constraints are analogous to those that prevent autocorrelation noise within each reserved block.

In yet another embodiment of PQHM recording, the reserved block patterns in in-phase (I) and quadrature (Q)

pages are identical, resulting in the detection of Δφ with a 45° offset, i.e., halfway between the I and Q holograms, rather than aligned with the I (or alternatively, Q) hologram. In such a case the offset can be subtracted, and quadrature homodyne detection performed as usual.

Figure 6C:
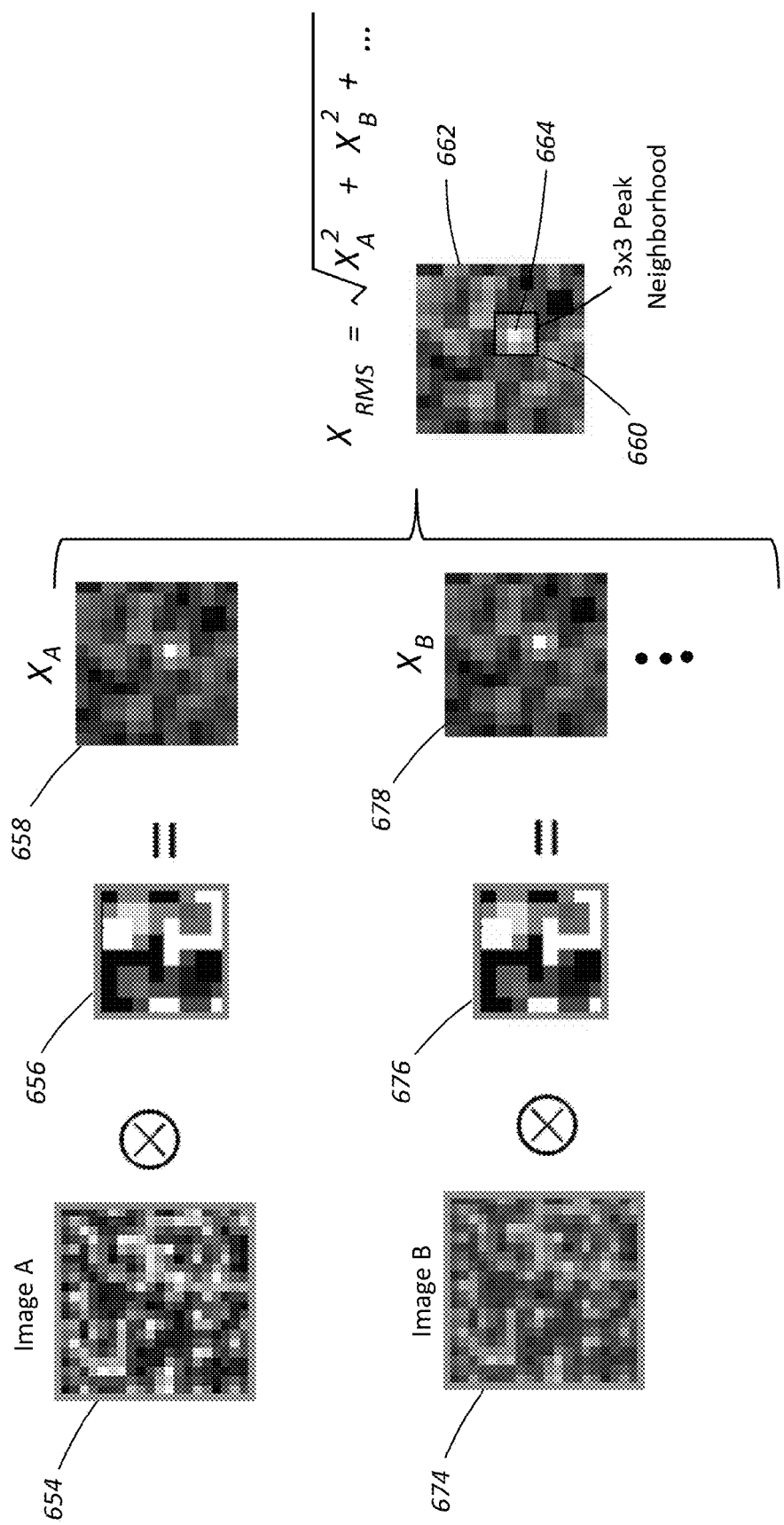
FIG. 6C is a flow diagram illustrating a reserved block cross correlation process for n-rature homodyne detection and quadrature homodyne detection.

FIG. 6C illustrates a process for generating a cross-correlation peak strength map from n images (e.g., image A, image B, . . . ) detected using n-rature homodyne detection. Cross-correlation peak strengths measure the projection of the detected signal onto the reserved block pixel pattern, and thus provide contrast information about the pixels in the region encompassing the reserved block. As in the process shown in FIG. 6A, a processor or controller identifies and locates one or more windows of interest 654 and 674 in the respective detected images A and B (not shown). Each window of interest 654 and 674 is then cross-correlated with a corresponding upsampled reserved block target pattern 656 and 676 to produce corresponding sampled correlation matrices 658 and 678. The processor or controller combines correlation matrices 658 and 678 ($X_A$, $X_B$, . . . ) (e.g., by computing a root-mean-square (RMS) sum, $X_{RMS}$, of the peak matrices) in order to produce combined sampled correlation matrix 662.

The peak is then determined as the largest value in combined correlation matrix 662 ($X_{RMS}$), for instance pixel 664. The processor then chooses a 2×2, 2×3, 3×2 or 3×3 peak neighborhood of pixels constituting the peak neighborhood 660 according to a peak neighborhood rule. For example, a peak neighborhood might include both the pixel to the left of the peak and the pixel to the right of the peak if the values of those two pixels are within 50% of each other; otherwise it might include only the larger of the two. Similarly, the neighborhood might include both the pixel above the peak and the pixel below the peak if their values are within 50% of each other; otherwise it might include only the larger of the two. The peak itself is included in the peak neighborhood. Pixels diagonal to the peak would then be included if they have three neighbors included in the peak neighborhood according to the previous rules, yielding the 2×2, 2×3, 3×2 or 3×3 peak neighborhood. Once the peak neighborhood has thus been established within combined correlation matrix 662, the processor locates the corresponding neighborhoods in sampled correlation matrices 658 and 678, and sums the values of the pixels in those neighborhoods to yield peak strengths $P_A$, $P_B$, . . . . The peak strengths of all reserved blocks are combined to form peak strength maps that can be used to estimate the spatial modulation as explained below.

Figure 6D:
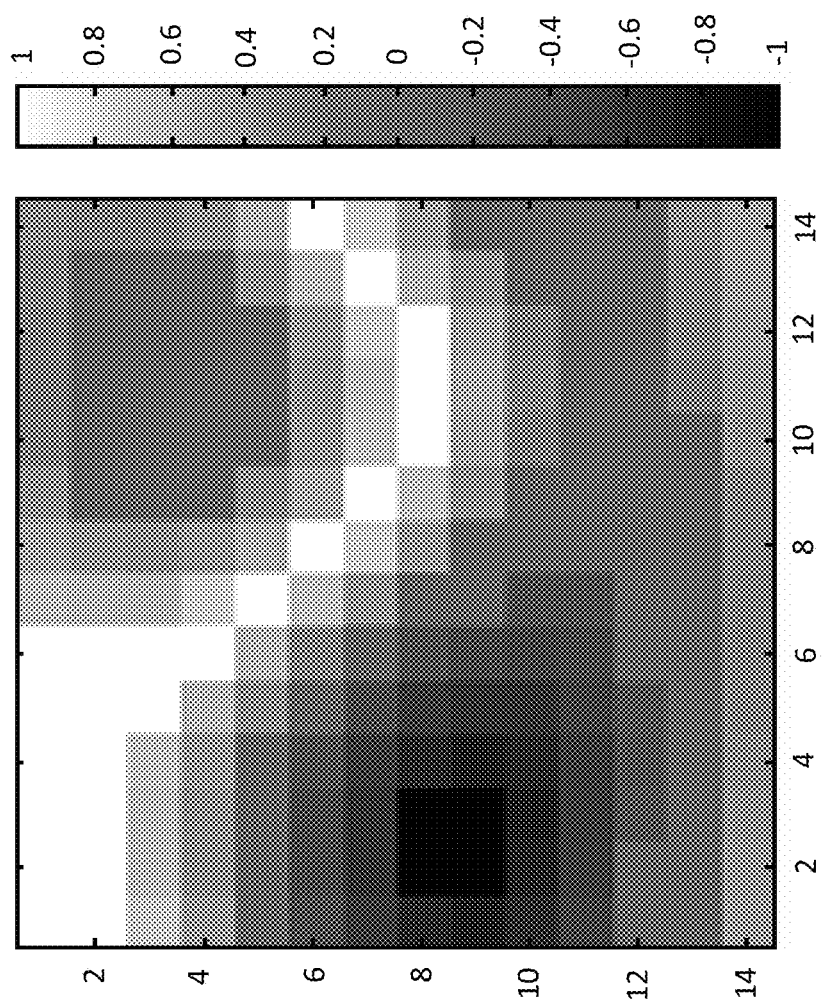
FIGS. 6D and 6E are cross-correlation peak strength maps for reserved blocks in a pair of quadrature homodyne detection images.
Figure 6E:
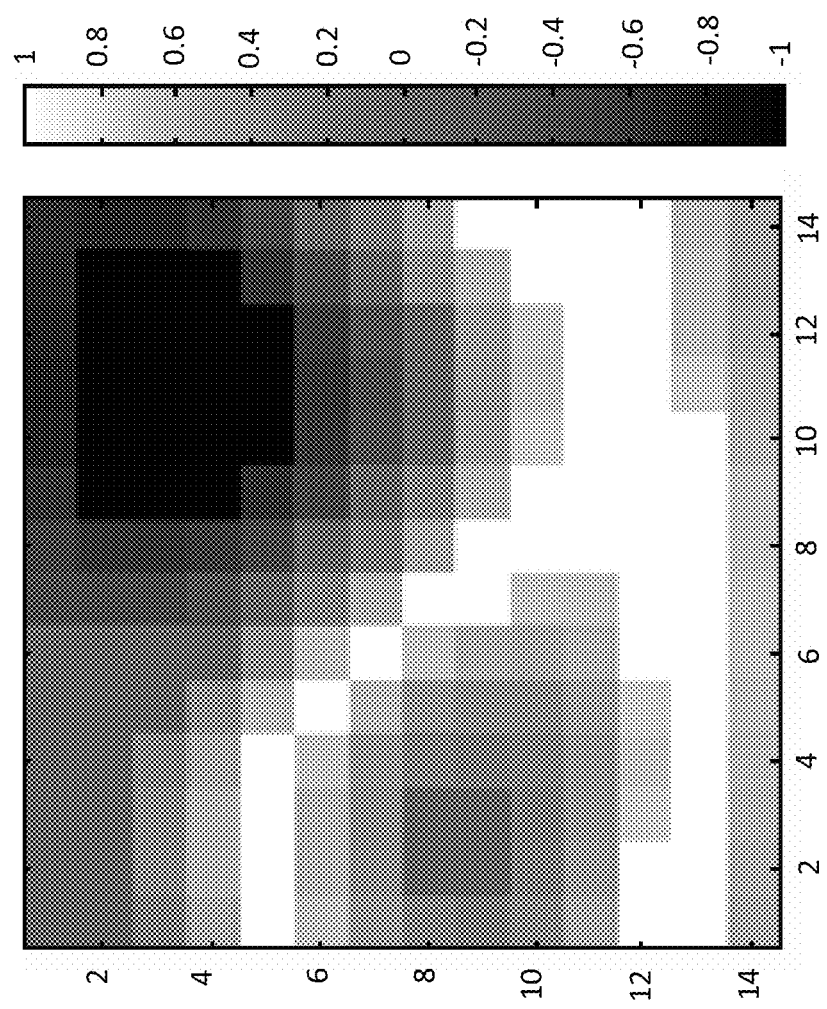

FIGS. 6D and 6E show normalized cross correlation raw peak strength maps for a simulated in-phase image $I_A$ and a simulated quadrature $I_B$ image, respectively. The peak strength maps were generated by sampling the peak strengths in each of the 14×14 reserved blocks embedded within the simulated images. In FIGS. 6D and 6E the peak strength values have been normalized to span the range −1 . . . +1, although normalization is not necessary. Raw peak maps may then be upsampled to interpolate peak strengths to the location of every camera pixel producing upsampled peak strength maps $P_A(x,y)$, $P_B(x,y)$, . . . using any suitable interpolation method, e.g., a bilinear interpolation function.

Regions that are in high contrast and non-inverted in the detected images show large positive peak strength values (approaching +1) in FIG. 6D and FIG. 6E. Similarly, inverted regions with high contrast have large negative peak strength values approaching −1. In the case of quadrature images, the two peak strength maps represent quadrature projections of the spatial modulation Δφ(x,y) onto the locally-varying recovery phase basis. The spatial modulation may be estimated by the expression $$\Delta\hat{\phi}(x,y)=\tan^{-1}[P_B(x,y),P_A(x,y)] \quad (18)$$

where $\Delta\hat{\phi}$ is the estimate of $\Delta\phi(x,y)$ and $\tan^{-1}$ is the four-quadrant arctangent. In n-rature detection, the n detector images may be combined into quadrature and processed according to Eqn (18). Alternatively, Δφ(x,y) may be estimated directly by $$\Delta\hat{\phi}=\tan^{-1}(\sqrt{3}(P_C-P_B),2P_A-P_B-P_C) \quad (19)$$

in the case where n=3, by $$\Delta\hat{\phi}=\tan^{-1}(P_B-P_D,P_A-P_C) \quad (20)$$

when n=4, and by $$\Delta\hat{\phi} = \tan^{-1}\left(\frac{1-\cos(2\alpha)}{\sin(\alpha)}(P_D - P_B), 2P_C - P_E - P_A\right) \quad (21)$$

when n=5. Similar expressions for other values of n may be determined by those skilled in the art.

In some embodiments, the spatial modulation estimate $\Delta\hat{\phi}$ is represented as a function including samples corresponding to each pixel, or to groups of pixels. In other embodiments, the spatial modulation estimate $\Delta\hat{\phi}$ is represented in non-sampled form, for example by Zernike or Seidel coefficients for components of interest. For example, the spatial modulation estimate $\Delta\hat{\phi}$ can be represented compactly by three "position registers" indicating the tip, tilt, and focus terms of the wavefront corresponding to the medium positioning errors.

Least-Squares Fitting for Estimating Spatial Wavefront Modulation

If desired, the spatial phase modulation estimate $\Delta\hat{\phi}$ derived from the peak strength maps (e.g., including those shown in FIGS. 6D and 6E) can be refined by performing a fitting operation to the available data points, which may be derived from peak strengths of selected reserved blocks. For instance, the spatial phase modulation estimate can be refined by performing a least-squares fit of available data points to a constrained $\Delta\hat{\phi}$ function as in operation 556 of FIG. 5B. In some cases, the $\Delta\hat{\phi}$ function could be constrained to include only tilt and quadratic terms as would be expected from pure mechanical medium position errors. The available data points could be drawn from the reserved block correlations from an ordinary data page. A processor coupled to the detector performs the fit accounting for the arbitrary piston term and any 2π phase wrapping that appears in the reserved block measurement. (The full unwrapped version of the reserved block measurement could be used for the $\Delta\hat{\phi}$ estimate.) In this manner, a smooth, accurate quadratic estimate can be produced even if the wrapped fringe pattern exceeds the sampling resolution of the reserved block sample grid. The resulting refined spatial modulation estimate can be demodulated from the images as explained in greater detail below.

Calibration Pages for Spatial Wavefront Demodulation

In some cases, the spatial modulation $\Delta\hat{\phi}$ may contain frequency components higher than those that may be resolved by the reserved blocks in the data pages. If desired, the higher frequency components can be detected and estimated with calibration holograms interspersed among the other holograms. In one embodiment of this technique, a calibration page includes a higher density of reserved blocks than a data page and is therefore able to resolve higher fringe frequencies. For example, if a data page includes 8×8 pixel reserved blocks interspersed on a 64×64 reserved block sample grid, a calibration page could include reserved blocks of the same form on an 8×8 pixel grid along with data interspersed among the reserved blocks. Alternatively, a calibration page could consist essentially of reserved blocks, and would be able to sample spatial frequencies eight times higher than the reserved blocks in a data page. The $\Delta\hat{\phi}$ estimate could then be produced using methods almost entirely identical to the methods during homodyne detection decoding, for example by applying equation (18, (19), (20), or (21).

Alternatively, a uniform $\Delta\phi$ calibration page could be recorded (i.e., all pixels in the same state), and the phase $\Delta\hat{\phi}$ could be determined based on the detected interference pattern. In other embodiments, larger or smaller reserved block patterns could be used, and multiple sizes could be used simultaneously. For example, a separate set of correlation operations could be performed on 4×4 pixel subsections of the reserved blocks to produce a higher-resolution, but noisier estimate of $\Delta\phi$, and then this estimate could be combined with the standard-resolution estimate to produce a superior quality estimate. Lower-resolution but less noisy estimates could similarly be produced from larger patterns, e.g., 16×16 reserved block patterns.

If desired, calibration pages may be inserted so that the spatial phase modulation estimate $\Delta\hat{\phi}$ may be recalculated any time the spatial phase modulation $\Delta\phi$ is likely to change significantly. For books of angle-multiplexed holograms, for example, $\Delta\phi$ may change significantly when moving to a new book because of the mechanical uncertainty in the x,y (or r, θ in the case of a disk-shaped medium) movement. Hence, it is advantageous to include a $\Delta\phi$ calibration page at the first recovery angle of each book. In at least one embodiment, a $\Delta\phi$ calibration page is recorded and recovered at the first angular address of each book, and the resulting $\Delta\hat{\phi}$ estimate is used to demodulate all of the remaining pages in the book. In such an implementation, the overhead incurred by $\Delta\phi$ calibration pages can be relatively low since there may be hundreds of holograms in a book.

In other embodiments, the fraction of calibration pages may be increased to provide redundancy, or to account for other sources of changes to the spatial wavefront modulation. For example, if x,y (or r, θ) mechanical moves are performed within a book ("short-stacking"), then a $\Delta\phi$ calibration page could be recorded at the first angular address of each short stack.

Blind De-Aliasing for Estimating Spatial Wavefront Modulation

In still another embodiment, a higher-quality estimate $\Delta\hat{\phi}$ of the spatial wavefront modulation may be generated by performing blind de-aliasing on an aliased estimate of the spatial wavefront modulation. For example, suppose an aliased estimate is produced by interpolating reserved block samples in an ordinary data page recovered with a large tilt component. In such a case, the estimate $\Delta\hat{\phi}$ will exhibit a Fourier peak at a spatial frequency which is an aliased version of the true frequency. The set of true frequencies that will alias to the observed frequency is discrete, so it is possible to blindly replace the observed frequency with candidates from this set and retry the page decoding operation. If the page is decoded correctly according to cyclic redundancy check (CRC) codes or similar integrity checks within the recorded data, then the chosen candidate spatial frequency is likely the true spatial frequency. This procedure can be repeated with or without actually repeating holographic exposures until either the correct spatial frequency is found, or until the set of reasonable candidate spatial frequencies is exhausted.

Spatial Wavefront Demodulation (aka LO Fringe Demodulation)

As explained above, given an estimate $\Delta\hat{\phi}$ of the undesired spatial wavefront modulation, a phase factor corresponding to $\Delta\phi$ may be demodulated (removed) from detected holographic images using a suitable processor, e.g., as in operations 558 and 564 of the spatial wavefront demodulation process shown in FIG. 5B. Local oscillator spatial wavefront demodulation can remove high-frequency components of the local oscillator fringe pattern that would otherwise cause aliasing when sampled by data page reserved blocks, leading to degraded performance. Local oscillator spatial wavefront demodulation can thus be used to increase tolerance to medium positioning errors, or to undesired components of $\Delta\phi$ introduced for any other reason, e.g., thermal distortion of the hologram, manufacturing imperfections, Bragg mismatches during hologram recovery, etc.

Local oscillator spatial wavefront demodulation may be performed at different stages of acquiring and processing the detected holographic images. For instance, demodulation can be performed at any stage while the images are still at the detector resolution (as opposed to the SLM resolution), e.g., before coarse alignment determination (if any); after coarse alignment but before reserved block correlation operations; and/or after reserved block correlation operations. In practice, it is advantageous to perform detector domain local oscillator fringe demodulation before any coarse alignment or reserved block correlation operations, as those operations can benefit from fringe demodulation.

For quadrature homodyne detection, demodulated images $I_A'$ and $I_B'$ can be expressed in terms of the estimated phase $\Delta\hat{\phi}$ of with the spatial wavefront modulation and the raw images $I_A$ and $I_B$:

$$I_A' = I_A \cos(-\Delta\hat{\phi}) + I_B \sin(-\Delta\hat{\phi})$$

$$I_B' = I_A \sin(-\Delta\hat{\phi}) + I_B \cos(-\Delta\hat{\phi}) \quad (22)$$

The demodulated images $I_A'$ and $I_B'$ may be processed using the desired quadrature homodyne detection or resampled quadrature homodyne detection process. (If desired, raw images recovered using n-rature homodyne detection can be combined to form a pair of in-phase and quadrature images that can be demodulated according to Eq. (22). Combining the n-rature homodyne detection images before demodulation reduces the memory and processing burdens associated with the spatial wavefront demodulation process.)

The effect of the $-\Delta\hat{\phi}$ phase factor in each term in Eq. (22) is to largely cancel the existing $\Delta\phi$ within the raw images. For tilt fringe components, this is analogous to baseband demodulation of the carrier frequency from a frequency-modulated signal. The demodulated images retain a phase factor of the difference $\Delta\phi-\Delta\hat{\phi}$. However, even if this difference is relatively large (i.e., the estimate is poor), it is likely to reduce the frequency of remaining fringe components, thus reducing the likelihood of fringe pattern aliasing in subsequent processing.

For n-rature homodyne detection (including resampled n-rature homodyne detection, discussed below), the demodulation process is similar. For n=3:

$$I_A' = I_A \cos(-\Delta\hat{\phi}) + I_B \cos(120°-\Delta\hat{\phi}) + I_C \cos(240°-\Delta\hat{\phi})$$

$$I_B' = I_A \cos(-120°-\Delta\hat{\phi}) + I_B \cos(-\Delta\hat{\phi}) + I_C \cos(120°-\Delta\hat{\phi})$$

$$I_C' = I_A \cos(-240°-\Delta\hat{\phi}) + I_B \cos(-120°-\Delta\hat{\phi}) + I_C \cos(-\Delta\hat{\phi}) \quad (23)$$

Different descriptions of these processes, perhaps including constant phase offsets or trigonometric functions, may be formulated without departing from the scope of the invention.

The number of images may also be changed in the demodulation process. An example of this principle is in the combination of three or more n-rature detection images into two images constituting a quadrature image pair, which may subsequently be processed using quadrature homodyne detection techniques instead of n-rature homodyne detection techniques. For n=3:

$$I_A'=I_A \cos(-\Delta\hat{\phi})+I_B \cos(120°-\Delta\hat{\phi})+I_C \cos(240°-\Delta\hat{\phi})$$

$$I_B'=I_A \cos(90°-\Delta\hat{\phi})+I_B \cos(90°+120°-\Delta\hat{\phi})+I_C \cos(90°+240°-\Delta\hat{\phi}) \quad (24)$$

Consolidating images n-rature detection images into two images preserves the common intensity noise cancellation of n-rature homodyne detection, while reducing the memory use and computation in the later stages since the number of images has been reduced. Equations (23) and (24) may be generalized to demodulate $\Delta\phi$ from any starting number of images n into any finishing number of images m:

$$I'_j = \sum_{i=0}^{n-1} I_i \cos(i\theta_n - \Delta\hat{\phi} - j\theta_m) \quad (25)$$

$$j = 0 \ldots m-1$$

where the image subscripts A, B, C, etc. . . . have been replaced by the numbers 0, 1, 2, etc. . . . , (e.g., $I_B'$ becomes $I_1'$). n is the initial number of images, and m is the final number. The phase shift values, $\theta_n$ and $\theta_m$, may be given by:

$$\theta_n = \begin{cases} 90° & n=2 \\ 360°/n & \text{otherwise} \end{cases} \quad (26)$$

$$\theta_m = \begin{cases} 90° & m=2 \\ 360°/m & \text{otherwise} \end{cases}$$

In this manner, image sets may be converted from quadrature or n-rature of any n to quadrature or n-rature of any m.

Adaptive Optical Fringe Demodulation

Fringe demodulation may also be effected during detection, instead of or in addition to during post-processing, by physically changing the wavefront of the local oscillator and/or signal beam to more closely match each other. For instance, a beam steering device, such as piezo-mounted mirror or other beam deflector, can be used to adjust a tilt component of the local oscillator's and/or signal beam's spatial wavefront. The quadratic component of the local oscillator's and/or signal beam's spatial wavefront can be adjusted with a zoom lens, SLM, deformable mirror, or other suitable optical element. Similarly, an adaptive optics element, such as an SLM or a deformable mirror, is used to adjust an arbitrary component of $\Delta\phi$ as determined, e.g., by Zernike or Seidel coefficients.

Refocusing by Beam Propagation

If desired, the quadratic phase error associated with error(s) in the position of the detector with respect to the focal plane of the hologram can be estimated and/or compensated using a suitable beam propagation algorithm. It is well known that the digitally-sampled complex optical field distribution at one transverse plane can be algorithmically transformed to that of another transverse plane by means of a beam propagation algorithm. Thus, in cases where a focus error exists, the out-of-focus detected image can be converted to an in-focus image if the focus error is known. In the case where the focus error is not known, the controller may iteratively try beam propagation refocusing using different propagation distances, selecting that distance that optimizes a given figure of merit, such as the SNR of the detected signal.

FIGS. 7A-7D are plots of SNR versus beam propagation refocusing distance for different alignments of the detector with respect to the focal plane of the reconstructed hologram. Refocusing was performed on a hologram recovered in 4-rature homodyne detection and converted to a quadrature image pair during the removal of a calibrated spatial wavefront. A complex wavefront was generated by $E(x,y)=I_A'(x,y)+i I_B'(x,y)$ where $I_A'$ and $I_B'$ are the quadrature image pair and E is the complex optical field. E was then transformed according to a beam propagation algorithm. The values of $I_A'$ and $I_B'$ were then replaced by the real and imaginary parts of the transformed E, and processing continues.

Figure 7A:
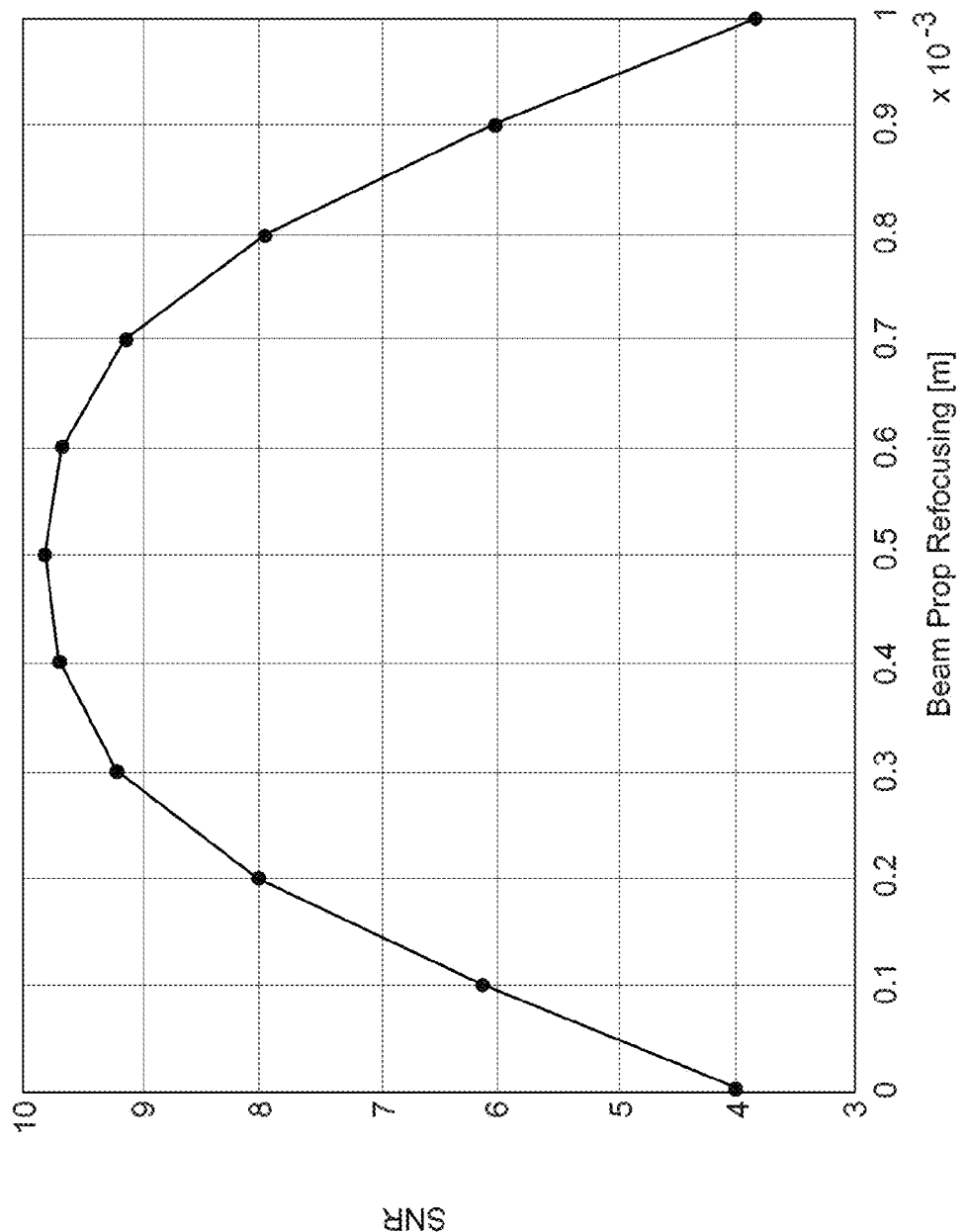
FIGS. 7A-7D are plots of signal-to-noise ratio (SNR) versus beam propagation refocusing position for different alignments of the detector with respect to the focal plane of the reconstructed image (see FIGS. 1C and 2).
Figure 7B:
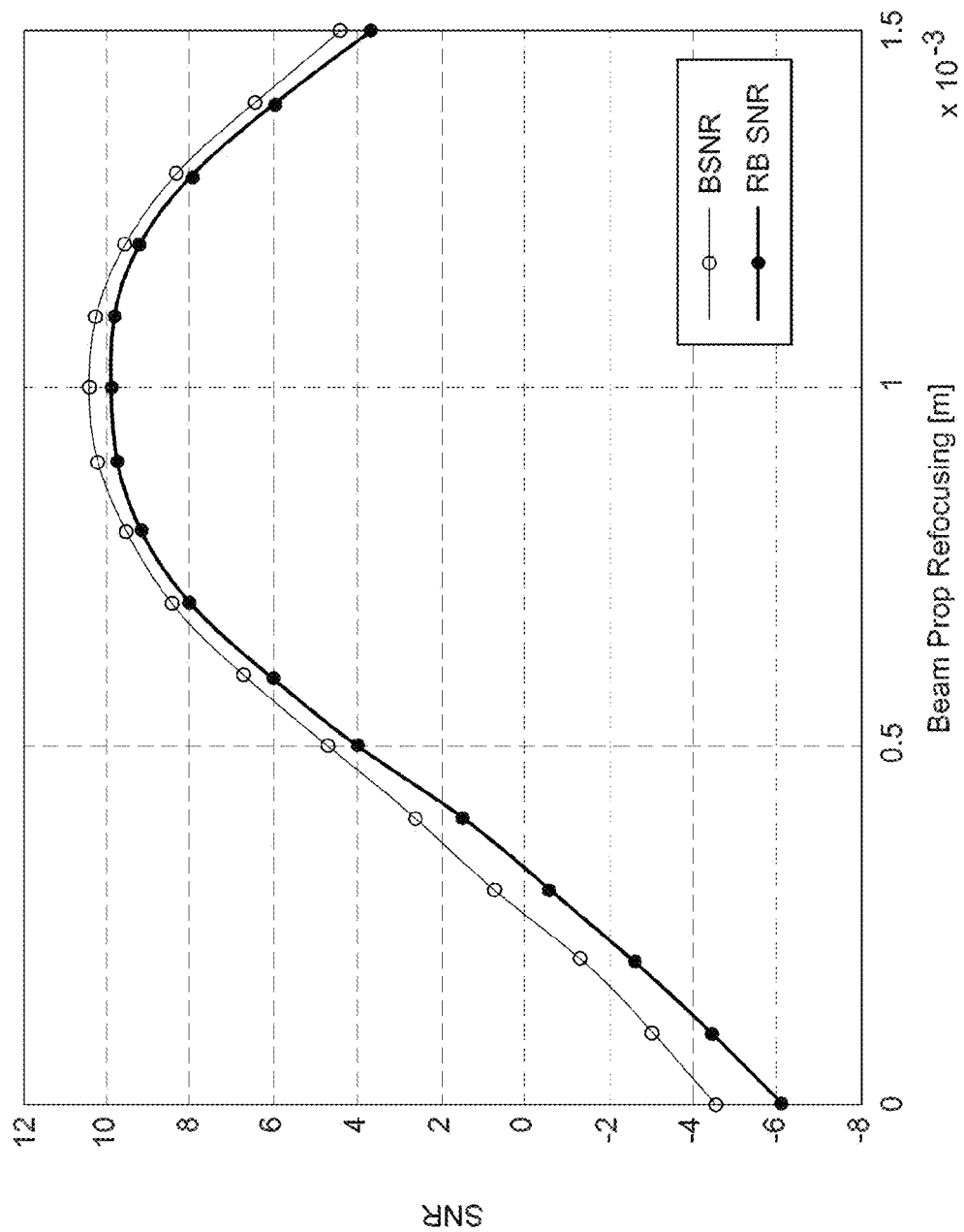

FIG. 7A shows an SNR increase of about 6 dB using numerical refocusing to compensate for a detector that was positioned about 0.5 mm from the focal plane. FIG. 7B shows a 14 dB to 16 dB increase in the SNR for the same hologram with the detector that was positioned about 1.0 mm from the focal plane. (The upper curve indicates SNR calculated using reserved blocks and the lower curve indicates SNR calculated using BER.)

Figure 7C:
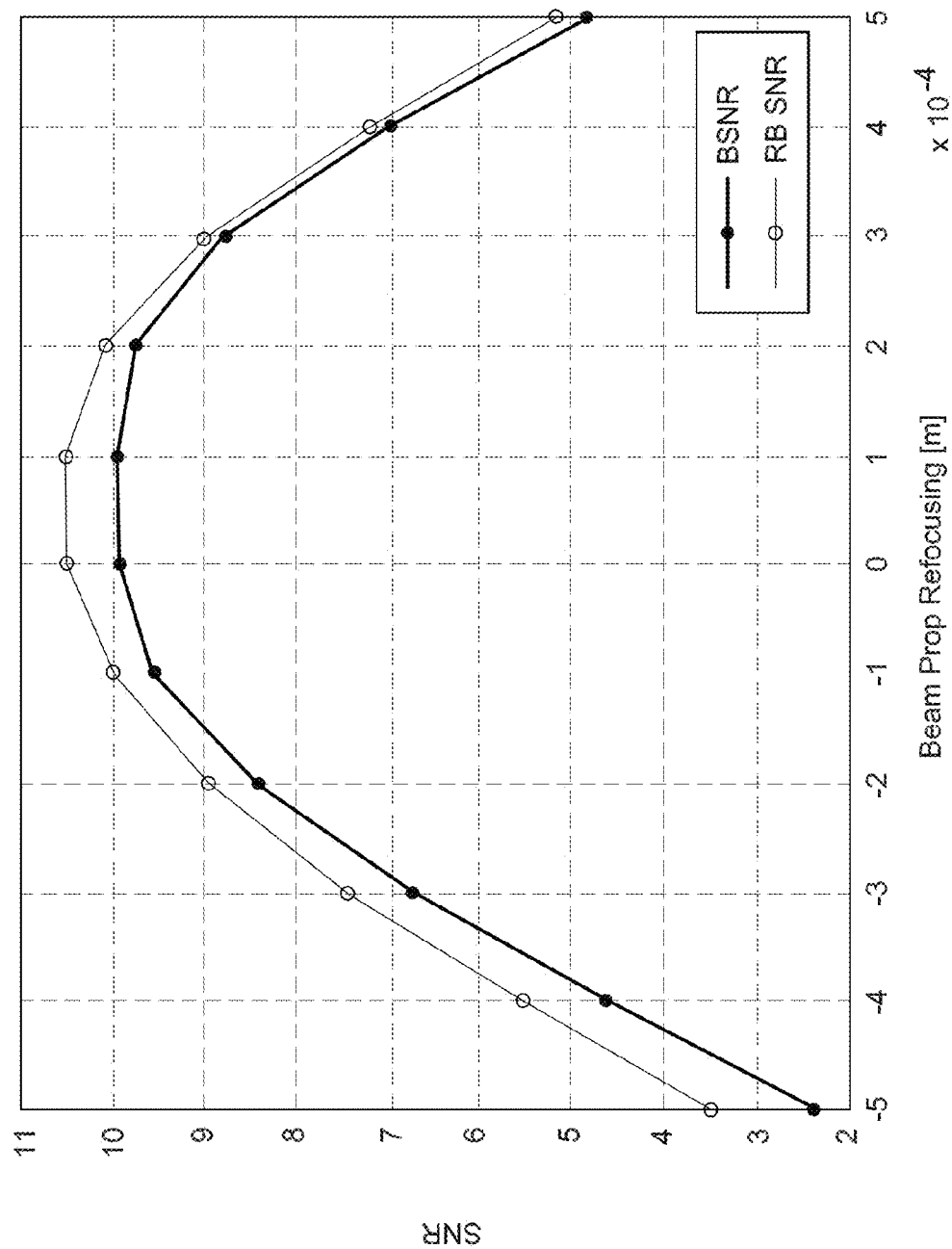
Figure 7D:
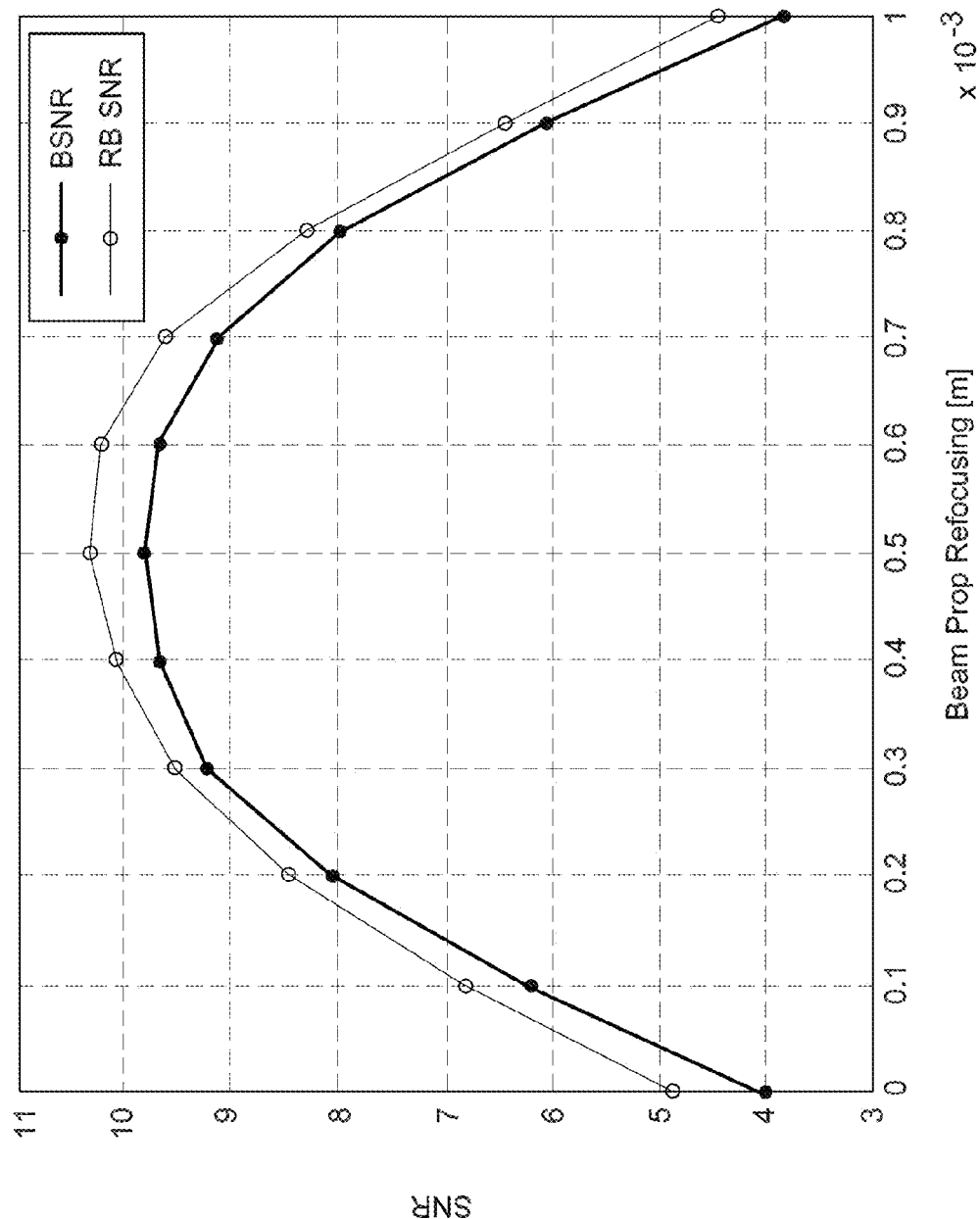

FIGS. 7C and 7D show SNR versus refocusing distance for the same hologram with the detector in the focal plane (FIG. 7C) and the detector positioned 0.5 mm from the focal plane (FIG. 7D). Again, the upper curves indicate SNR calculated using reserved blocks and the lower curves indicate SNR calculated using BER. The peak SNR is roughly the same in all cases shown in FIGS. 7A to 7D and reflects little to no loss in SNR loss from beam propagation. Refocusing by beam propagation thus represents a method to restore SNR lost because of a detector focal plane error caused by any reason, be it factory alignment error, change in focus due to environmental or operating condition perturbations, or change in focal plane due to interchange.

Resampling and Enhanced Resampling of Phase Quadrature Multiplexed Images

In a typical holographic data storage system, the resolution of the detector may exceed the resolution of the data page. In the system 100 of FIGS. 1A-1C, for example, the detector 142 has more elements than the SLM 130. As a result, an image detected using n-rature homodyne detection may have more pixels than the underlying data page. Fortunately, this resolution mismatch can be compensated by resampling (downsampling) the detected image from the detector resolution to the data page resolution.

Figure 8A:
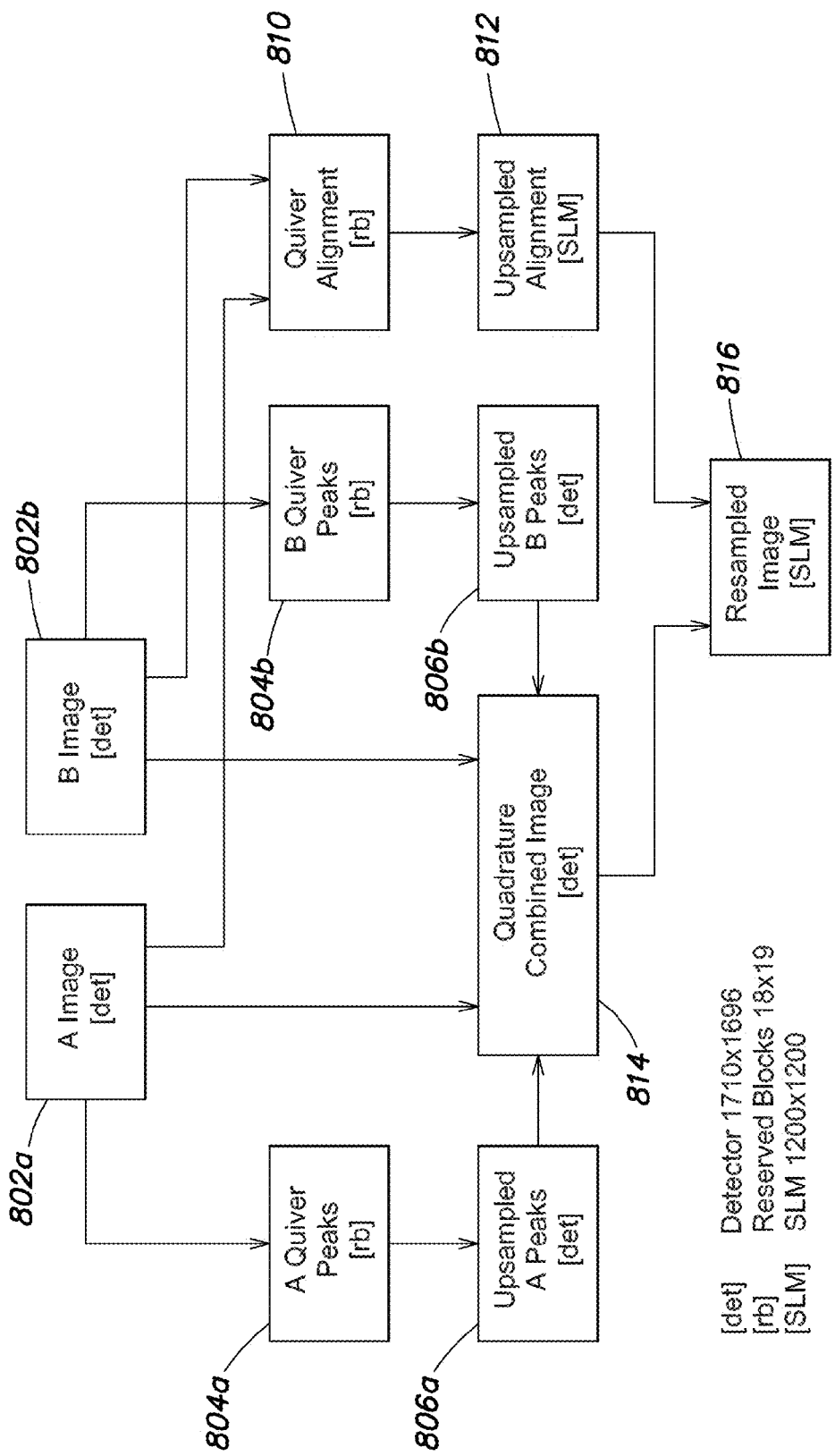
FIG. 8A is a flow diagram that illustrates a first process for resampling coherently detected images.

FIGS. 8A and 8B illustrate processes for resampling in-phase and quadrature images recovered from a PQHM holographic storage medium using n-rature homodyne detection or another suitable detection process. Each block in FIGS. 8A and 8B represents a 2D array containing data associated with the process step, along with the size/resolution of the particular array. Arrays marked with size/resolution "[det]" indicate that the data therein correspond to detector pixels, and the array would typically have size equal to that of the detector array, e.g., 1710 rows by 1696 columns of pixels in an exemplary embodiment. Arrays marked with size/resolution "[SLM]" indicate that the data therein correspond to SLM pixels, typically with array size equal to the SLM size, e.g., 1200 rows by 1200 columns of pixels in an exemplary embodiment. Typically, the detector has more pixels than the SLM since the detector oversamples the SLM in order to resolve the modulated data pattern. Arrays marked with size/resolution "[rb]" indicate that the data therein correspond to reserved blocks, which are known data patterns embedded within the holographic data page format. These arrays may have, e.g., 18 rows by 19 columns of entries corresponding to the 18×19 reserved block distribution of an exemplary data page.

The process of FIG. 8A can be implemented with a processor or controller to combine Image A 802a and Image B 802b (collectively, images 802), which are at the detector resolution [det], to form a resampled image 816 at the SLM resolution. Cross-correlating the reserved blocks in the images 802 yields arrays of cross-correlation peaks, or quiver peaks 804a and 804b (collectively, quiver peaks 804), at the reserved block resolution [rb]. The arrays of quiver peaks 804 are upsampled to the detector resolution [det] to form upsampled peak arrays 806a and 806b (collectively, upsampled peak arrays 802), which are used to form a quadrature combined image 814 at the detector resolution [det]. The cross-correlation also produces yields a quiver alignment array 810 at the reserved block resolution [rb]. The quiver alignment array 810 is upsampled to the data page resolution [SLM] and used to resample the quadrature combined image 814 at the data page resolution [SLM].

In the process of FIG. 8A, the detected images are combined at the detector resolution, which is typically finer than the data page (SLM) resolution. Because the detected images are combined at the detector resolution, the reserved block cross-correlation peaks do not necessarily land on a rectilinear pixel grid. As a result, up-sampling the cross-correlation peak locations to the detector resolution [det] may involve relatively complicated interpolation.

Conversely, FIG. 8B illustrates an example of another resampling process, called enhanced resampling, that involves finding the upsampled quiver peaks at the data page resolution [SLM], not the detector resolution [det]. More specifically, the A and B Quiver Peaks 804 are upsampled to produce upsampled quiver peaks 856a and 856b (collectively, upsampled quiver peaks 856) at the SLM resolution [SLM]. Enhanced resampling does not yield a quadrature combined image; instead, a resampled image 866 is created at the SLM resolution from the images 806, the upsampled alignment 812, and the upsampled quiver peaks 856

Upsampling from the reserved block resolution [rb] to the detector page/SLM resolution [SLM] is computationally simpler than upsampling to detector resolution [det] because the reserved blocks may be positioned on a rectilinear grid within the SLM image. Upsampling may thus be performed by relatively simple processes, such as inserting an integral number of values in each dimension, e.g., using a bi-linear interpolation algorithm. Upsampling from the reserved block to the detector resolution, by contrast, involves upsampling reserved block information that does not necessarily lie on a rectilinear grid due to real-world image distortions. In addition, the upsampling ratio may be a non-integer that varies throughout the image. Thus the process of upsampling from the reserved block resolution [rb] to the SLM resolution [SLM] may be both simpler and more accurate than upsampling from the reserved block resolution [rb] to detector resolution.

The enhanced resampling process shown in FIG. 8B can exhibit other advantages over the resampling process shown in FIG. 8A. For instance, the memory size to store SLM resolution arrays is typically smaller than that to store detector resolution arrays. As a result, the enhanced resampling process of FIG. 8B may require less memory than the resampling process of FIG. 8A. In both the enhanced resampling process of FIG. 8B and the resampling process of FIG. 8A, reserved block ([rb]) to SLM ([SLM]) upsampling yields the upsampled alignment 812 from the quiver alignment 810. Thus, in the RQHD case, the upsampling and perhaps the hardware itself may be shared for both purposes.

Note that for n-rature homodyne detection, the processes shown in FIGS. 8A and 8B may be applied to all n images captured during the n-rature homodyne detection. That is, the number of detector images used may be increased from two to three or more, e.g., using detector images $I_A$, $I_B$, $I_C$, . . . .

Mathematics of Resampling and Enhanced Resampling

Resampling of the Quadrature Combined Image for quadrature homodyne detection or n-rature homodyne detection may be performed in the same manner as resampling in a direct detection channel. In this approach, the position of each SLM pixel image upon the detector is established by locating the positions of the reserved blocks within the page image. Resampling is then performed by choosing a set of detector pixel values I near to the SLM pixel image (e.g., the nearest 4×4 window of detector pixels), and applying a set of resampling coefficients w, i.e., $$\hat{d} = Iw \tag{27}$$

where $\hat{d}$ is the estimated data value d, of the SLM pixel image, e.g., $d \in \{-1, +1\}$ for BPSK data. w may be chosen to minimize the squared error between $\hat{d}$ and the actual data, d, over many detection cases. Furthermore, differing w coefficient sets may be optimized and applied for differing alignment cases, e.g., 256 different w coefficient sets could be used corresponding to differing 2D fractional pixel alignment cases of the 4×4 window of detector pixels with respect to the SLM pixel image.

For enhanced resampling (FIG. 8B), the detector pixel values I in the Quadrature Combined Image may be replaced by the corresponding pixel values in the $I_A$ and $I_B$ detector images. For n-rature detection, there may be additional images, e.g., C, etc., as well. Furthermore, the detected pixel values in these images may be modified, such as by subtracting a global image mean, etc., as described above. Let the set of (modified) detector pixel values near the SLM pixel image be designated by $\tilde{A}$, $\tilde{B}$, $\tilde{C}$, etc. . . . . Then an enhanced resampling procedure might be used, $$\hat{d} = [c_A \tilde{A} + c_B \tilde{B} + c_C \tilde{C} + \ldots]_w \tag{28}$$

where $c_A$, $c_B$, . . . represent the combination coefficients for the respective detector pixel value sets. In one embodiment, these combination coefficients may be determined by the cosine projection of the data page upon the local oscillator used to detect it as measured by the reserved block correlation peak strengths, e.g., $$c_A = \frac{P_A}{\sqrt{P_A^2 + P_B^2 + \ldots}}, \quad c_B = \frac{P_B}{\sqrt{P_A^2 + P_B^2 + \ldots}}, \tag{29}$$

where $P_A$, $P_B$, . . . are the Upsampled A Peaks, B Peaks, etc., . . . for the corresponding SLM pixel image as determined from the reserved block correlation operations on the corresponding $I_A$, $I_B$, . . . detector images. In another embodiment, the normalizing denominators in the cosine projections may be omitted, e.g., $$c_A = P_A, \quad c_B = P_B, \ldots \tag{30}$$

In still other embodiments, the combination coefficients may be determined from the cosine projections of the reserved blocks from a different data page, e.g., when performing phase quadrature holographic multiplexing as disclosed above. For example, the data value of the corresponding SLM pixel in the I (in phase) data page could be estimated by applying equations (28) and (29) as presented, and then the data value of the corresponding SLM pixel image in the Q (quadrature) image could be estimated by using different combination coefficients, e.g., $$c_A = \cos\left(\cos^{-1}\left(\frac{P_A}{\sqrt{P_A^2 + P_B^2 + \ldots}}\right) - \phi_Q\right),\qquad(31)$$

$$c_B = \cos\left(\cos^{-1}\left(\frac{P_B}{\sqrt{P_A^2 + P_B^2 + \ldots}}\right) - \phi_Q\right),$$

where $\phi_Q$ is the known phase difference between the I and Q images, e.g., preferably 90°. In this manner separate correlation and upsampling operations do not need to be performed for the reserved block patterns in the Q image; instead the entire image combination and resampling process may be accomplished using the reserved block patterns of the I image.

Experimental Coherent Channel Modulation and Detection

This section includes results of an experimental demonstration of the storage and recovery of holographic data at an areal density of 2.0 Tbit/in². This demonstration is but one example of the present technology and should not be taken to limit the scope of this disclosure or the appended claims.

This demonstration involved reading phase quadrature holographic multiplexed data pages using n-rature homodyne detection with n=4. For this demonstration, 220 holograms were recorded in each "book" (spatial location) using angle multiplexing. A grid of 6×9 books at a pitch of 304 µm was so recorded using polytopic multiplexing, yielding a raw areal bit density of 2.004 Tbit/in². Dynamic aperture multiplexing was also employed. The holograms were recorded in a 1.5 mm thick layer of photopolymer media with a total M/# (dynamic range) of 173. Each of the 220 holograms was recorded using sequential PQHM recording, and thus contains two separate data pages (an in-phase page and a quadrature page) separated in phase by 90°. Among the 220 holograms were four Δϕ calibration holograms, also recorded using PWHM. The holograms were recovered using n-rature homodyne detection with n=4, then demodulated and combined using the techniques disclosed herein.

FIGS. 9A-9C, 10A, 10B, and 11 illustrate the sequence of operations used to decode the hologram at the second multiplexing angle (angle 2) using the calibration hologram at the tenth multiplexing angle (angle 10). First, a detector image of the local oscillator alone is taken using the same exposure time used for acquiring the data and demodulation images. Second, the reference beam is aligned to the calibration hologram at angle 10, and four n-rature demodulation detector images of the calibration hologram are exposed. Third, the local oscillator image is subtracted (pixel-wise) from each of the four demodulation detector images.

Figure 9A:
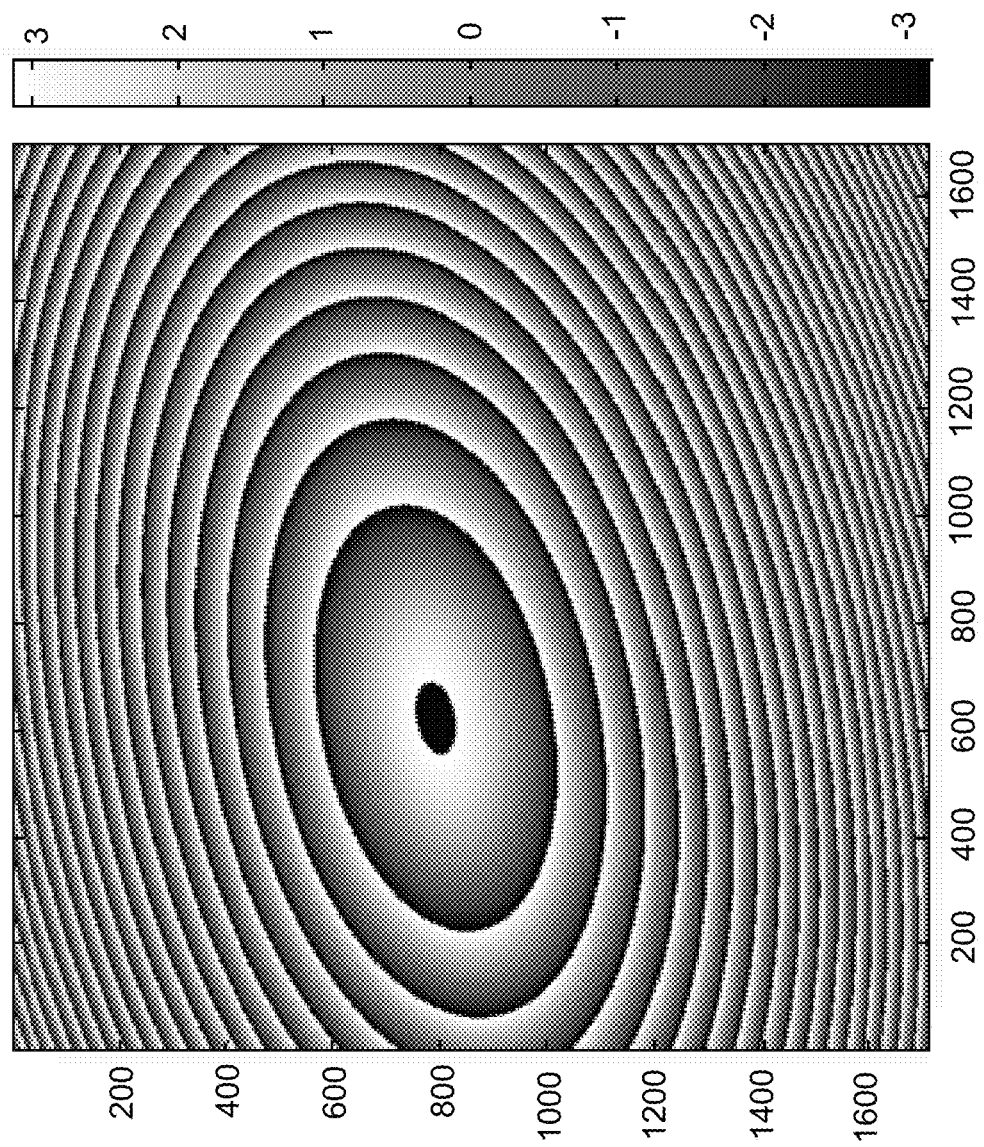
FIG. 9A illustrates a predetermined spatial wavefront demodulation pattern formulated empirically from a detected interference pattern in n-rature homodyne detection.

Fourth, the predetermined fringe demodulation pattern, $\Delta\hat{\phi}_{PRE}$, shown in FIG. 9A is demodulated from the four demodulation detector images. The demodulation is performed using n-rature to quadrature fringe demodulation to yield two demodulation images. The demodulation pattern $\Delta\hat{\phi}_{PRE}$ was formulated empirically to remove fringe components common in typical recoveries by the holographic data storage device.

Figure 9B:
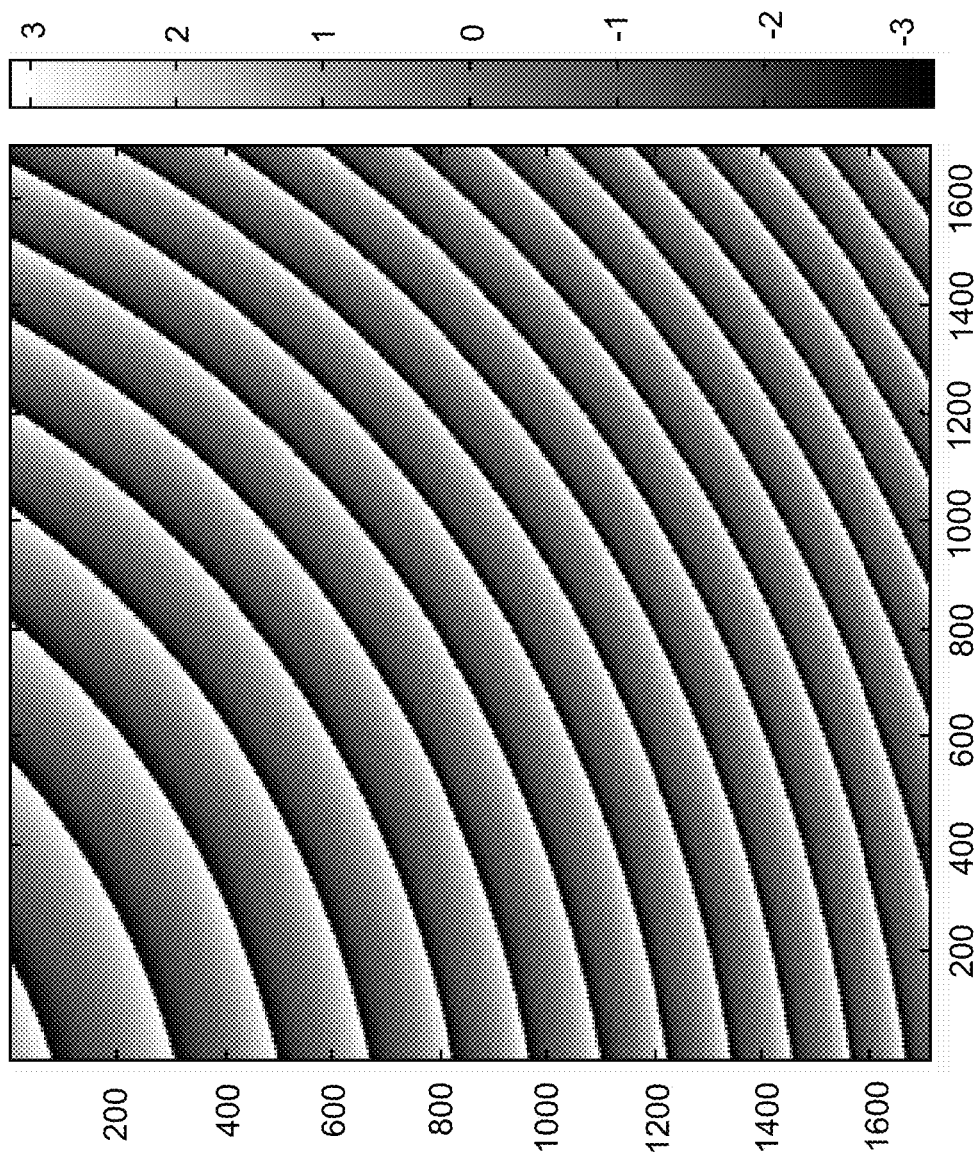
FIG. 9B illustrates a least-squares fit of a quadratic wavefront to a cross-correlation of a subset of reserved blocks in the demodulation page after demodulation of a predetermined fringe pattern.

Fifth, a subset of the reserved blocks in the demodulation page was chosen and cross-correlations were performed to establish spatially-sampled peak strengths and phase measurements. A least-squares fit of these measurements was performed to produce $\Delta\hat{\phi}_{LS}$, a quadratic wavefront best fitting the sampled data. The best-fit quadratic wavefront is shown in FIG. 9B. Since the wavefront of FIG. 9A has already been demodulated from the demodulation images, the wavefront of FIG. 9B represents a residual quadratic wavefront still remaining and hence exhibits much lower fringe frequencies.

Sixth, the best-fit quadratic wavefront shown in FIG. 7B was then demodulated from the two demodulation images using Equation (22), yielding two further demodulated images. Next, the location and peak strengths all of the reserved blocks in the Δϕ calibration holograms were found using cross-correlations. The peak strengths were upsampled and processed to produce a reserved block-based estimate of the remaining phase difference, $\Delta\hat{\phi}_{RB}$. The final demodulation wavefront is determined by the sum of these three components:

$$\Delta\hat{\phi}_{Demod} = \Delta\hat{\phi}_{PRE} + \Delta\hat{\phi}_{LS} + \Delta\hat{\phi}_{RB} \qquad(32)$$

Figure 9C:
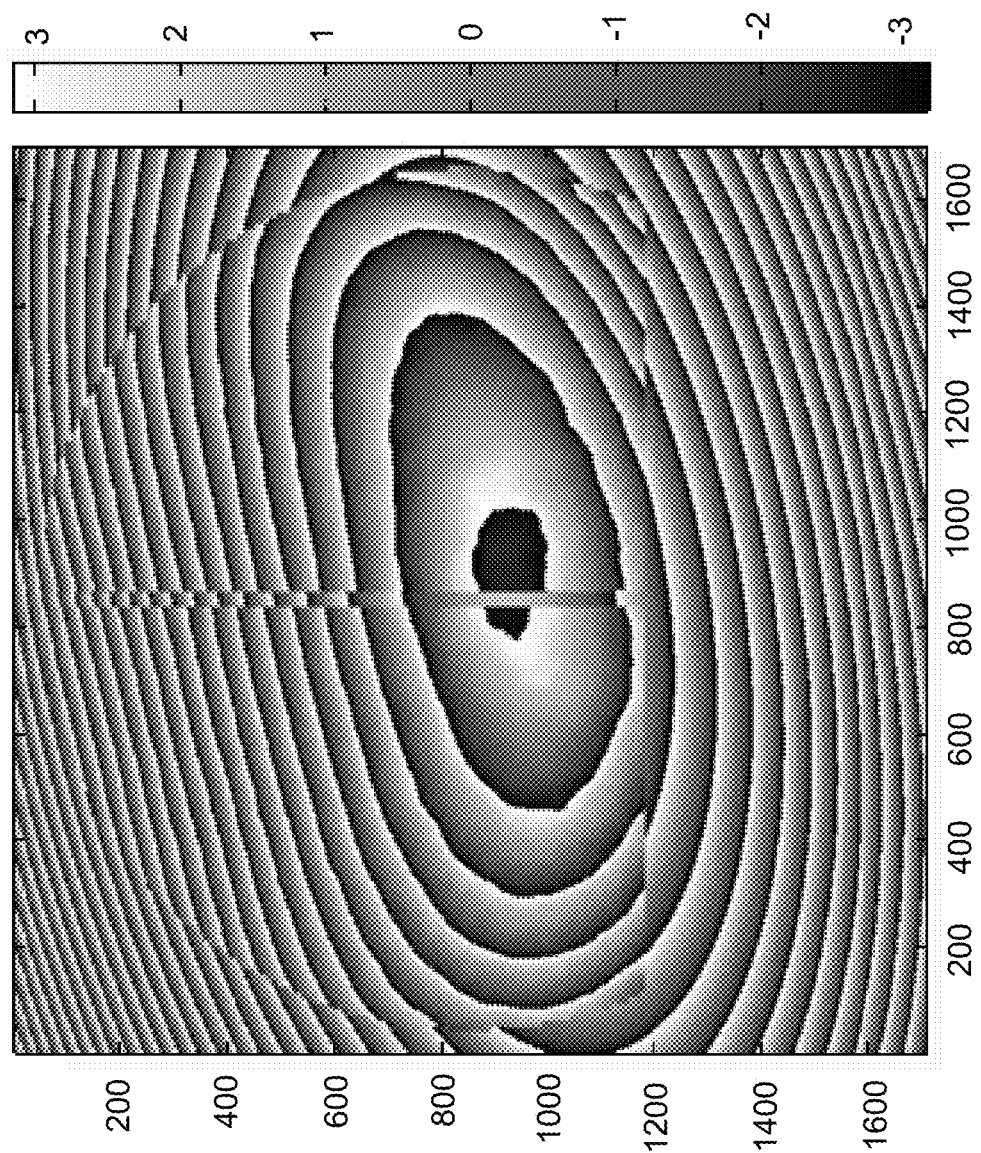
FIG. 9C illustrates a final demodulation wavefront produced by summing predetermined, least-squares, and calibration page components of the spatial wavefront modulation.

FIG. 9C shows the final demodulation wavefront. Note the hemispherical outline with a vertical gap in the middle. This represents the shape of the data page, and hence the region of support for $\Delta\hat{\phi}_{RB}$. The final demodulation wavefront $\Delta\hat{\phi}_{Demod}$ may then be used to demodulate fringes from the n-rature recoveries of data pages.

In the demonstration, this demodulation wavefront derived from the calibration hologram at angle 10 was used to demodulate the data holograms at angles 0 through 54, excluding the demodulation hologram at angle 10 itself. To recover the hologram at angle 2, the reference beam is aligned to the data hologram at angle 10, and four n-rature data detector images of the data hologram are exposed. The local oscillator image is subtracted (pixel-wise) from each of the four data detector images. Then the measured fringe demodulation pattern, $\Delta\hat{\phi}_{Demod}$, is demodulated from the four data detector images. The demodulation is performed using n-rature to quadrature fringe demodulation to yield two data images constituting a quadrature image pair.

Figure 10:
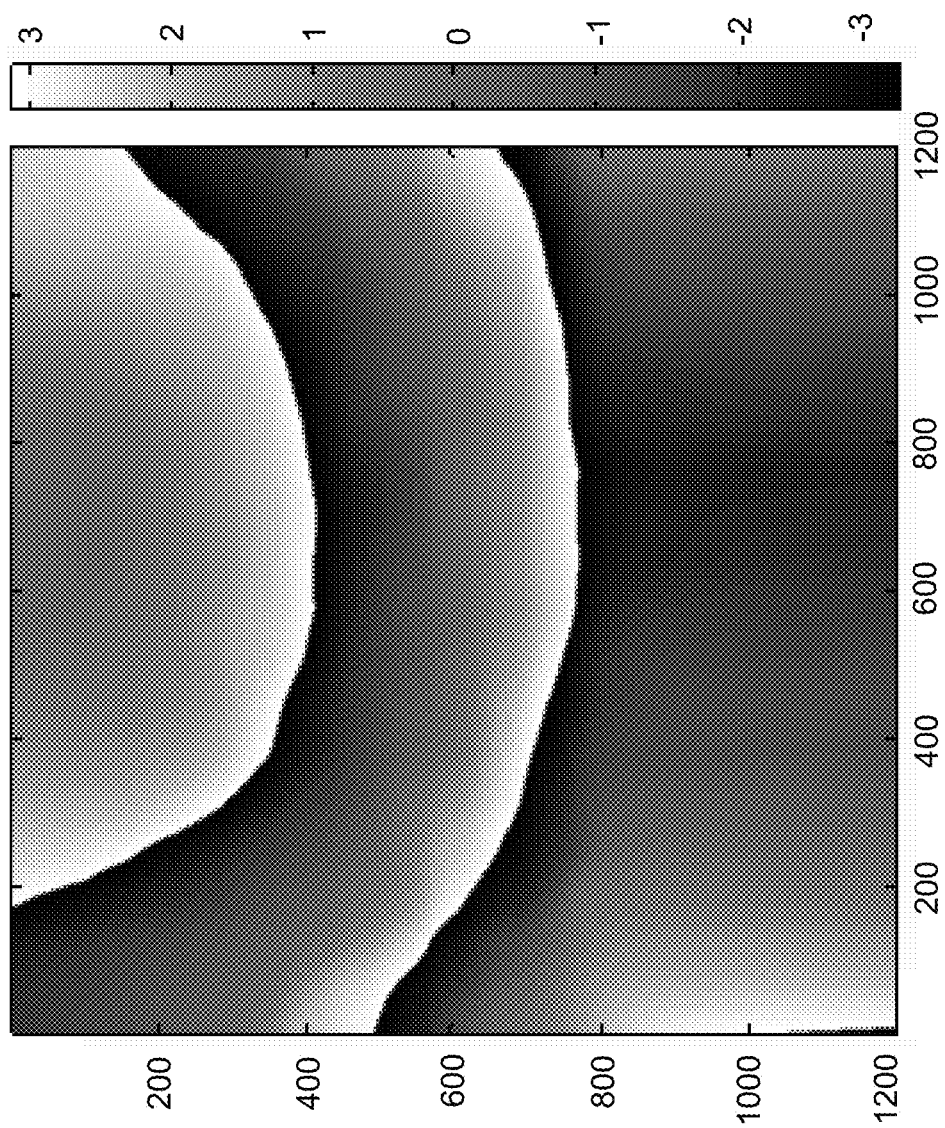
FIG. 10 illustrates a pattern for a data page after removing the final demodulation wavefront shown in FIG. 9C.

The two data images were then resampled to produce $\hat{E}_I$ and $\hat{E}_Q$ images, containing estimates of the optical field for each recorded pixel in the I and Q data pages, respectively, using resampled quadrature homodyne detection in combination with PQHM recovery. During the resampling process, the I and Q reserved blocks were jointly detected in the two data images and used to produce a wavefront $\Delta\hat{\phi}_{dat}$ representing the fringe pattern still present in the data hologram after removal of the demodulation pattern, $\Delta\hat{\phi}_{Demod}$. This fringe pattern $\Delta\hat{\phi}_{dat}$ is shown in FIG. 10. Note that $\Delta\hat{\phi}_{dat}$ considerably lower fringe spatial frequencies than $\Delta\hat{\phi}_{Demod}$, allowing it to be accurately estimated using the reserved blocks in the data pages, which in this case are considerably sparser than the reserved blocks in the demodulation pages.

In a device storing data, the $\hat{E}_I$ and $\hat{E}_Q$ images could subsequently be used to generate soft decision estimates of the state of each pixel, which are fed into a soft-decision decoder to reduce the bit error rate of the recorded user data to an acceptably low level, e.g., $10^{-15}$. The pixels in the $\hat{E}_I$ and $\hat{E}_Q$ images may, however, also be used to generate a hard decision about the binary state of each pixel by simple threshold detection. Comparing this decision to the true value produces a raw bit error rate which is diagnostic of the quality of the recording channel, and may be used to determine the amount of forward error correction required for the soft-decision decoder. Additionally, bit error maps may be produced showing the location of erroneously detected pixels within the data pages. Bit error rates may be converted into equivalent signal-to-noise ratios, e.g., denoted BSNR and defined as the SNR in decibels of an additive white Gaussian noise (AWGN) channel achieving the same bit error rate. In other words, BSNR is SNR back-calculated from the bit error rate rather than from the 1/0 separation like normal SNR.

Figures 11A, 11B:
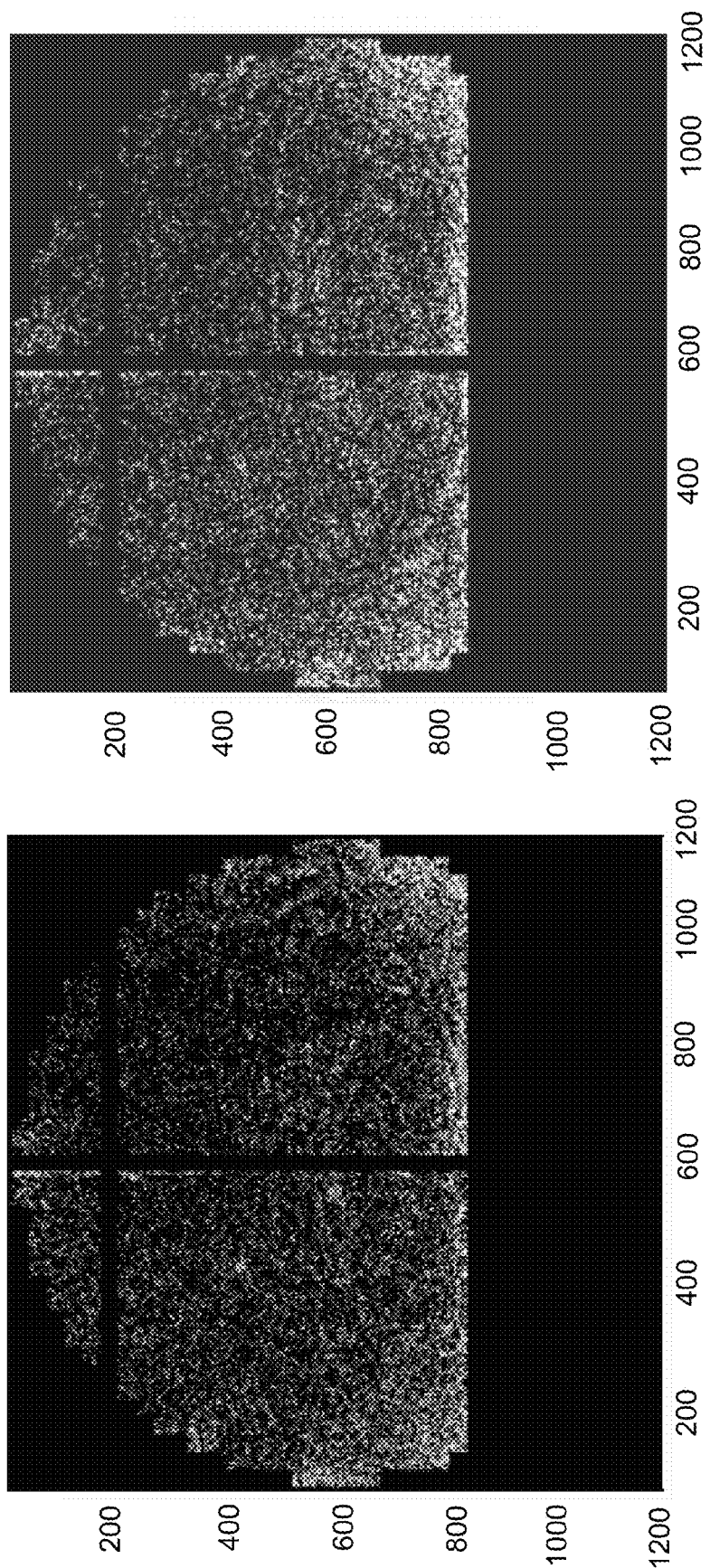
FIGS. 11A and 11B show bit error maps for in-phase (I) and quadrature (Q) recovered data pages (white pixels indicate bit errors).

FIGS. 11A and 11B show the bit error maps for the I and Q data pages, respectively, in the example recovery (white pixels were detected in error). Raw bit error rates are $9.8 \times 10^{-2}$ and $7.8 \times 10^{-2}$ for the I and Q data pages, respectively. The SNRs, as determined from the embedded reserved blocks, are 2.56 dB and 3.66 dB, respectively. In both cases the pages are of sufficient quality to decode error-free using the proposed soft-decision decoder. Furthermore, the entire book from which these pages were taken would also decode without bit errors, and thus this data constitutes a demonstration of holographic data storage at a raw areal bit density exceeding 2.0 Tbit/in$^2$.

Figure 12A:
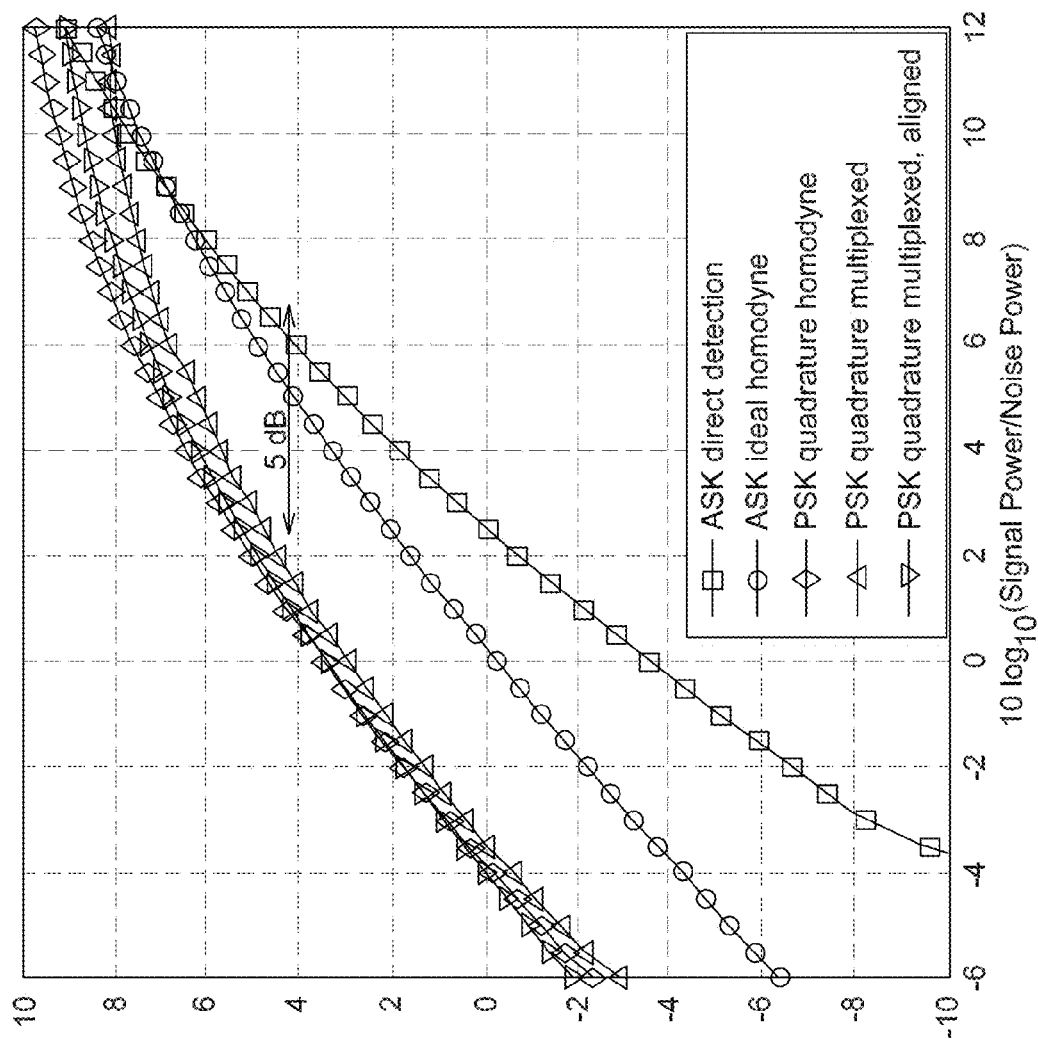
FIGS. 12A and 12B show simulated and experimental channel performance, respectively, for direct detection, quadrature homodyne detection, and 4-rature homodyne detection of holographically stored data pages.
Figure 12B:
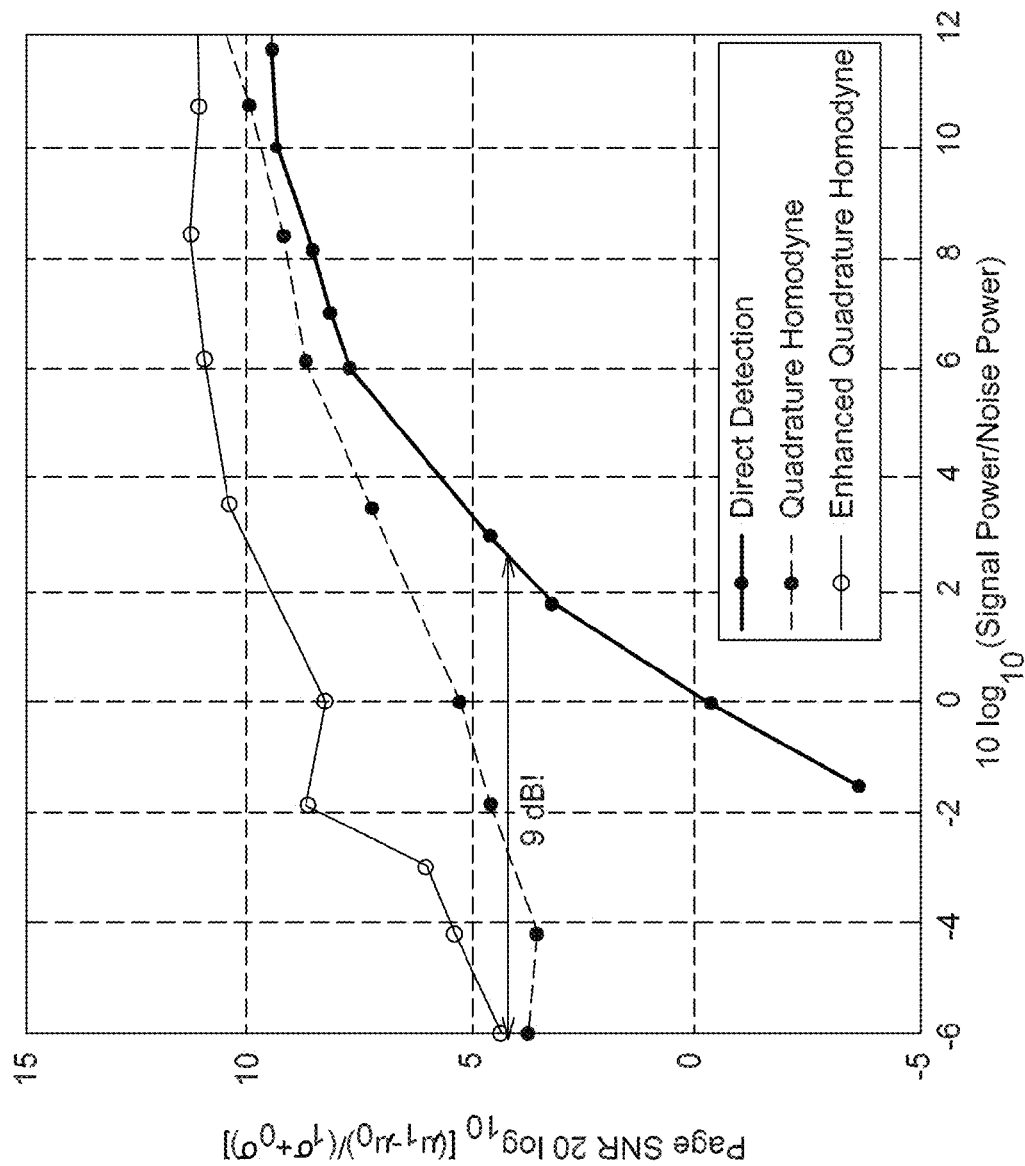

FIGS. 12A and 12B show the results of an experiment comparing the performance of direct detection, quadrature homodyne detection, and n-rature homodyne detection. In the experiment, an SLM was illuminated with 405 nm laser light, and imaged on to a detector array with a pixel pitch of about 0.75 that of the SLM (i.e., 4/3 oversampling). For direct detection, the SLM was configured for binary ASK modulation (i.e., bright and dark pixels). For quadrature homodyne detection and n-rature homodyne detection, the SLM was configured for binary PSK modulation (±180° phase pixels), and a collimated local oscillator beam with about 30 times the intensity of the signal was mixed with the signal. A mirror in the local oscillator path was mounted to a piezoelectric actuator in order to effect the phase differences required by the quadrature homodyne detection and n-rature homodyne detection algorithms.

Additionally, a portion of the laser light was diverted through a diffuser, and then blended with the signal beam in order to simulate coherent optical noise with a broad angular spectrum. The ratio of optical signal to optical noise power was varied across a test range, and detector images were collected and processed for all three detection variants.

FIG. 12A is a plot of the simulated SNR of the recovered data page versus the ratio of signal power to noise power for different combinations of ASK and PSK recording, direct detection, and quadrature homodyne detection. It shows that, for ASK recording, using quadrature homodyne detection instead of direct detection increases the page SNR for a given ratio of signal power to noise power. It also shows that PSK recording instead of ASK recording further increases the page SNR for a given ratio of signal power to noise power.

FIG. 12B is a plot of experimentally measured page SNR versus the ratio of signal power to noise power for data read using direct detection (lower curve), quadrature homodyne detection (middle curve) and n-rature homodyne detection (upper curve) with n=4; i.e., 4 images combined. The leftward shift of the n-rature curve compared to the direct detection curve represents the amount of optical SNR degradation sustainable with n-rature homodyne detection for the same performance achieved by direct detection. The 9 dB improvement shown over direct detection matches the theoretical prediction remarkably well. The experimental results for quadrature homodyne detection also match the predicted improvements (e.g., about 5 dB) in the simulation shown in FIG. 12A.

Figure 13:
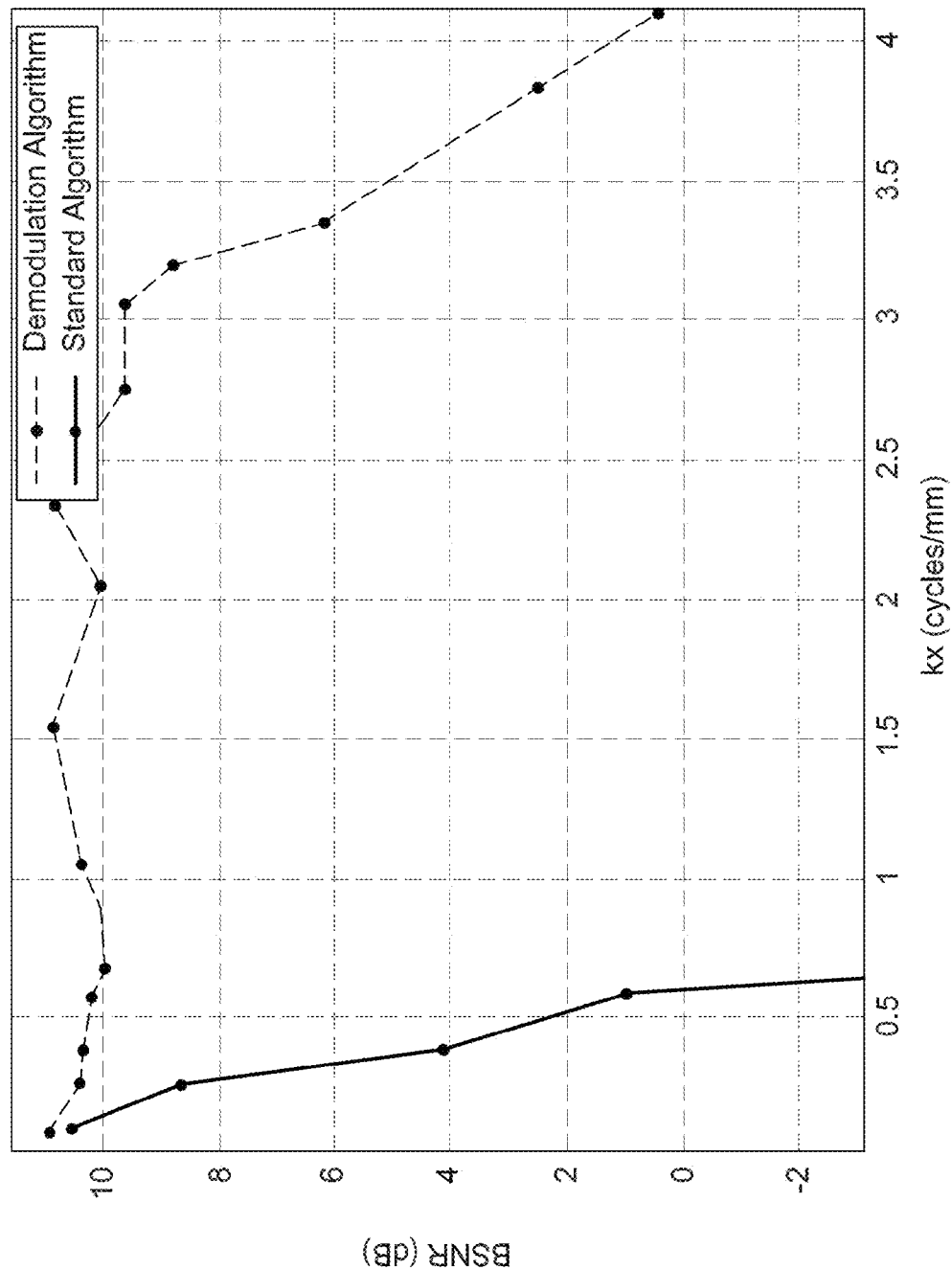
FIG. 13 is a plot of bit error rate-determined SNR (BSNR) versus spatial frequency ($k_x$) for data recovered using n-rature homodyne detection with (right curve) and without (left curve) spatial wavefront demodulation.

FIG. 13 is a plot of experimentally measured book SNR versus horizontal fringe frequency. Horizontal fringe frequency ($k_x$) was varied while 4-rature homodyne detection was performed both with and without local oscillator fringe (spatial wavefront) demodulation. Note that the SNR declines precipitously as the fringe pitch increases without fringe demodulation, but the curve with fringe demodulation exhibits little degradation until about 3 cycles/mm. It is estimated that a positioning accuracy of ±5 μm or better can be achieved in a production design using moderately priced components, a figure which is easily accommodated using the present algorithms.

CONCLUSION

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The invention claimed is:

1. A method for retrieving information stored in a holographic storage medium, the method comprising:
    illuminating at least one hologram in the holographic storage medium with at least one probe beam so as to generate at least one reconstructed signal beam representing at least some information stored in the holographic storage medium;
    detecting a plurality of images, each image in the plurality of images comprising a respective spatial interference pattern in a plurality of spatial interference patterns, the plurality of spatial interference patterns comprising (i) a first spatial interference pattern generated by interference of the at least one reconstructed signal beam with at least one local oscillator beam at a first phase difference between the at least one reconstructed signal beam and the at least one local oscillator beam and (ii) a second spatial interference pattern generated by interference of the at least one reconstructed signal beam with the at least one local oscillator beam at a second phase difference between the at least one reconstructed signal beam and the at least one local oscillator beam; and
    combining the plurality of spatial interference patterns to form a representation of the at least some information, the representation being substantially free of common intensity noise,
    wherein the plurality of spatial interference patterns comprises n>2 spatial interference patterns and wherein there is a difference modulo $2\pi/n$ between the first phase difference and the second phase difference.

2. The method of claim 1, wherein illuminating the at least one hologram comprises:
    illuminating at least one phase-multiplexed hologram recorded in the holographic storage medium.

3. The method of claim 2, wherein the at least one reconstructed signal beam represents information stored in a plurality of phase-multiplexed holograms.

4. The method of claim 1, wherein detecting the plurality of images comprises:
    detecting a first image;
    varying a phase of the at least one local oscillator beam relative to a phase of the at least one reconstructed signal beam by $2\pi/n$ modulo $2\pi$; and
    detecting a second image.

5. The method of claim 1, wherein detecting the plurality of images comprises spatially filtering the at least one reconstructed signal beam based on a spatial filter used to record the at least one hologram in the holographic storage medium.

6. The method of claim 1, further comprising:
    generating another representation of the at least one hologram based on the plurality of spatial interference patterns.

7. The method of claim 1, further comprising:
    demodulating a spatial wavefront modulation from at least one image in the plurality of images.

8. The method of claim 7, wherein the spatial wavefront modulation represents a misalignment of a wavefront of the at least one local oscillator beam with respect to a wavefront of the at least one reconstructed signal beam.

9. The method of claim 7, wherein demodulating the spatial wavefront modulation comprises:
    performing a comparison of at least a portion of the at least one image to at least one reserved block in the at least one hologram; and
    estimating the spatial wavefront modulation based at least in part on the comparison.

10. The method of claim 1, further comprising:
    performing a comparison of a first portion of at least one image to a reserved block in the at least one hologram;
    upsampling the comparison to a spatial resolution of information stored in the at least one hologram so as to generate an upsampled comparison; and
    resampling the at least one image at the spatial resolution of the information stored in the at least one hologram based on the upsampled comparison.

11. The method of claim 1, further comprising:
    detecting an image of the at least one local oscillator beam, and
    removing a contribution from at least one direct term from the representation based on the image of the at least one local oscillator beam.

12. The method of claim 1, further comprising:
    estimating misfocus in the representation, and
    compensating the misfocus in the representation.

13. An apparatus for retrieving information stored in a holographic storage medium, the apparatus comprising:
a coherent light source to generate a beam of coherent light;
a beam splitter, in optical communication with the coherent light source and the holographic storage medium, to split the beam of coherent light into at least one local oscillator beam and at least one probe beam, the at least one probe beam illuminating at least one hologram in the holographic storage medium so as to generate at least one reconstructed signal beam representing at least some information stored in the holographic storage medium;
at least one phase shifter, in optical communication with the beam splitter and/or the holographic storage medium, to vary a phase difference between the at least one local oscillator beam and the at least one reconstructed signal beam;
at least one detector, in optical communication with the beam splitter and the holographic storage medium, to detect a plurality of images, each image in the plurality of images comprising a respective spatial interference pattern in a plurality of spatial interference patterns, the plurality of spatial interference patterns comprising (i) a first spatial interference pattern generated by interference between the at least one reconstructed signal beam and the at least one local oscillator beam at a first phase difference between the at least one reconstructed signal beam and the at least one local oscillator beam and (ii) a second spatial interference pattern generated by interference between the at least one reconstructed signal beam and the at least one local oscillator beam at a second phase difference between the at least one reconstructed signal beam and the at least one local oscillator beam; and
a processor, operably coupled to the at least one detector, to combine the plurality of spatial interference patterns to form a representation of the at least some information, the representation being substantially free of common intensity noise,
wherein the plurality of spatial interference patterns comprises n>2 spatial interference patterns and wherein there is a difference modulo $2\pi/n$ between the first phase difference and the second phase difference.

14. The apparatus of claim 13, wherein the at least one hologram comprises:
at least one phase-multiplexed hologram recorded in the holographic storage medium.

15. The apparatus of claim 14, wherein the at least one reconstructed signal beam represents information stored in a plurality of phase-multiplexed holograms.

16. The apparatus of claim 13, wherein the at least one phase shifter is configured to vary the phase difference between the at least one local oscillator beam relative to a phase of the at least one reconstructed signal beam by $2\pi/n$ between detection of subsequent images in the plurality of images.

17. The apparatus of claim 13, wherein the processor is configured to generate another representation of the at least one hologram based on the plurality of spatial interference patterns.

18. The apparatus of claim 13, wherein the processor is configured to demodulate a spatial wavefront modulation from at least one spatial interference pattern in the plurality of spatial interference patterns.

19. The apparatus of claim 18, wherein the spatial wavefront modulation represents a misalignment of a wavefront of the at least one local oscillator beam with respect to a wavefront of the at least one reconstructed signal beam.

20. The apparatus of claim 18, wherein the processor is further configured to:
perform a comparison of at least a portion of the at least one image to at least one reserved block in the at least one hologram; and
estimate the spatial wavefront modulation based at least in part on the comparison.

21. The apparatus of claim 13, wherein the processor is configured to:
perform a comparison of a first portion of at least one spatial interference pattern to a reserved block in the at least one hologram;
upsample the comparison to a spatial resolution of information in the at least one hologram so as to generate a upsampled comparison; and
resample the at least one spatial interference pattern at the spatial resolution of the spatial resolution of information stored in the at least one hologram based on the resampled comparison.

22. The apparatus of claim 13, further comprising:
an optical filter, in optical communication with the holographic storage medium and the at least one detector, to spatially filter the at least one reconstructed signal beam, the optical filter being based on a spatial filter used to record the at least one hologram in the holographic storage medium.

23. The apparatus of claim 13, wherein the at least one detector is configured to detect an image of the at least one local oscillator beam, and
wherein the processor is configured to remove a contribution of at least one direct term from the representation based on the image of the at least one local oscillator beam.

24. The apparatus of claim 13, wherein the processor is configured to estimate misfocus in the representation and to compensate the misfocus in the representation.

25. A method for reading phase-quadrature multiplexed holograms in a holographic storage medium, the method comprising:
illuminating an in-phase hologram and a quadrature hologram in the holographic storage medium with at least one probe beam so as to generate at least one reconstructed signal beam representing both the in-phase hologram and the quadrature hologram;
detecting at least three spatial interference patterns, each spatial interference pattern in the plurality of spatial interference patterns formed by interference of the at least one reconstructed signal beam with at least one local oscillator beam;
combining the at least three spatial interference patterns to form a first representation of the in-phase hologram; and
combining the at least three spatial interference patterns to form a second representation of the quadrature hologram,
wherein detecting the at least three spatial interference patterns comprises:
detecting a first spatial interference pattern in the at least three spatial interference patterns;
varying a phase of the at least one local oscillator beam relative to a phase of the at least one reconstructed signal beam by up to about $2\pi/3$ radians; and
detecting a second spatial interference pattern in the at least three spatial interference patterns;

varying the phase of the at least one local oscillator beam relative to the phase of the at least one reconstructed signal beam by up to about $2\pi/3$ radians; and detecting a third spatial interference pattern in the at least three spatial interference patterns.

\* \* \* \* \*